ND

(12) United States Patent
Kawamura et al.

(10) Patent No.: US 11,774,733 B2
(45) Date of Patent: *Oct. 3, 2023

(54) ZOOM LENS AND IMAGING APPARATUS

(71) Applicant: FUJIFILM Corporation, Tokyo (JP)

(72) Inventors: Daiki Kawamura, Saitama (JP); Taiga Noda, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/570,528

(22) Filed: Jan. 7, 2022

(65) Prior Publication Data

US 2022/0128805 A1  Apr. 28, 2022

Related U.S. Application Data

(63) Continuation of application No. 16/689,242, filed on Nov. 20, 2019, now Pat. No. 11,300,764.

(30) Foreign Application Priority Data

Nov. 27, 2018  (JP) ................................ 2018-221597

(51) Int. Cl.
*G02B 15/14* (2006.01)
*G02B 9/60* (2006.01)
*H04N 23/55* (2023.01)

(52) U.S. Cl.
CPC ....... *G02B 15/145121* (2019.08); *G02B 9/60* (2013.01); *H04N 23/55* (2023.01)

(58) Field of Classification Search
CPC .. G02B 15/145121; G02B 9/60; G02B 15/14; G02B 13/0045; G02B 13/06
See application file for complete search history.

(56) References Cited

U.S. PATENT DOCUMENTS 8,982,475 B2   3/2015  Kim
9,235,036 B2   1/2016  Kato et al.
(Continued)

FOREIGN PATENT DOCUMENTS

CN   108292031 A   7/2018
JP   H02-256011 A  10/1990
(Continued)

OTHER PUBLICATIONS

An Office Action mailed by the United States Patent and Trademark Office dated Jul. 6, 2022, which corresponds to U.S. Appl. No. 17/570,528 and is related to U.S. Appl. No. 17/570,528.

(Continued)

*Primary Examiner* — Alicia M Harrington
(74) *Attorney, Agent, or Firm* — Studebaker & Brackett PC

(57) ABSTRACT

The zoom lens includes, as lens groups, in order from the object side, only a first lens group having a positive power, a second lens group having a negative power, a third lens group having a positive power, a fourth lens group having a negative power, and a fifth lens group having a positive power. An aperture stop is disposed between a lens surface closest to the image side in the second lens group and a lens surface closest to the object side in the fourth lens group. During zooming, at least the first lens group, the second lens group, the third lens group, and the fourth lens group move. The first lens group consists of a negative lens, a positive lens, and a positive lens in order from the object side. The zoom lens satisfies predetermined conditional expressions.

16 Claims, 35 Drawing Sheets

(56) References Cited

U.S. PATENT DOCUMENTS

| | | |
|---|---|---|
| 10,018,814 B2 | 7/2018 | Shibata et al. |
| 2008/0304167 A1* | 12/2008 | Souma ............ G02B 15/145121 359/766 |
| 2011/0273780 A1 | 11/2011 | Hosoi et al. |
| 2014/0354857 A1* | 12/2014 | Kato .............. G02B 15/145121 359/557 |
| 2016/0109692 A1 | 4/2016 | Shibata |
| 2016/0154221 A1 | 6/2016 | Noda et al. |
| 2016/0154222 A1 | 6/2016 | Noda et al. |
| 2016/0259154 A1 | 9/2016 | Heu |
| 2017/0068075 A1 | 3/2017 | Onozaki |
| 2018/0180860 A1 | 6/2018 | Kurioka et al. |
| 2018/0348476 A1 | 12/2018 | Machida |

FOREIGN PATENT DOCUMENTS

| | | |
|---|---|---|
| JP | H11-258506 A | 9/1999 |
| JP | 2007-156251 A | 6/2007 |
| JP | 2014-066946 A | 4/2014 |
| JP | 2016-109719 A | 6/2016 |
| JP | 2016-109721 A | 6/2016 |
| JP | 2017-053889 A | 3/2017 |
| JP | 2017-156426 A | 9/2017 |
| WO | 2016/031256 A1 | 3/2016 |

OTHER PUBLICATIONS

An Office Action; "Notice of Reasons for Refusal," mailed by the Japanese Patent Office dated Feb. 1, 2022, which corresponds to Japanese Patent Application No. 2018-221597 and is related to U.S. Appl. No. 17/570,528 with English language translation.

An Office Action mailed by China National Intellectual Property Administration dated Mar. 22, 2022, which corresponds to Chinese Patent Application No. 201911152316.1 and is related to U.S. Appl. No. 17/570,528; with English language translation.

An Office Action; "Notice of Reasons for Refusal," mailed by the Japanese Patent Office dated May 30, 2023, which corresponds to Japanese Patent Application No. 2022-120945, and is related to U.S. Appl. No. 17/570,528; with English language translation.

* cited by examiner

EXAMPLE 2

EXAMPLE 3

EXAMPLE 4

EXAMPLE 5

EXAMPLE 6

EXAMPLE 7

EXAMPLE 8

EXAMPLE 9

EXAMPLE 11

FIG. 12
EXAMPLE 1
WIDE-ANGLE END
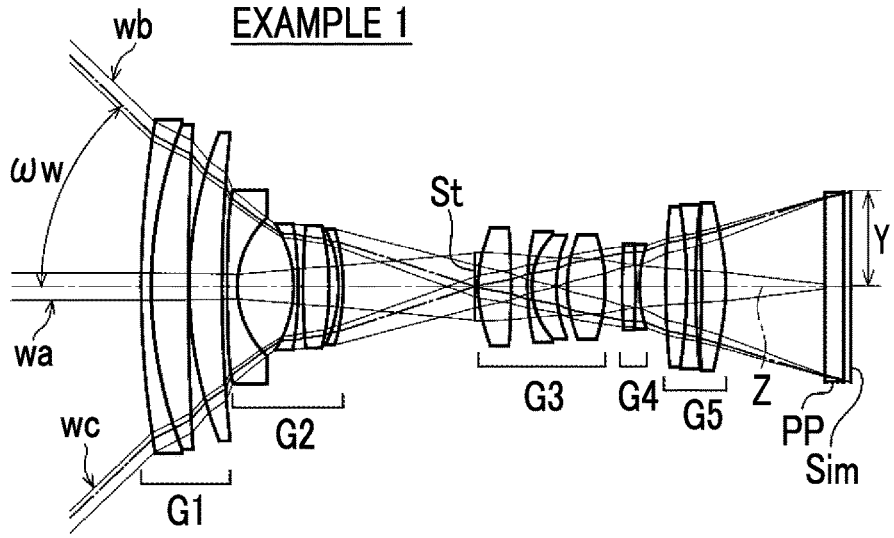
MIDDLE
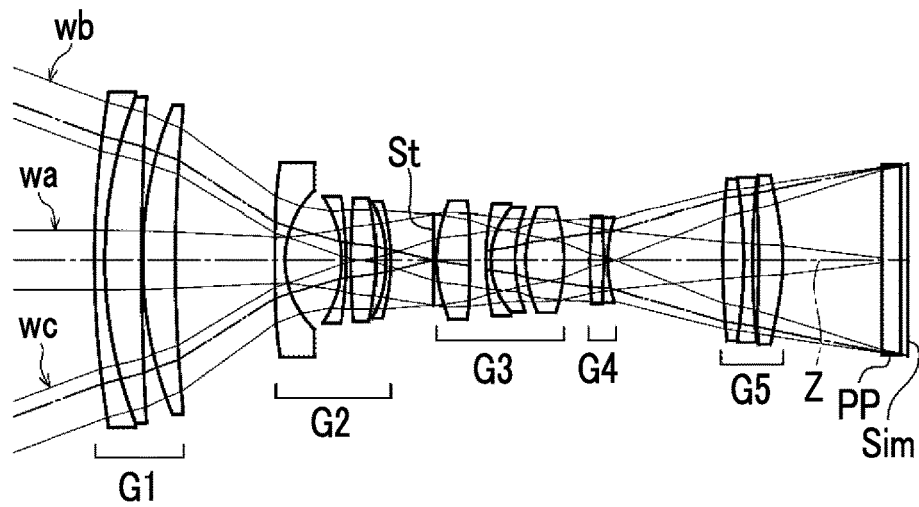
TELEPHOTO END
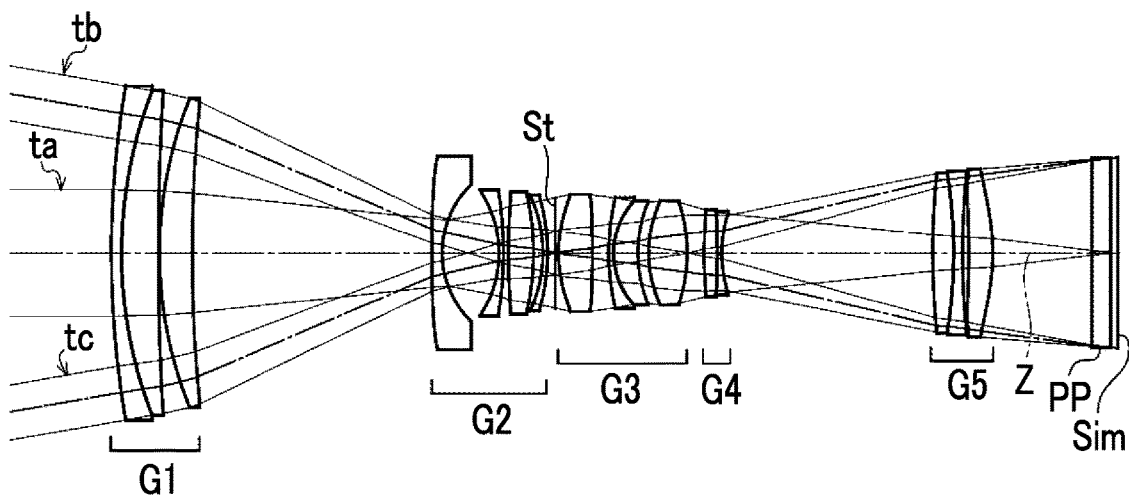

FIG. 13
EXAMPLE 1
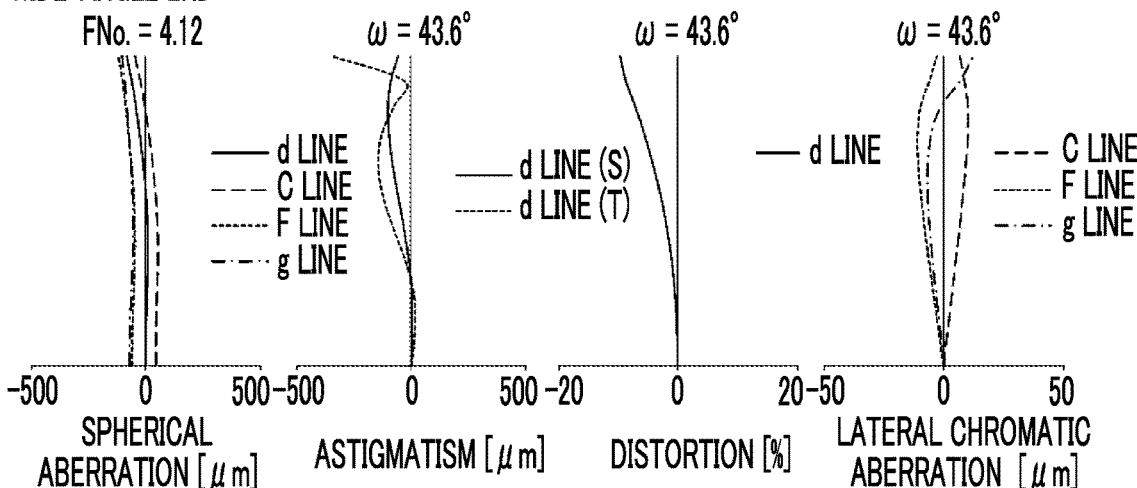
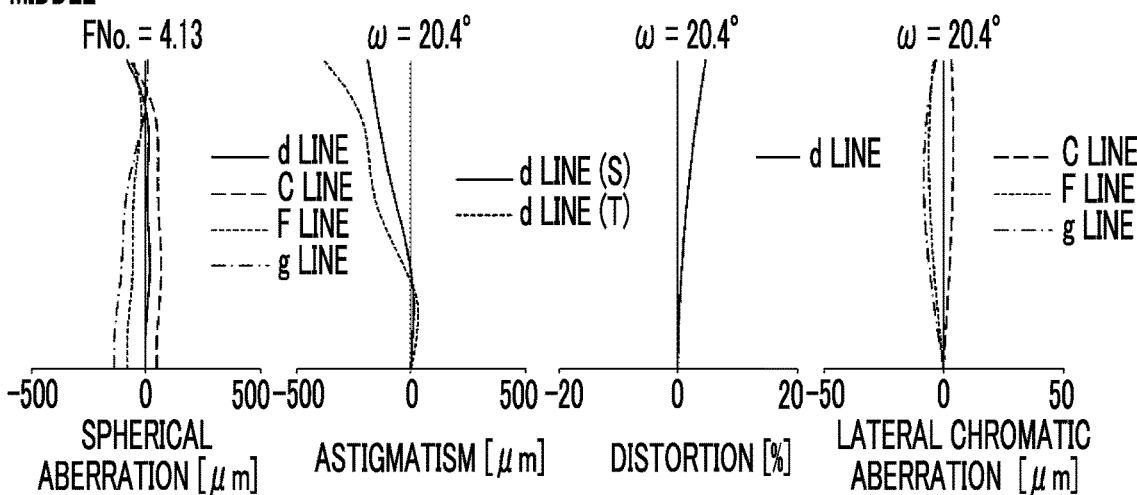
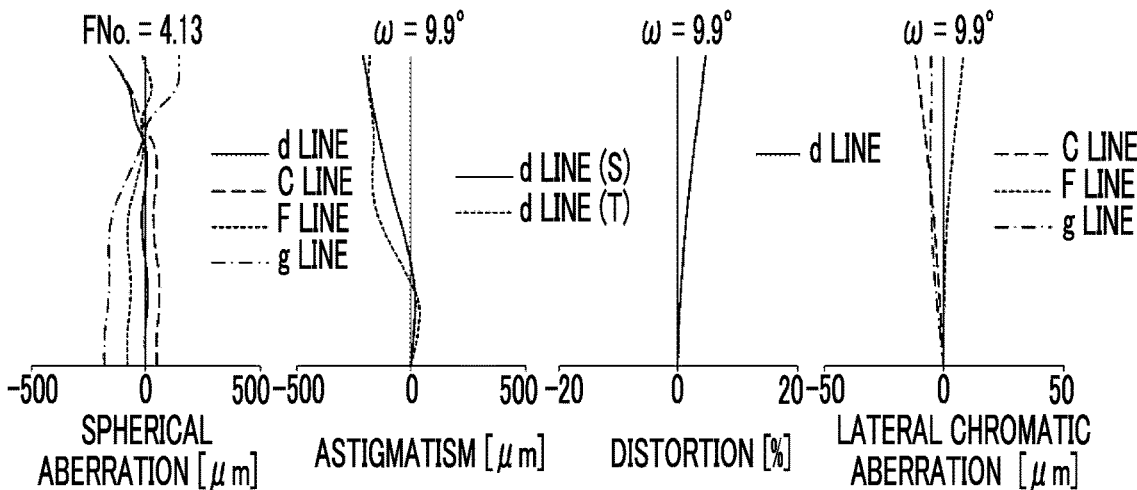

FIG. 14
EXAMPLE 2
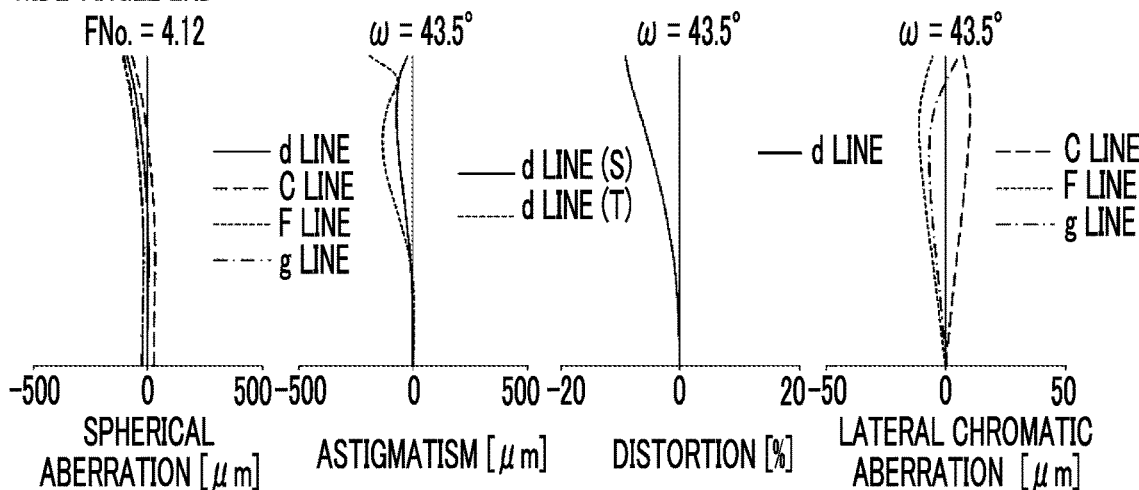
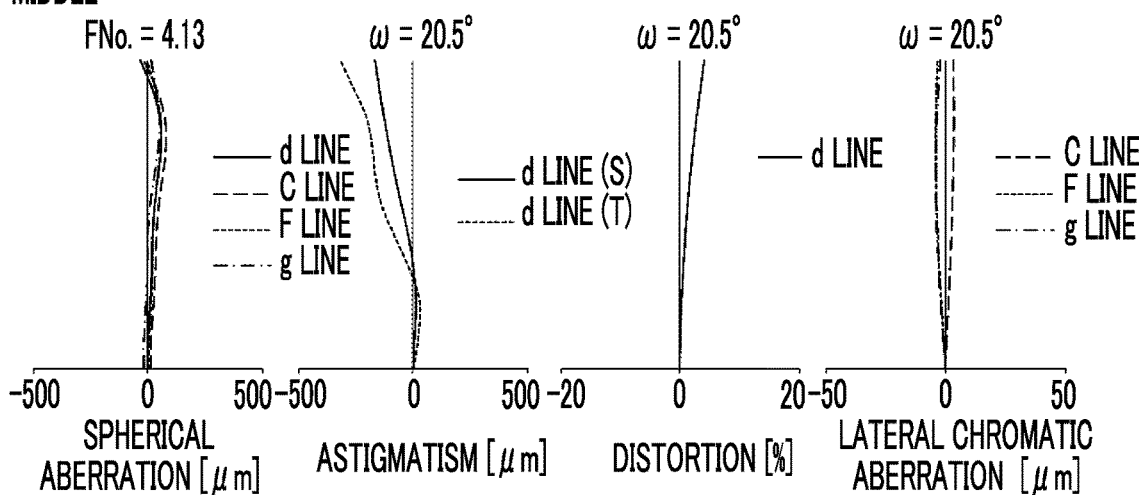
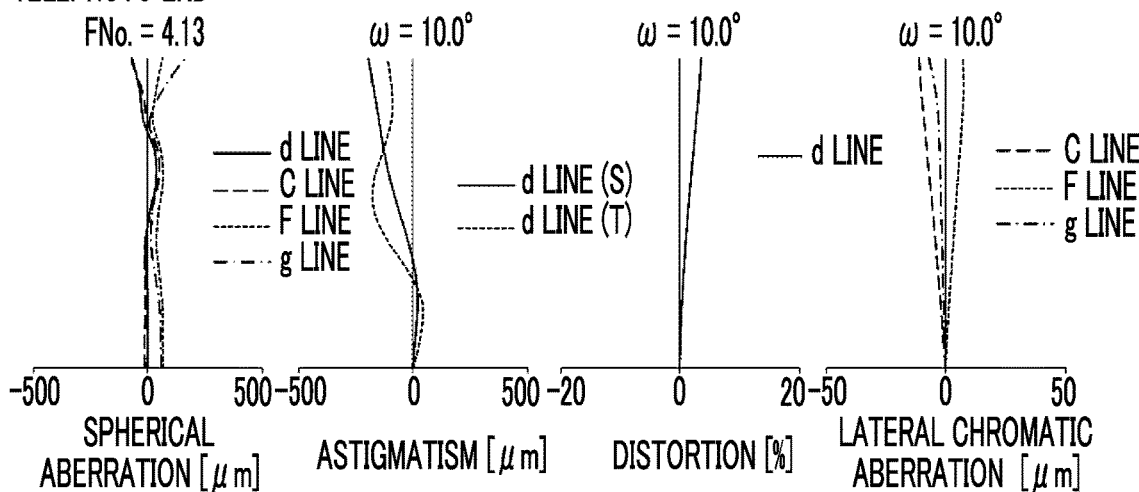

FIG. 15
EXAMPLE 3
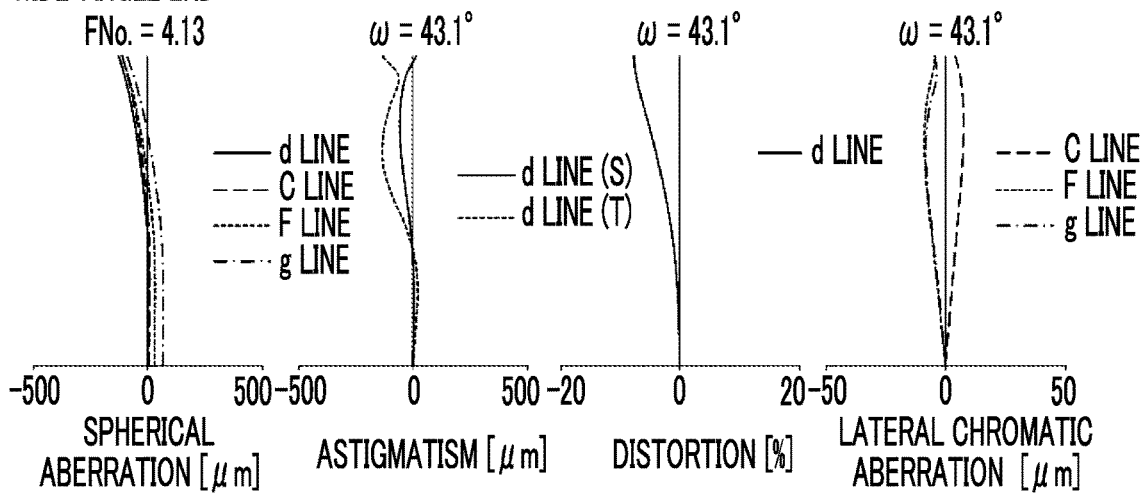
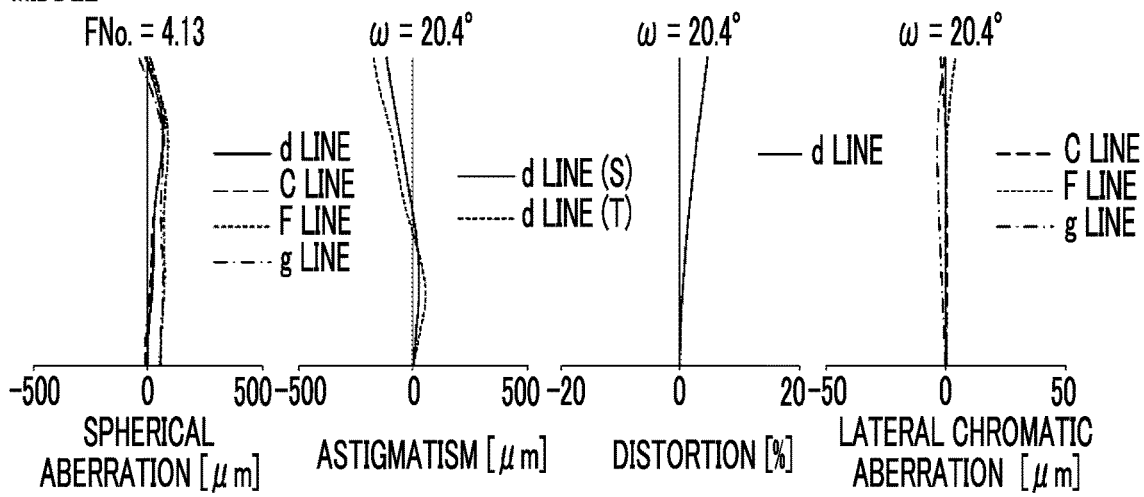
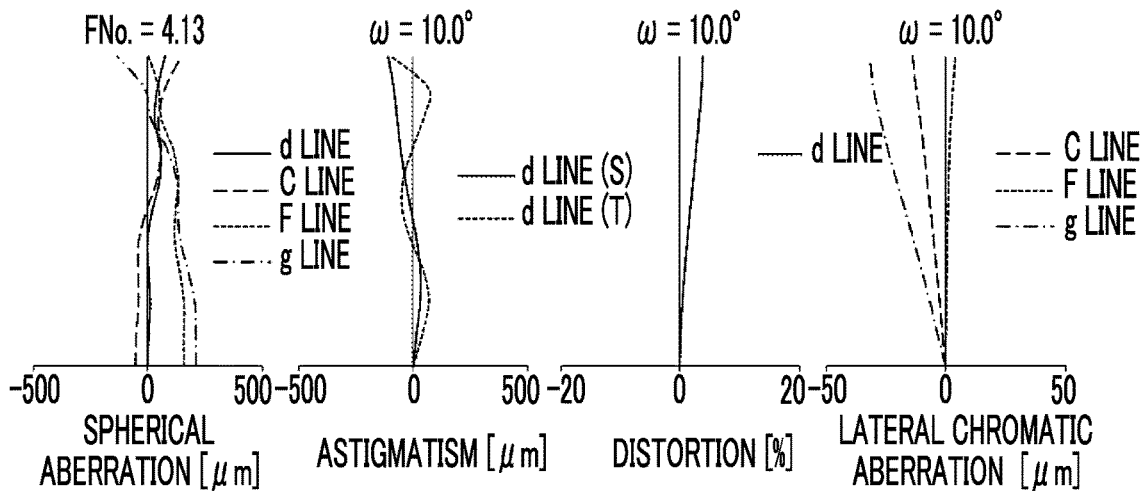

FIG. 16
EXAMPLE 4
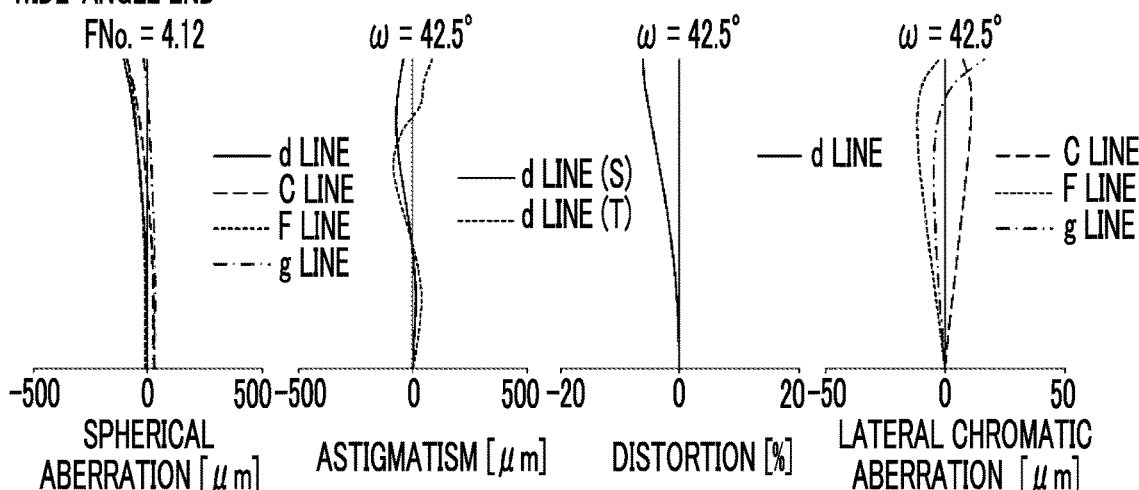
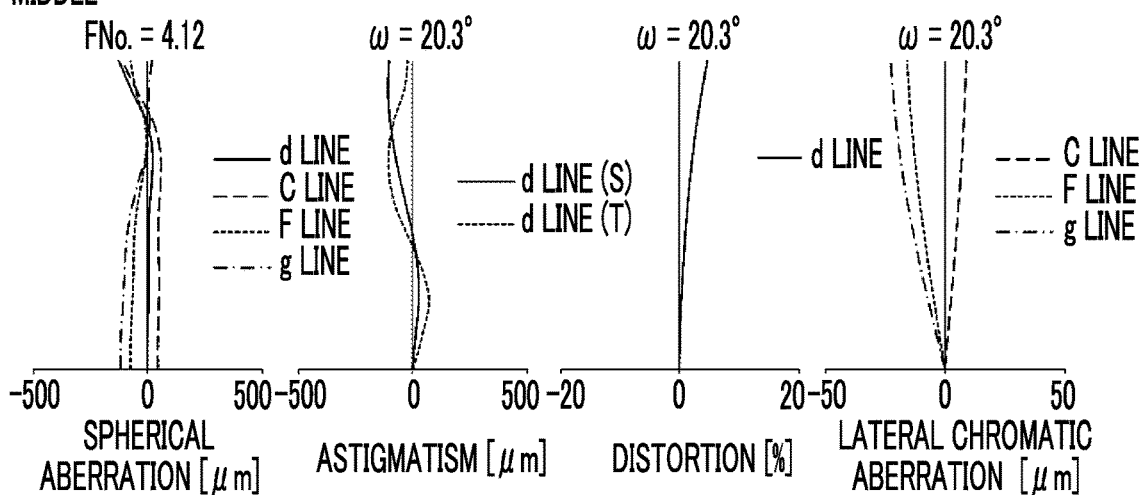
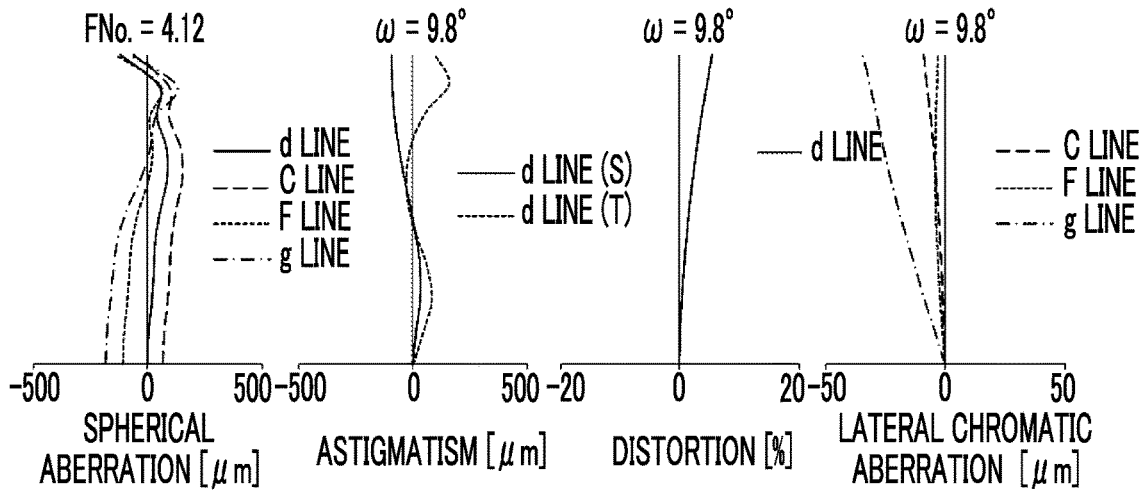

FIG. 17
EXAMPLE 5
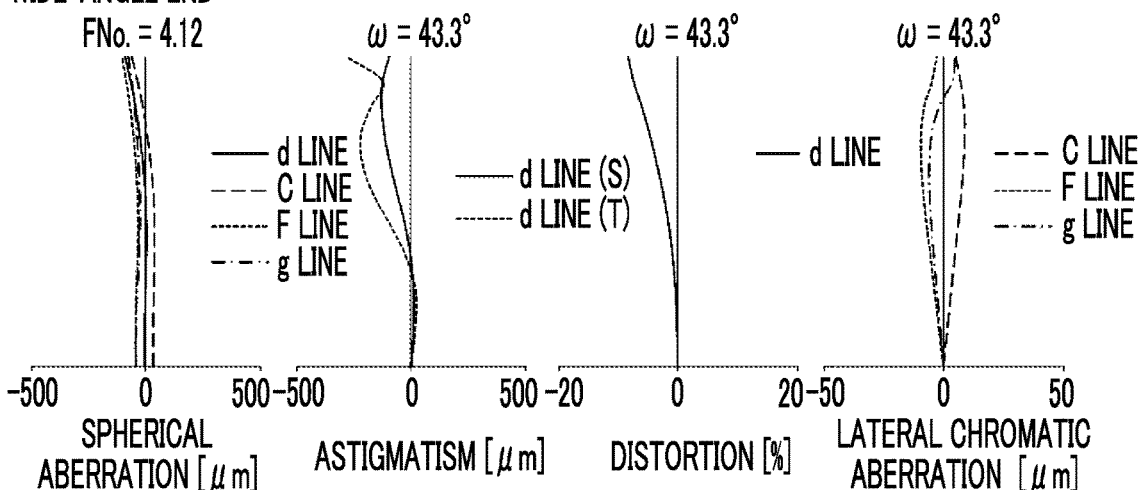
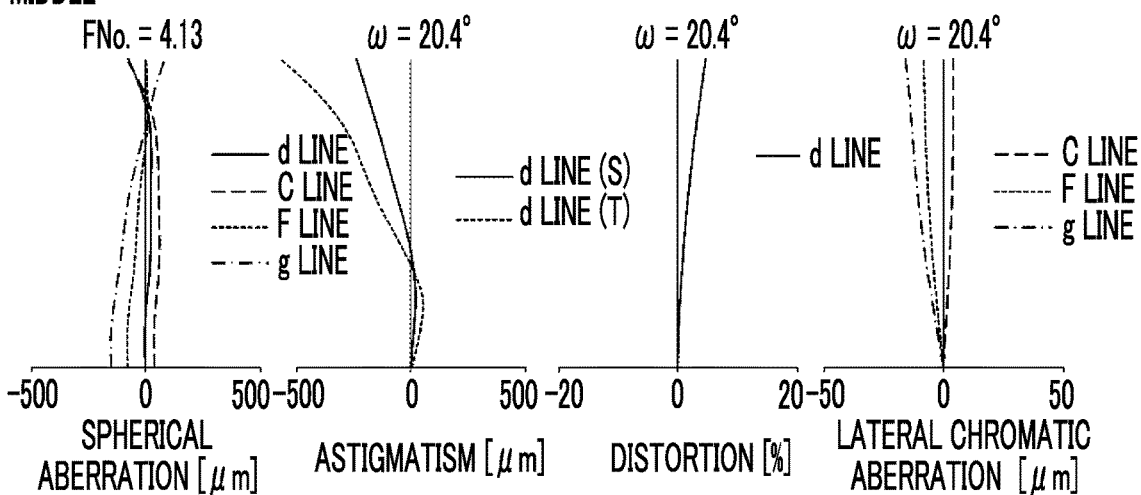
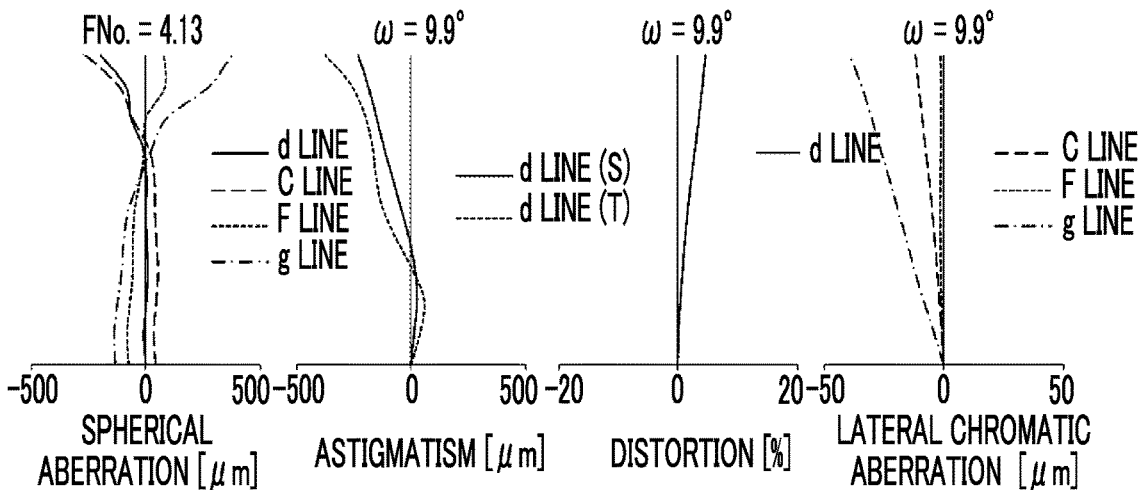

FIG. 18
EXAMPLE 6
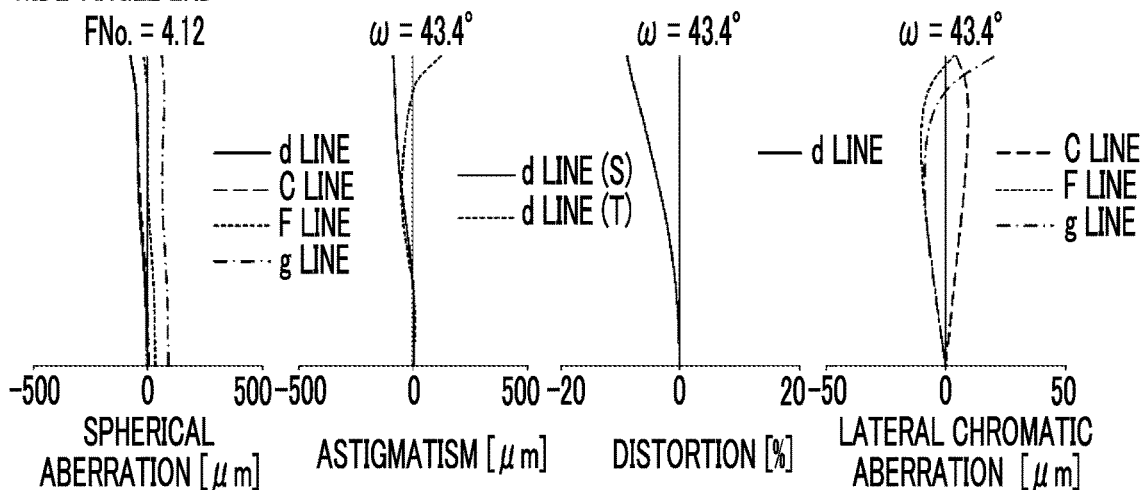
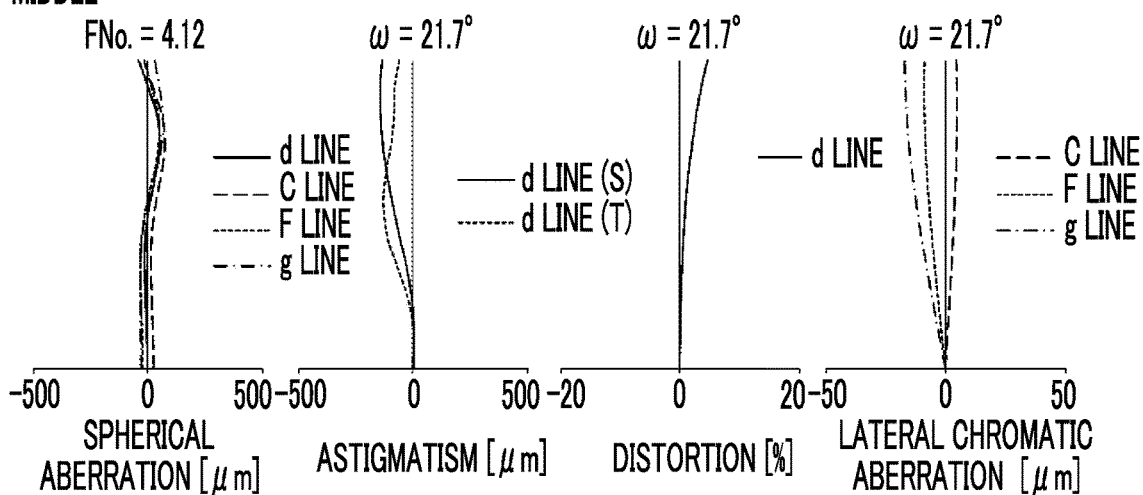
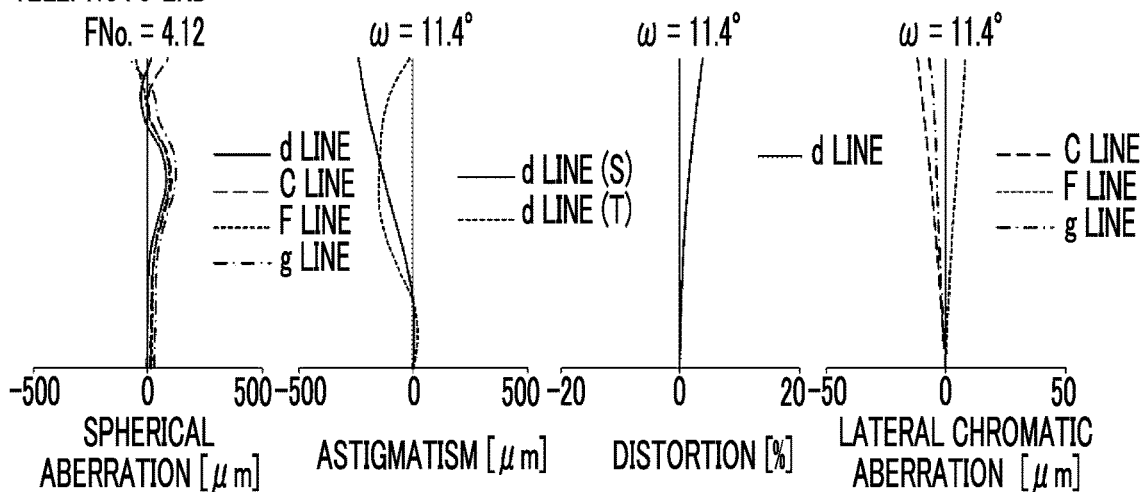

FIG. 19
EXAMPLE 7
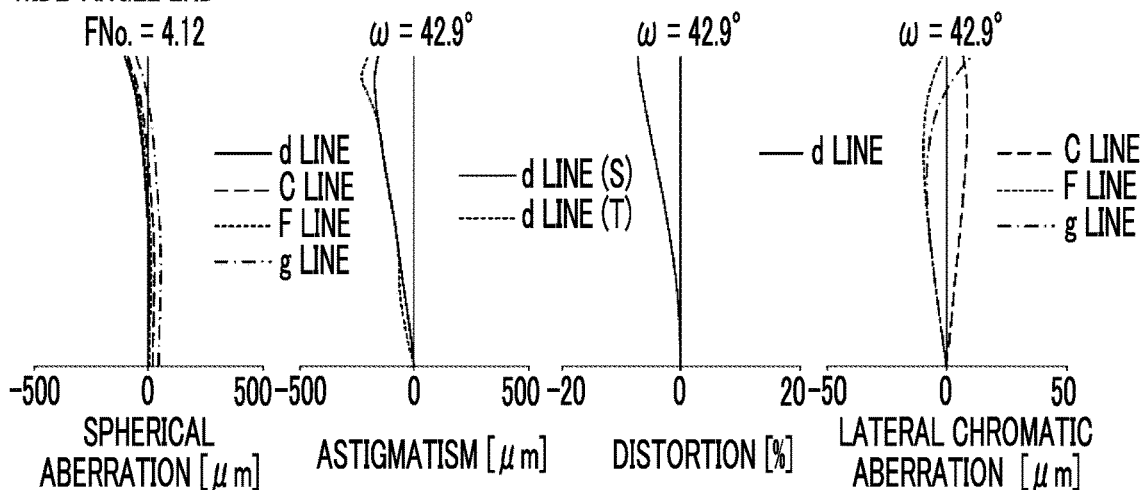
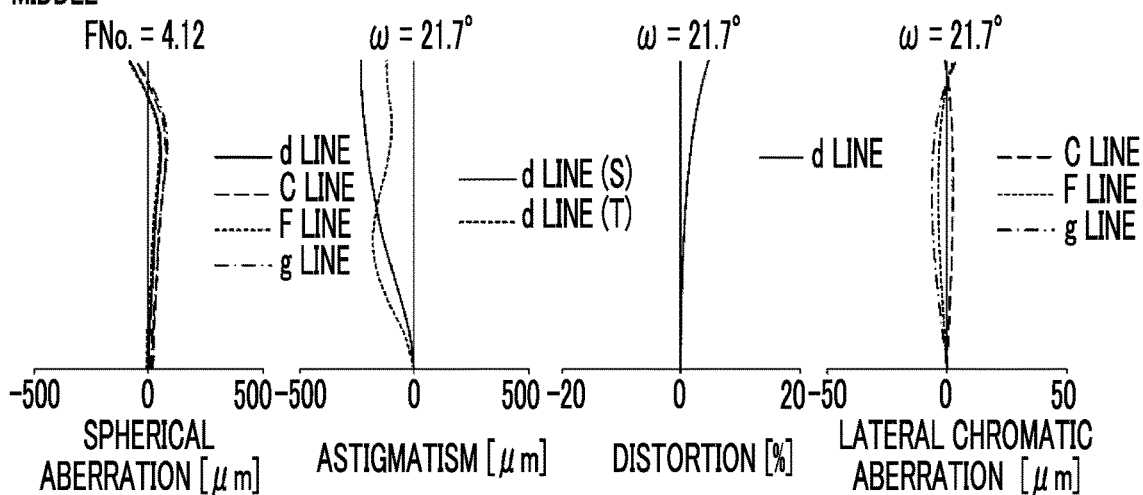
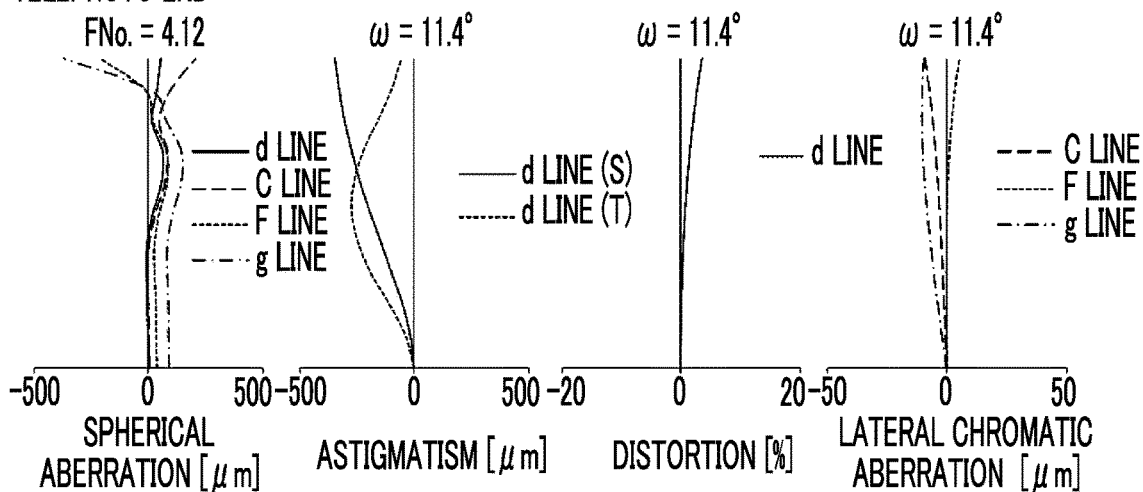

FIG. 20
EXAMPLE 8
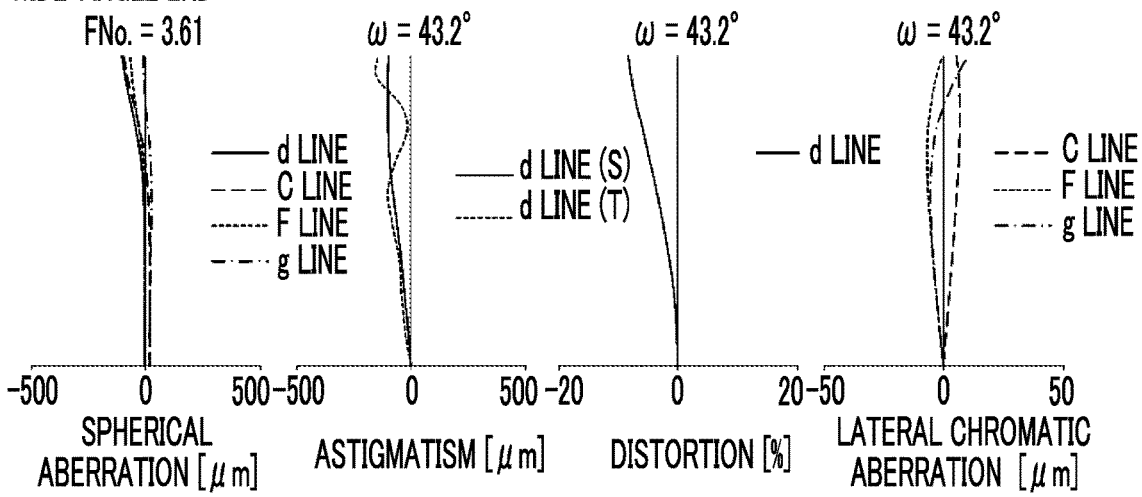
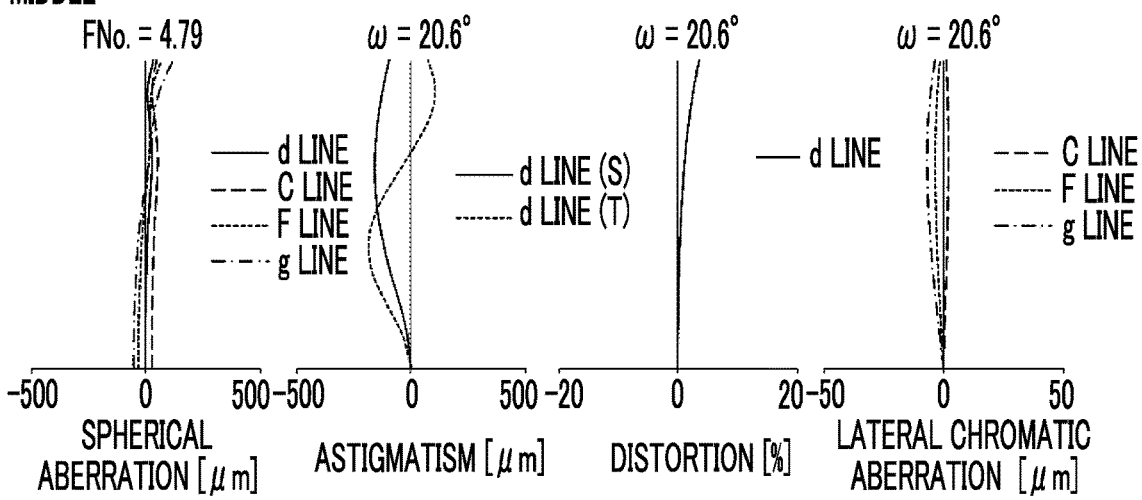
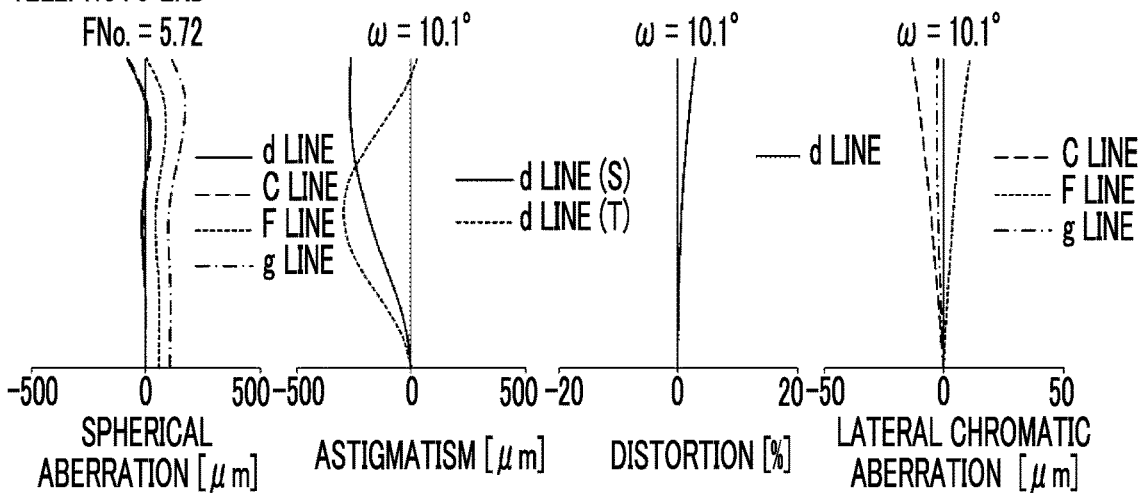

FIG. 21
EXAMPLE 9
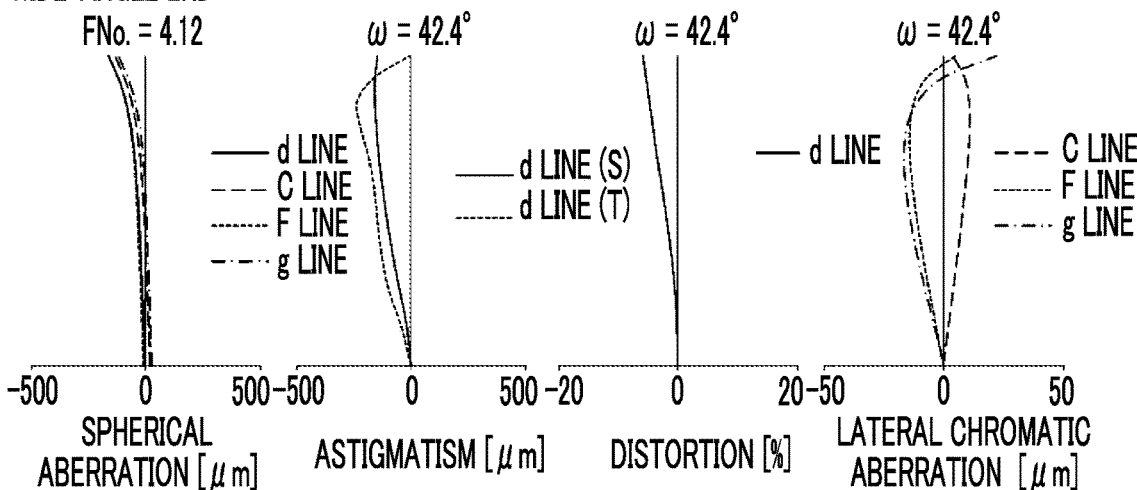
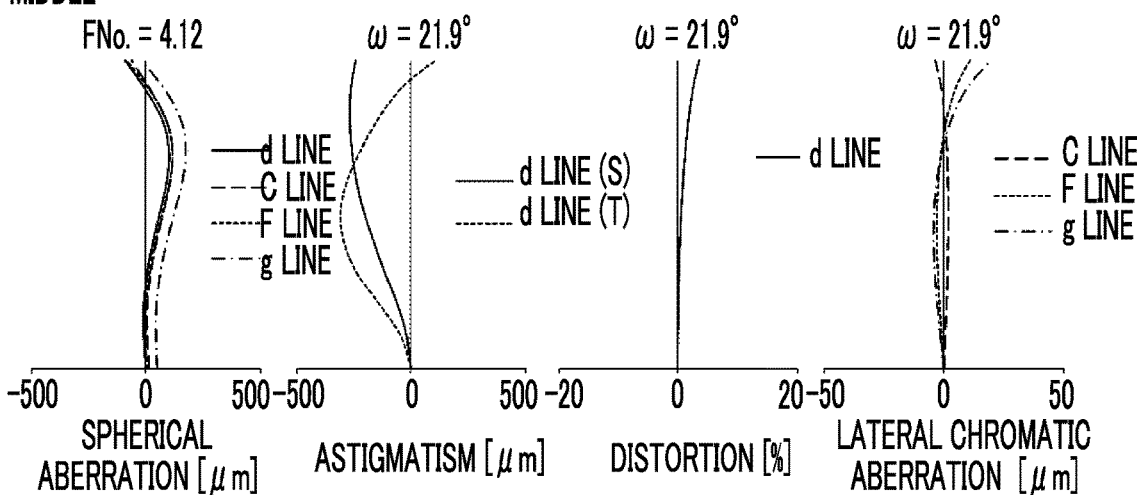
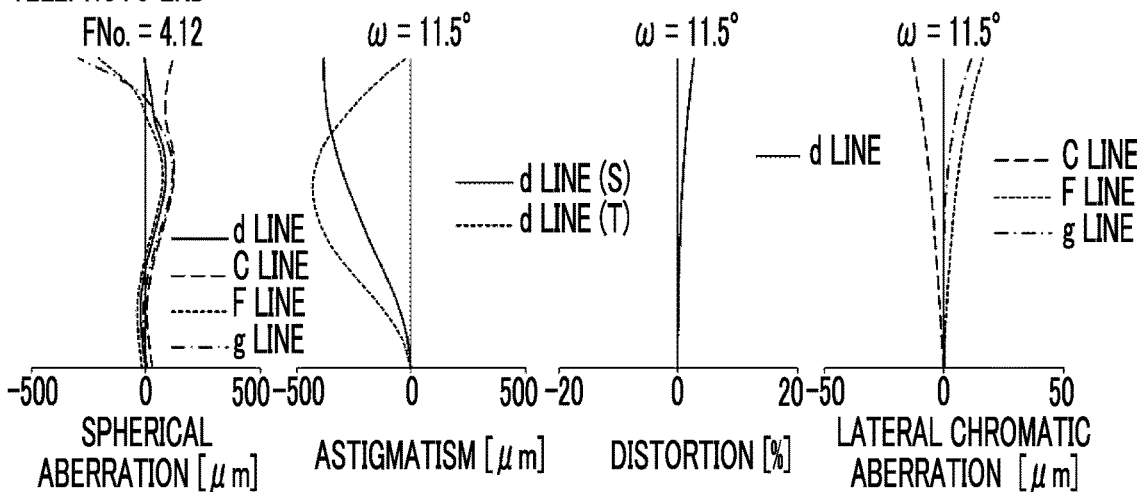

FIG. 22
EXAMPLE 10
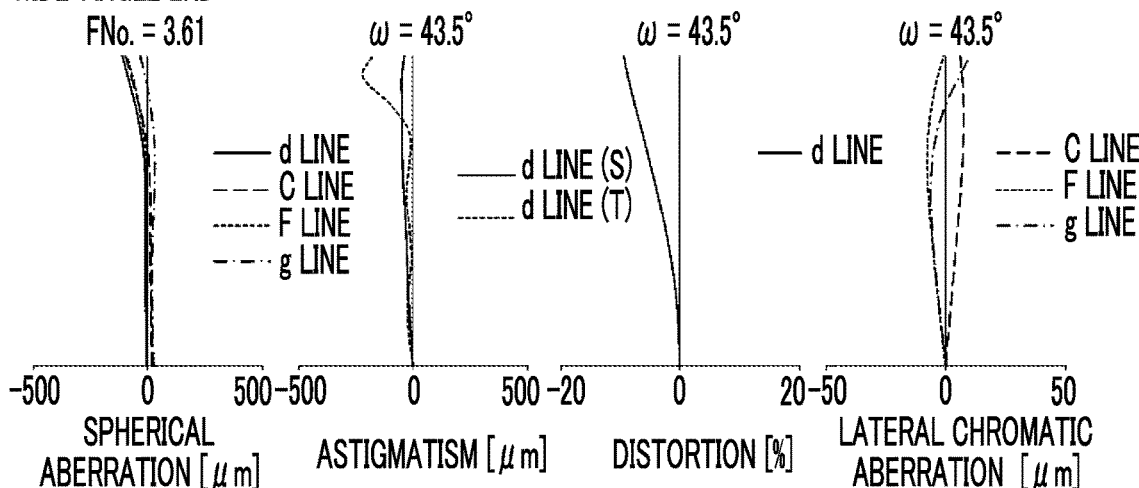
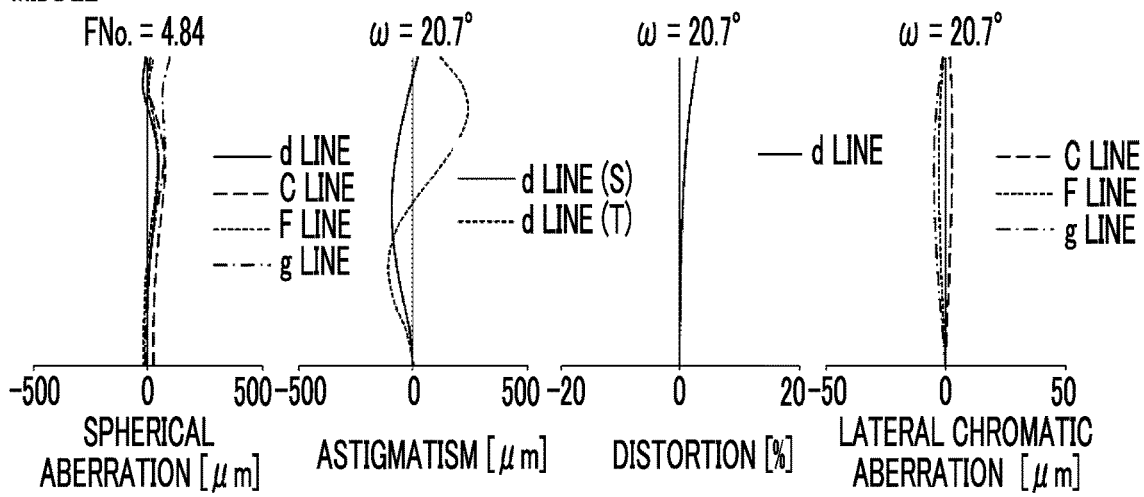
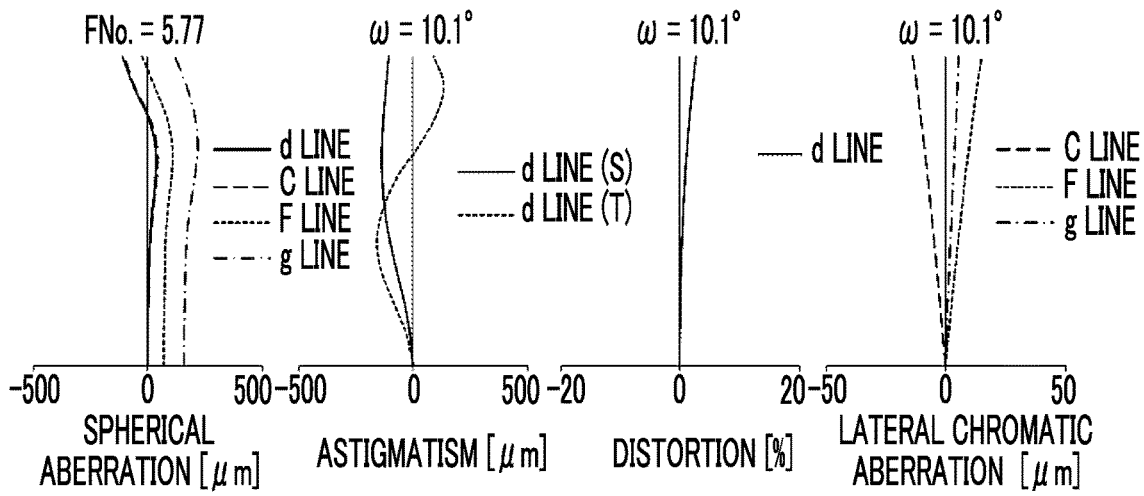

FIG. 23
EXAMPLE 11
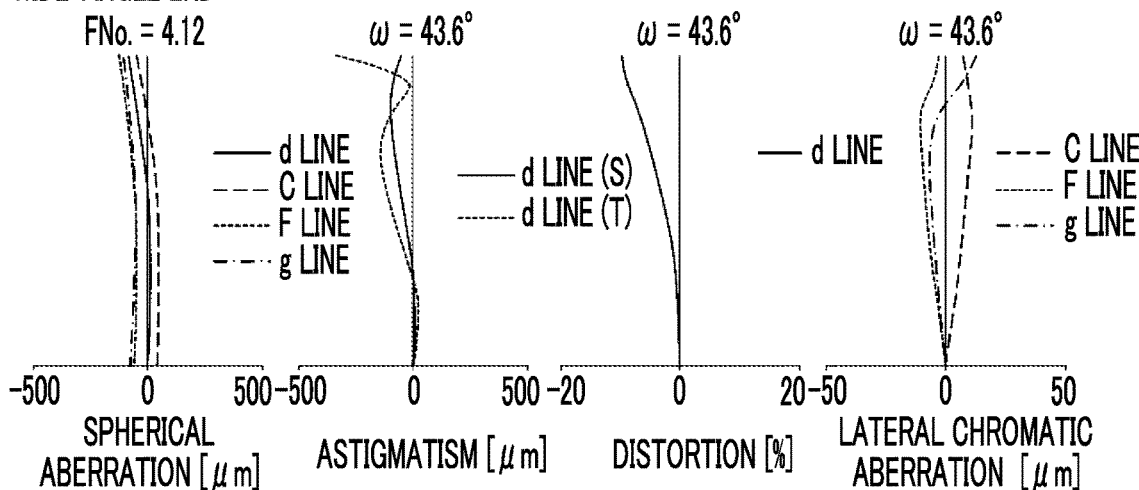
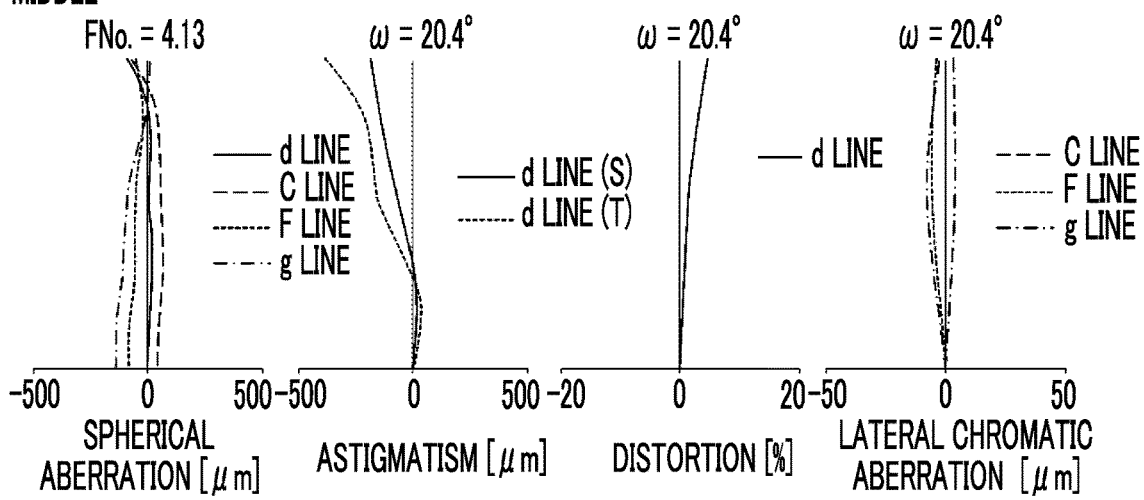
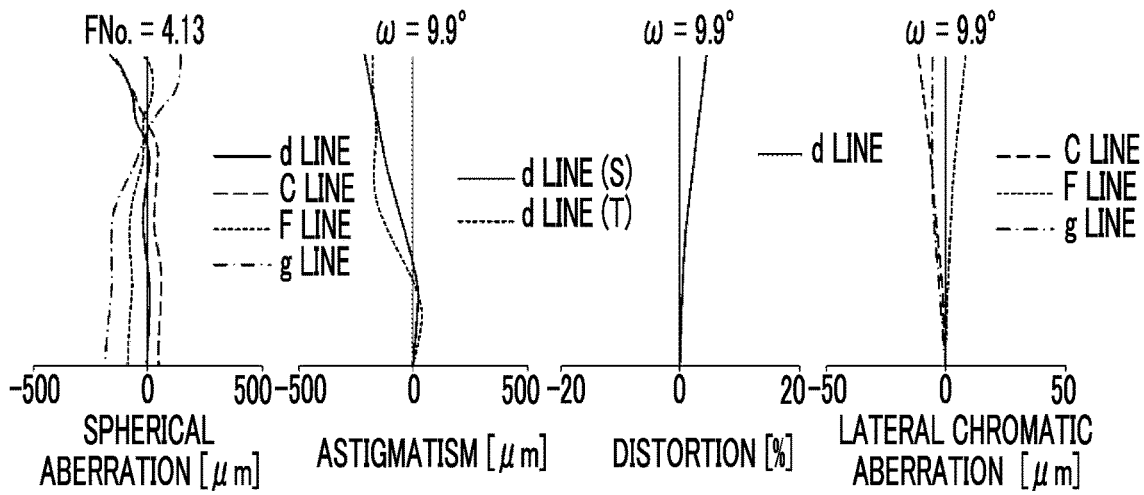

ZOOM LENS AND IMAGING APPARATUS

CROSS-REFERENCE TO RELATED APPLICATIONS

The present application is a Continuation of U.S. patent application Ser. No. 16/689,242, filed Nov. 20, 2019, now U.S. Pat. No. 11,300,764 issued Apr. 12, 2022, which claims priority under 35 U.S.C. § 119 to Japanese Patent Application No. 2018-221597, filed on Nov. 27, 2018. The above application is hereby expressly incorporated by reference, in its entirety, into the present application.

BACKGROUND OF THE INVENTION

1. Field of the Invention

The present disclosure relates to a zoom lens and an imaging apparatus.

2. Description of the Related Art

In the related art, as a zoom lens applicable to a digital camera or the like, in order from the object side, a zoom lens having a five-group configuration has been known. The zoom lens consists of a first lens group having a positive refractive power, a second lens group having a negative refractive power, a third lens group having a positive refractive power, a fourth lens group having a negative refractive power, and a fifth lens group having a positive refractive power. For example, JP2017-156426A and JP2017-053889A describe zoom lenses having the above-mentioned configuration.

SUMMARY OF THE INVENTION

The zoom lens having the above-mentioned configuration is mostly used for a so-called standard zoom lens that covers a wide-angle range to a standard range or a middle telephoto range. In recent years, there has been an increase in demand for a wide angle of view at the wide-angle end and for the entire optical system to be made more compact while ensuring high optical performance. Further, even in a case where the angle of view at the wide-angle end increases, it is required to have a high zoom ratio in order to ensure a long focal length at the telephoto end.

However, the zoom lenses of Examples 1 and 2 described in JP2017-156426A have a long total optical length at the wide-angle end with respect to the maximum image height. In the zoom lens of Example 3 described in JP2017-156426A, the first lens group has two lenses, and it cannot be said that the angle of view at the wide-angle end is sufficiently wide, and the total optical length at the wide-angle end with respect to the maximum image height is long. In the zoom lenses of Examples 4 to 8 described in JP2017-156426A, the first lens group consists of one lens, and it is difficult to correct spherical aberration and longitudinal chromatic aberration at the telephoto end. Thus, the high zoom ratio is not ensured. Most of the zoom lenses described in JP2017-053889A each have a long back focal length and a long total optical length as a whole.

The present disclosure has been made in consideration of the above-mentioned situations, and it is the object of the present disclosure to provide a zoom lens, which is reduced in size and has favorable optical performance while ensuring a wide angle of view and a high zoom ratio, and an imaging apparatus including the zoom lens.

According to an aspect of the present disclosure, there is provided a zoom lens comprising, as lens groups, only five lens groups consisting of, in order from an object side to an image side: a first lens group that has a positive refractive power; a second lens group that has a negative refractive power; a third lens group that has a positive refractive power; a fourth lens group that has a negative refractive power; and a fifth lens group that has a positive refractive power. An aperture stop is disposed between a lens surface closest to the image side in the second lens group and a lens surface closest to the object side in the fourth lens group. During zooming, by changing all distances between lens groups adjacent to each other in a direction of an optical axis, at least the first lens group, the second lens group, the third lens group, and the fourth lens group move along the optical axis. The first lens group consists of, in order from the object side to the image side, a first lens having a negative refractive power, a second lens having a positive refractive power, and a third lens having a positive refractive power. Assuming that a focal length of the first lens group is f1, a focal length of the fifth lens group is f5, a focal length of the fourth lens group is f4, and a refractive index of the second lens at a d line is Nd2, Conditional Expressions (1), (2), and (3) are satisfied, which are represented by $$0.4 < f1/f5 < 2 \quad (1),$$

$$-0.7 < f4/f5 < -0.1 \quad (2), \text{ and}$$

$$1.6 < Nd2 < 2 \quad (3).$$

In the zoom lens of the above-mentioned aspect, assuming that a back focal length at an air conversion distance in a state where the object at infinity is in focus at a wide-angle end is BFw, and a sum of a distance on the optical axis from a lens surface closest to the object side to a lens surface closest to the image side and the back focal length at the air conversion distance in the state where the object at infinity is in focus at the wide-angle end is TLw, it is preferable to satisfy Conditional Expression (4) represented by $$0.07 < BFw/TLw < 0.25 \quad (4).$$

In the zoom lens of the above-mentioned aspect, it is preferable that the entire third lens group or a part of the third lens group moves in a direction intersecting with the optical axis for image blur correction.

In the zoom lens of the above-mentioned aspect, it is preferable that the third lens group consists of, in order from the object side to the image side, a third lens group front group having a positive refractive power and a third lens group rear group having a positive refractive power. In addition, it is preferable that only the third lens group rear group moves in a direction intersecting with the optical axis for image blur correction. In this configuration, it is preferable that the third lens group front group consists of two positive lenses and one negative lens. In this configuration, assuming that a focal length of the third lens group rear group is f3R, a focal length of the third lens group front group is f3F, a lateral magnification of the third lens group rear group in a state where the object at infinity is in focus at a telephoto end is β3Rt, a combined lateral magnification of the fourth lens group and the fifth lens group in the state where the object at infinity is in focus at the telephoto end is β45t, and an Abbe number of the at least one positive lens in the third lens group rear group based on the d line is vd3Rp, it is preferable to satisfy at least one of Conditional Expressions (5), (6), or (7) represented by $$0.1 < f3R/f3F < 0.9 \quad (5),$$

$$2 < (1-\beta 3Rt) \times \beta 45t < 5 \quad (6), \text{ and}$$

$$65 < \nu d3Rp < 105 \quad (7).$$

In the zoom lens of the above-mentioned aspect, only the fourth lens group may move along the optical axis during focusing from an object at infinity to a close-range object. In this configuration, assuming that a lateral magnification of the fourth lens group in a state where the object at infinity is in focus at a telephoto end is β4t, and a lateral magnification of the fifth lens group in the state where the object at infinity is in focus at the telephoto end is β5t, it is preferable to satisfy Conditional Expression (8) represented by $$-7 < (1-\beta 4t^2) \times \beta 5t^2 < -2.6 \quad (8).$$

In the zoom lens of the above-mentioned aspect, the fourth lens group may consist of one positive lens and one negative lens. In this configuration, assuming that an Abbe number of the negative lens of the fourth lens group based on the d line is νd4n, and an Abbe number of the positive lens of the fourth lens group based on the d line is νd4p, it is preferable to satisfy Conditional Expression (9) represented by $$5 < \nu d4n - \nu d4p < 26 \quad (9).$$

In the zoom lens of the above-mentioned aspect, assuming that a sum of a distance on the optical axis from a lens surface closest to the object side to a lens surface closest to the image side and a back focal length at an air conversion distance in a state where an object at infinity is in focus at a wide-angle end is TLw, and a maximum image height is Y, it is preferable to satisfy Conditional Expression (10) represented by $$6 < TLw/|Y| < 8.6 \quad (10).$$

In the zoom lens of the above-mentioned aspect, assuming that a distance on the optical axis between the fourth lens group and the fifth lens group in a state where an object at infinity is in focus at a telephoto end is D45t, and a distance on the optical axis between the fourth lens group and the fifth lens group in the state where the object at infinity is in focus at the wide-angle end is D45w, it is preferable to satisfy Conditional Expression (11) represented by $$2 < D45t/D45w < 13 \quad (11).$$

In the zoom lens of the above-mentioned aspect, assuming that a back focal length at an air conversion distance in a state where an object at infinity is in focus at a wide-angle end is BFw, a focal length of the zoom lens in the state where the object at infinity is in focus at the wide-angle end is fw, and a maximum half angle of view in the state where the object at infinity is in focus at the wide-angle end is ωw, it is preferable to satisfy Conditional Expression (12) represented by $$0.5 < BFw/(fw \times \tan|\omega w|) < 1.6 \quad (12).$$

In the zoom lens of the above-mentioned aspect, assuming that an average of the refractive index of the second lens at the d line and a refractive index of the third lens at the d line is NdG1p, it is preferable to satisfy Conditional Expression (13) represented by $$1.63 < NdG1p < 1.9 \quad (13).$$

In the zoom lens of the above-mentioned aspect, assuming that a focal length of the second lens group is f2, and a focal length of the third lens group is f3, it is preferable to satisfy Conditional Expression (14) represented by $$-1.3 < f2/f3 < -0.4 \quad (14).$$

In the zoom lens of the above-mentioned aspect, it is preferable that the fifth lens group consists of two positive lenses and one negative lens.

According to another aspect of the present disclosure, there is provided an imaging apparatus comprising the zoom lens of the above-mentioned aspect.

In the present specification, it should be noted that the terms "consisting of ~" and "consists of ~" mean that the lens may include not only the above-mentioned elements but also lenses substantially having no refractive powers, optical elements, which are not lenses, such as a stop, a filter, and a cover glass, and mechanism parts such as a lens flange, a lens barrel, an imaging element, and a camera shaking correction mechanism.

In addition, the term "~ group that has a positive refractive power" in the present specification means that the group has a positive refractive power as a whole. Likewise, the "~ group having a negative refractive power" means that the group has a negative refractive power as a whole. The term "a lens having a positive refractive power" and the term "a positive lens" are synonymous. The term "a lens having a negative refractive power" and the term "negative lens" are synonymous. The "lens group" is not limited to a configuration using a plurality of lenses, but may consist of only one lens.

The "single lens" means one uncemented lens. However, a composite aspheric lens (a lens that consists of a spherical lens and an aspheric layer formed to be bonded to at least one of the object side surface or the image side surface of the spherical lens and that functions as one aspheric lens as a whole) is not regarded as a cemented lens, but is treated as a single lens. The sign of the refractive power and the surface shape of the lens surface of a lens including an aspheric surface are considered in terms of the paraxial region unless otherwise noted.

In this specification, the term "focal length" used in Conditional Expression is a paraxial focal length. The term "back focal length at the air conversion distance" is an air conversion distance on the optical axis from the lens surface closest to the image side to the focal position on the image side. The total optical length is a sum of a back focal length as an air conversion distance and a distance on the optical axis from the lens surface closest to the object side to a lens surface closest to the image side. The values used in Conditional Expressions are values on the d line basis. The partial dispersion ratio θgF between the g line and the F line of a certain lens is defined by θgF=(Ng−NF)/(NF−NC), where Ng, NF, and NC are the refractive indices of the lens at the g line, the F line, and the C line. The "d line", "C line", "F line", and "g line" described in the present specification are emission lines. The wavelength of the d line is 587.56 nm (nanometers) and the wavelength of the C line is 656.27 nm (nanometers), the wavelength of F line is 486.13 nm (nanometers), and the wavelength of g line is 435.84 nm (nanometers).

According to the present disclosure, it is possible to provide a zoom lens, which is reduced in size and has favorable optical performance while ensuring a wide angle of view and a high zoom ratio, and an imaging apparatus including the zoom lens.

BRIEF DESCRIPTION OF THE DRAWINGS

FIG. 12 is a cross-sectional view showing a configuration and rays of the zoom lens according to Example 1 of the present disclosure.

FIG. 13 shows spherical aberration diagrams, astigmatism diagrams, distortion diagrams, lateral chromatic aberration diagrams of the zoom lens of Example 1 of the present disclosure.

FIG. 14 shows spherical aberration diagrams, astigmatism diagrams, distortion diagrams, lateral chromatic aberration diagrams of the zoom lens of Example 2 of the present disclosure.

FIG. 15 shows spherical aberration diagrams, astigmatism diagrams, distortion diagrams, lateral chromatic aberration diagrams of the zoom lens of Example 3 of the present disclosure.

FIG. 16 shows spherical aberration diagrams, astigmatism diagrams, distortion diagrams, lateral chromatic aberration diagrams of the zoom lens of Example 4 of the present disclosure.

FIG. 17 shows spherical aberration diagrams, astigmatism diagrams, distortion diagrams, lateral chromatic aberration diagrams of the zoom lens of Example 5 of the present disclosure.

FIG. 18 shows spherical aberration diagrams, astigmatism diagrams, distortion diagrams, lateral chromatic aberration diagrams of the zoom lens of Example 6 of the present disclosure.

FIG. 19 shows spherical aberration diagrams, astigmatism diagrams, distortion diagrams, lateral chromatic aberration diagrams of the zoom lens of Example 7 of the present disclosure.

FIG. 20 shows spherical aberration diagrams, astigmatism diagrams, distortion diagrams, lateral chromatic aberration diagrams of the zoom lens of Example 8 of the present disclosure.

FIG. 21 shows spherical aberration diagrams, astigmatism diagrams, distortion diagrams, lateral chromatic aberration diagrams of the zoom lens of Example 9 of the present disclosure.

FIG. 22 shows spherical aberration diagrams, astigmatism diagrams, distortion diagrams, lateral chromatic aberration diagrams of the zoom lens of Example 10 of the present disclosure.

FIG. 23 shows spherical aberration diagrams, astigmatism diagrams, distortion diagrams, lateral chromatic aberration diagrams of the zoom lens of Example 11 of the present disclosure.

DESCRIPTION OF THE PREFERRED EMBODIMENTS

Figure 1:
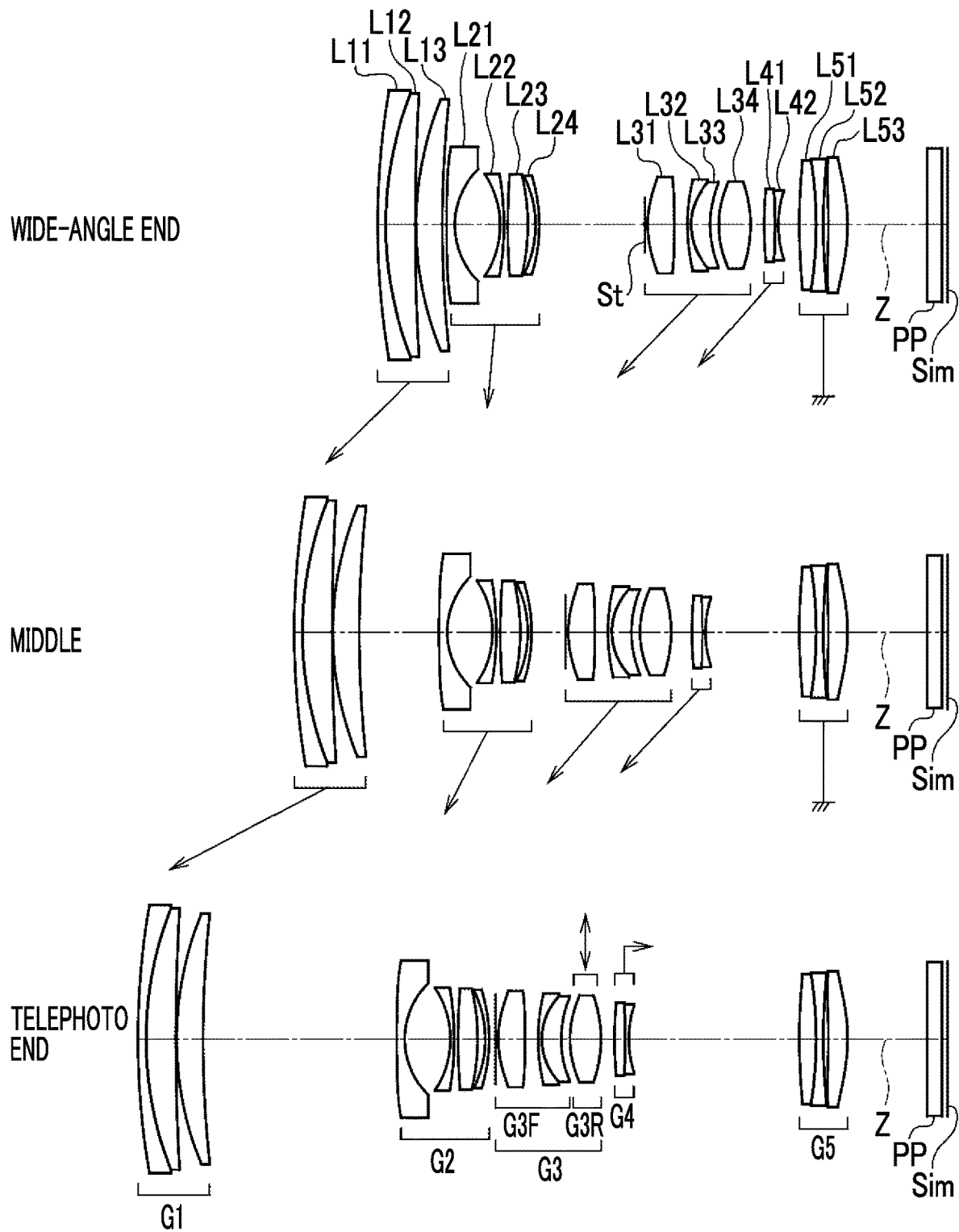
FIG. 1 is a cross-sectional view showing a configuration of a zoom lens according to an embodiment of the present disclosure corresponding to the zoom lens of Example 1 of the present disclosure.

Hereinafter, embodiments of the technology of the present disclosure will be described in detail with reference to the drawings. FIG. 1 is a cross-sectional view of a lens configuration in each zoom state of a zoom lens according to an embodiment of the present disclosure. FIG. 12 is a cross-sectional view of a lens configuration and rays in each zoom state of the zoom lens shown in FIG. 1. The examples shown in FIGS. 1 and 12 correspond to the zoom lens of Example 1 to be described later. In FIGS. 1 and 12, the left side is the object side, the right side is the image side, and a state where an object at infinity is in focus is shown. The upper part labeled "WIDE-ANGLE END" indicates the wide-angle end state, the middle part labeled "MIDDLE" indicates the middle focal length state, and the lower part labeled "TELE-PHOTO END" indicates the telephoto end state. FIG. 12 shows on-axis rays wa and rays with the maximum angle of view wb and wc as the rays in the wide-angle end state, shows on-axis rays ma and rays with the maximum angle of view mb and me as the rays in the middle focal length state, and shows an on-axis rays ta and rays with the maximum angle of view tb and tc as the rays in the telephoto end state. The rays with the maximum angle of view wb, mb, and tb are rays corresponding to the maximum image height on the negative side, and the rays with the maximum angle of view wc, mc, and tc are rays corresponding to the maximum image height on the positive side. Here, the positive side and negative side of the image height are the upper side and the lower side of the optical axis Z in FIG. 12. Hereinafter, description will be given mainly with reference to FIG. 1.

FIGS. 1 and 12 show an example in which, assuming that a zoom lens is applied to an imaging apparatus, an optical member PP having a parallel plate shape is disposed between the zoom lens and the image plane Sim. The optical member PP is a member assumed to include at various filters, a cover glass, and/or the like. The various filters include, for example, a low pass filter, an infrared cut filter, and a filter that cuts a specific wavelength region. The optical member PP has no refractive power, and the optical member PP may be configured to be omitted.

The zoom lens of the present disclosure comprises, as lens groups, only five lens groups consisting of, in order from an object side to an image side along the optical axis Z: a first lens group G1 that has a positive refractive power; a second lens group G2 that has a negative refractive power; a third lens group G3 that has a positive refractive power; a fourth lens group G4 that has a negative refractive power; and a fifth lens group G5 that has a positive refractive power. In the zoom lens of the present disclosure, an aperture stop St is disposed between a lens surface closest to the image side in the second lens group G2 and a lens surface closest to the object side in the fourth lens group G4. However, the aperture stop St shown in FIG. 1 does not indicate a shape thereof, but indicates a position thereof on the optical axis.

The zoom lens of the present disclosure employs arrangement of positive, negative, positive, and negative refractive powers in order from the object side to the image side. Since the refractive power arrangement of the lens system is symmetric with respect to the third lens group G3, it is possible to satisfactorily correct distortion and lateral chromatic aberration. Thereby, it is possible to ensure a wide angle of view at the wide-angle end.

In the zoom lens of the present disclosure, during zooming, by changing all the distances between lens groups adjacent to each other in a direction of the optical axis, at least the first lens group G1, the second lens group G2, the third lens group G3, and the fourth lens group G4 move along the optical axis Z. In the example shown in FIG. 1, during zooming, the first lens group G1 to the fourth lens group G4 move along the optical axis Z along different loci, and the fifth lens group G5 remains stationary with respect to the image plane Sim. In the upper diagram and the middle diagram in FIG. 1, the schematic movement direction of each lens group during zooming to the long focal length side is indicated by an arrow below each lens group that moves during zooming. A ground symbol is shown below the lens group remaining stationary with respect to the image plane Sim during zooming.

The first lens group G1 consists of, in order from the object side to the image side, three lenses including a first lens L11 having a negative refractive power, a second lens L12 having a positive refractive power, and a third lens L13 having a positive refractive power. Since the first lens group G1 has the above-mentioned three-lens configuration, it becomes easy to satisfactorily correct spherical aberration and longitudinal chromatic aberration at the telephoto end, and field curvature and distortion at the wide-angle end. There is an advantage in achieving an increase in zoom ratio and an increase in angle of view at the wide-angle end. The first lens L11 and the second lens L12 may be cemented with each other. In such a configuration, there is a greater advantage in correcting longitudinal chromatic aberration at the telephoto end.

For example, in the zoom lens of the example shown in FIG. 1, the second lens group G2 consists of four lenses L21 to L24 in order from the object side to the image side, the third lens group G3 consists of four lenses L31 to L34 in order from the object side to the image side, the fourth lens group G4 consists of two lenses L41 and L42 in order from the object side to the image side, and the fifth lens group G5 consists of three lenses L51 to L53 in order from the object side to the image side. However, the number of lenses composing each of the second lens group G2 to the fifth lens group G5 may be different from the example shown in FIG. 1.

The second lens group G2 can be configured to consist of, for example, three negative lenses and one positive lens. In such a configuration, the negative refractive power of the second lens group G2 can be shared by the three negative lenses, and thus, there is an advantage in correcting coma aberration and astigmatism. In addition, the second lens group G2 includes a negative lens and a positive lens, and thus it becomes easy to correct chromatic aberration. More specifically, the second lens group G2 may be configured to consist of a negative lens, a negative lens, a positive lens, and a negative lens in order from the object side to the image side.

The third lens group G3 is preferably configured to have an image blur correction function. It is preferable that the entire third lens group G3 or a part of the third lens group G3 moves in a direction intersecting with the optical axis Z for image blur correction. That is, it is preferable that the entire third lens group G3 or a part of the third lens group G3 moves in a direction intersecting with the optical axis Z during image blur correction. Hereinafter, a lens group that moves during image blur correction will be referred to as a vibration reduction lens group.

In order to reduce the size of the zoom lens having arrangement of positive, negative, positive, and negative refractive powers in order from the object side to the image side, there is an advantage in increasing the positive refractive power of the third lens group G3. In such a configuration, by providing the vibration reduction lens group in the third lens group G3, it becomes easy to ensure the refractive power of the vibration reduction lens group. As a result, it is possible to reduce the amount of movement of the vibration reduction lens group during image blur correction. Further, since the aperture stop St is disposed in the above range, the off-axis ray height in the third lens group G3 becomes low. By providing the vibration reduction lens group in the third lens group G3 having a low off-axis ray height, it is possible to reduce the diameter of the vibration reduction lens group. Thereby, it is possible to reduce the load on the driving system that drives the vibration reduction lens group, and thereby this configuration is able to contribute to reduction in size of the apparatus. In order to reduce the load on the driving system of the vibration reduction lens group, it is preferable that the vibration reduction lens group is only the entire third lens group G3 or only a part of the third lens group G3.

In a case where the vibration reduction lens group is disposed in the third lens group G3, the third lens group G3 consists of a third lens group front group G3F having a positive refractive power and a third lens group rear group G3R having a positive refractive power in order from the object side to the image side. Thus, it is preferable that only the third lens group rear group G3R moves in a direction intersecting with the optical axis Z for image blur correction. With the above-mentioned configuration, the rays converged through the positive refractive power of the third lens group front group G3F can be made incident on the third lens group rear group G3R which is the vibration reduction lens group. Thus, it is possible to keep the diameter of the vibration reduction lens group small.

It should be noted that in the zoom lens having arrangement of positive, negative, positive and negative refractive powers in order from the object side to the image side, the third lens group G3 mainly takes charge of the convergence effect of the whole system. Thus, in order to achieve reduction in size, it is necessary to increase the refractive power of the three lens group G3. In a case where the refractive powers of the third lens group front group G3F and the third lens group rear group G3R are different from each other, it is difficult to ensure the refractive power of the third lens group G3 as a whole. Thus, this configuration is not preferable. Alternatively, the refractive power of the lens group on the image side from the third lens group G3 has to be increased. Thus, it is difficult to satisfactorily correct various aberrations such as spherical aberration. Thus, this configuration is not preferable. From the above situations, it is preferable to make the refractive powers of both the third lens group front group G3F and the third lens group rear group G3R positive.

In a case where the third lens group G3 consists of the above-mentioned third lens group front group G3F and the third lens group rear group G3R and only the third lens group rear group G3R is used as the vibration reduction lens group, it is preferable that the third lens group rear group G3R consists of one positive lens. By composing the third lens group rear group G3R, which is a vibration reduction lens group, of a single lens, the vibration reduction lens group can be reduced in size and weight, and the load on the driving system of the vibration reduction lens group can be reduced. As a result, the actuator can be reduced in size, and thus the entire apparatus can be reduced in size.

It is preferable that the third lens group front group G3F consists of two positive lenses and one negative lens. By forming the third lens group front group G3F configured as described above, it becomes easy to satisfactorily correct spherical aberration and chromatic aberration, even in a case where the refractive power of the third lens group front group G3F is increased for reduction in size, or even in a case where the refractive power of the third lens group front group G3F is increased in order to reduce the ray height of rays incident on the third lens group rear group G3R which is a vibration reduction lens group. Further, by not increasing the number of lenses in the third lens group front group G3F more than that in the above-mentioned configuration, there is an advantage in achieving reduction in size of the whole system.

In the example shown in FIG. 1, the third lens group front group G3F consists of lenses L31 to L33, and the third lens group rear group G3R consists of a lens L34. The vertical double arrow noted above the lens L34 in the lower diagram of FIG. 1 indicates that the lens L34 constitutes a vibration reduction lens group. In the upper and middle diagrams of FIG. 1, the arrows indicating the vibration reduction lens groups are omitted in order to avoid complication of the diagram.

It is preferable that the fourth lens group G4 consists of one positive lens and one negative lens. In such a case, chromatic aberration generated in the fourth lens group G4 can be corrected satisfactorily. In addition, since the fourth lens group G4 consists of only two lenses, there is an advantage in achieving reduction in the size of the whole system. In a case where the fourth lens group G4 consists of only the two lenses, the two lenses may be cemented to each other, and there is a greater advantage in achieving reduction in size in the case of cementing the lenses.

It is preferable that the fourth lens group G4 is configured to perform focusing by moving along the optical axis Z. That is, it is preferable that only the fourth lens group G4 of the five lens groups moves along the optical axis Z during focusing from the object at infinity to the close-range object. Hereinafter, the lens group that moves during focusing is referred to as a focusing lens group. In the example shown in FIG. 1, the fourth lens group G4 moves to the image side during focusing from the object at infinity to the close-range object. The arrow pointing in the right direction noted above the fourth lens group G4 in the lower diagram of FIG. 1 indicates that the fourth lens group G4 is a focusing lens group that moves to the image side during focusing from the object at infinity to the close-range object. In the upper and middle diagrams of FIG. 1, the arrow indicating a focusing lens group is omitted in order to avoid complication of the diagram.

The fourth lens group G4 is a group disposed between two lens groups, such as a third lens group G3 and a fifth lens group G5, having positive refractive powers, and therefore it becomes easy to reduce the outer lens diameter. By forming the fourth lens group G4 as a focusing lens group, it becomes easy to achieve reduction in size and weight of the focusing lens group. As a result, there is an advantage in achieving high-speed autofocusing, and it is possible to reduce the load on the driving system of the focusing lens group.

For example, the fifth lens group G5 can be configured to consist of two positive lenses and one negative lens. In such as case, there is an advantage in satisfactorily correcting lateral chromatic aberration and field curvature. In the above case where the fifth lens group G5 consists of three lenses, the fifth lens group G5 may be configured to consist of, in order from the object side to the image side, a cemented lens, in which a positive lens and a negative lens are cemented in order from the object side, and a single lens which has a positive refractive power.

Alternatively, the fifth lens group G5 can be configured to consist of one positive lens. In such a case, there is an advantage in reduction in size.

The fifth lens group G5 may be configured to remain stationary with respect to the image plane Sim during zooming. By adopting a configuration in which the lens group disposed to be closest to the image side remains stationary during zooming, intrusion of dust and the like can be reduced.

Alternatively, the fifth lens group G5 may be configured to move along the optical axis Z during zooming. In such a case, the degree of freedom of aberration correction increases, and the optical performance can be further improved.

Next, a configuration relating to Conditional Expressions will be described. In the zoom lens of the present disclosure, assuming that a focal length of the first lens group G1 is f1 and a focal length of the fifth lens group G5 is f5, it is preferable to satisfy Conditional Expression (1). By not allowing the result of Conditional Expression (1) to be equal to or less than the lower limit value, the refractive power of the first lens group G1 can be prevented from becoming excessively strong. Thus, in particular, it becomes easy to satisfactorily correct the spherical aberration and the longitudinal chromatic aberration at the telephoto end. Alternatively, by not allowing the result of Conditional Expression (1) to be equal to or less than the lower limit value, the refractive power of the fifth lens group G5 can be prevented from becoming excessively weak. Thus, it is possible to prevent the incident angle of the off-axis principal rays incident on the imaging element disposed on the image plane Sim from becoming excessively large. As a result, it is possible to reduce shading. By not allowing the result of Conditional Expression (1) to be equal to or greater than the upper limit value, the refractive power of the first lens group G1 can be prevented from becoming excessively weak. Thus, it is possible to minimize the amount of movement of the first lens group G1 during zooming. As a result, it is possible to reduce the size of the lens system. Alternatively, by not allowing the result of Conditional Expression (1) to be equal to or greater than the upper limit value, the refractive power of the fifth lens group G5 can be prevented from becoming excessively strong. Thus, it becomes easy to satisfactorily correct field curvature and distortion at the wide-angle end. In addition, in a case of a configuration in which Conditional Expression (1-1) is satisfied, it is possible to obtain more favorable characteristics. In a case of a configuration in which Conditional Expression (1-2) is satisfied, it is possible to obtain further more favorable characteristics.

$$0.4 < f1/f5 < 2 \tag{1}$$

$$0.45 < f1/f5 < 1.8 \tag{1-1}$$

$$0.5 < f1/f5 < 1.6 \tag{1-2}$$

In the zoom lens of the present disclosure, assuming that a focal length of the fourth lens group G4 is f4 and a focal length of the fifth lens group G5 is f5, Conditional Expression (2) is satisfied. By not allowing the result of Conditional Expression (2) to be equal to or less than the lower limit value, the refractive power of the fourth lens group G4 can be prevented from becoming excessively weaker than the refractive power of the fifth lens group G5. Thus, it becomes easy to suppress fluctuation in chromatic aberration during zooming while satisfactorily correcting astigmatism and field curvature. By not allowing the result of Conditional Expression (2) to be equal to or greater than the upper limit value, the refractive power of the fourth lens group G4 can be prevented from becoming excessively stronger than the refractive power of the fifth lens group G5. Thus, it becomes easy to satisfactorily correct spherical aberration. In addition, in a case of a configuration in which Conditional Expression (2-1) is satisfied, it is possible to obtain more favorable characteristics. In a case of a configuration in which Conditional Expression (2-2) is satisfied, it is possible to obtain further more favorable characteristics.

$$-0.7 < f4/f5 < -0.1 \tag{2}$$

$$-0.64 < f4/f5 < -0.15 \tag{2-1}$$

$$-0.58 < f4/f5 < -0.2 \tag{2-2}$$

In the zoom lens of the present disclosure, assuming that a refractive index of the second lens L12 at the d line is Nd2, Conditional Expression (3) is satisfied. By not allowing the result of Conditional Expression (3) to be equal to or less than the lower limit value, it becomes easy to achieve reduction in size of the lens system. By not allowing the result of Conditional Expression (3) to be equal to or greater than the upper limit value, it becomes easy to satisfactorily correct longitudinal chromatic aberration. In addition, in a case of a configuration in which Conditional Expression (3-1) is satisfied, it is possible to obtain more favorable characteristics. In a case of a configuration in which Conditional Expression (3-2) is satisfied, it is possible to obtain further more favorable characteristics.

$$1.6 < Nd2 < 2 \tag{3}$$

$$1.62 < Nd2 < 1.96 \tag{3-1}$$

$$1.63 < Nd2 < 1.93 \tag{3-2}$$

It is preferable that the zoom lens of the present disclosure satisfies the following conditional expressions. Assuming that a back focal length at an air conversion distance in a state where an object at infinity is in focus at a wide-angle end is BFw, and a sum of a distance on the optical axis from a lens surface closest to the object side to a lens surface closest to the image side and the back focal length at the air conversion distance in the state where the object at infinity is in focus at the wide-angle end is TLw, it is preferable to satisfy Conditional Expression (4). By not allowing the result of Conditional Expression (4) to be equal to or less than the lower limit value, it becomes easy to ensure the back focal length necessary for the interchangeable lens camera or the like. By not allowing the result of Conditional Expression (4) to be equal to or greater than the upper limit value, the back focal length can be prevented from becoming excessively long, and a range where a lens can be disposed can be set to be increased in the total optical length. Therefore, it is possible to ensure the range of movement of each lens group during zooming. Thereby, the refractive power of each lens group can be prevented from becoming excessively strong. Thus, it becomes easy to ensure favorable optical performance by suppressing various aberrations. In addition, in a case of a configuration in which Conditional Expression (4-1) is satisfied, it is possible to obtain more favorable characteristics.

$$0.07 < BFw/TLw < 0.25 \tag{4}$$

$$0.1 < BFw/TLw < 0.23 \tag{4-1}$$

The third lens group G3 consists of, in order from the object side to the image side, a third lens group front group G3F having a positive refractive power and a third lens group rear group G3R having a positive refractive power, and only the third lens group rear group G3R is the vibration reduction lens group. In such a configuration, the following is preferable. That is, assuming that a focal length of the third lens group rear group G3R is f3R and a focal length of the third lens group front group G3F is f3F, Conditional Expression (5) is satisfied. By not allowing the result of Conditional Expression (5) to be equal to or less than the lower limit value, the refractive power of the third lens group rear group G3R can be prevented from becoming excessively strong. By not allowing the result of Conditional Expression (5) to be equal to or greater than the upper limit value, the refractive power of the third lens group front group G3F can be prevented from becoming excessively strong. By setting f3R/f3F within the range of Conditional Expression (5), the positive refractive power of the third lens group G3 can be appropriately distributed to the third lens group front group G3F and the third lens group rear group G3R. Thus, it is possible to reduce the difference in the spherical aberration curve due to the wavelength during zooming. Further, it is possible to suppress the sensitivity of deterioration in performance due to assembly errors such as relative tilt between the third lens group front group G3F and the third lens group rear group G3R. Furthermore, the sensitivity of image blur correction can be set appropriately, and it is possible to satisfactorily suppress fluctuation in aberrations during image blur correction. In addition, in a case of a configuration in which Conditional Expression (5-1) is satisfied, it is possible to obtain more favorable characteristics.

$$0.1 < f3R/f3F < 0.9 \quad (5)$$

$$0.15 < f3R/f3F < 0.8 \quad (5\text{-}1)$$

The third lens group G3 consists of, in order from the object side to the image side, a third lens group front group G3F having a positive refractive power and a third lens group rear group G3R having a positive refractive power, and only the third lens group rear group G3R is the vibration reduction lens group. In such a configuration, the following is preferable. That is, assuming that a lateral magnification of the third lens group rear group G3R in a state where an object at infinity is in focus at a telephoto end is β3Rt, and a combined lateral magnification of the fourth lens group G4 and the fifth lens group G5 in the state where the object at infinity is in focus at the telephoto end is β45t, Conditional Expression (6) is satisfied. (1−β3Rt)×β45t of Conditional Expression (6) indicates the amount of image movement on the image plane Sim, that is, the vibration reduction sensitivity with respect to the amount of movement of the vibration reduction lens group in the direction perpendicular to the optical axis Z. Conditional Expression (6) is an expression indicating a preferable range of the vibration reduction sensitivity. By not allowing the result of Conditional Expression (6) to be equal to or less than the lower limit value, it is possible to reduce the amount of movement of the vibration reduction lens group during image blur correction. Thereby, by suppressing an increase in the diameter of the vibration reduction lens group, it is possible to reduce the load on the driving system that drives the vibration reduction lens group. By not allowing the result of Conditional Expression (6) to be equal to or greater than the upper limit value, it is possible to suppress the sensitivity of deterioration in performance due to assembly errors such as relative tilt between the vibration reduction lens group and the lens group disposed on the object side and the image side. Further, in a case where the vibration reduction sensitivity becomes excessively high, a problem arises in that it may be difficult to stably perform image blur correction. However, by not allowing the result of Conditional Expression (6) to be equal to or greater than the upper limit value, such a problem can be prevented. In addition, in a case of a configuration in which Conditional Expression (6-1) is satisfied, it is possible to obtain more favorable characteristics.

$$2 < (1-\beta 3Rt) \times \beta 45t < 5 \quad (6)$$

$$2.3 < (1-P3Rt) \times \beta 45t < 4.5 \quad (6\text{-}1)$$

The third lens group G3 consists of, in order from the object side to the image side, a third lens group front group G3F having a positive refractive power and a third lens group rear group G3R having a positive refractive power, and only the third lens group rear group G3R is the vibration reduction lens group. In such a configuration, the following is preferable. That is, assuming that Abbe number of at least one positive lens included in the third lens group rear group G3R based on the d line is vd3Rp, Conditional Expression (7) is satisfied. By not allowing the result of Conditional Expression (7) to be equal to or less than the lower limit value, it is possible to suppress fluctuation in chromatic aberration during image blur correction. By not allowing the result of Conditional Expression (7) to be equal to or greater than the upper limit value, the refractive index of the material composing the positive lens can be prevented from becoming excessively low, and the lens can be made thinner. Therefore, this configuration is able to contribute to reduction in size. In addition, in a case of a configuration in which Conditional Expression (7-1) is satisfied, it is possible to obtain more favorable characteristics. In a case of a configuration in which Conditional Expression (7-2) is satisfied, it is possible to obtain further more favorable characteristics.

$$65 < vd3Rp < 105 \quad (7)$$

$$72 < vd3Rp > 100 \quad (7\text{-}1)$$

$$80 < vd3Rp > 98 \quad (7\text{-}2)$$

In a configuration in which only the fourth lens group G4 is used as the focusing lens group, assuming that a lateral magnification of the fourth lens group G4 in a state where an object at infinity is in focus at a telephoto end is β4t, and a lateral magnification of the fifth lens group G5 in the state where the object at infinity is in focus at the telephoto end is β5t, it is preferable to satisfy Conditional Expression (8). $(1-\beta 4t^2) \times \beta 5t^2$ of Conditional Expression (8) indicates the amount of focus shift, that is, the focus sensitivity with respect to the amount of movement of the fourth lens group G4 in the direction of the optical axis, which is the focusing lens group, at the telephoto end. Conditional Expression (8) is an expression indicating a preferable range of the focus sensitivity. By not allowing the result of Conditional Expression (8) to be equal to or less than the lower limit value, it is possible to suppress the sensitivity of deterioration in performance to the eccentric error of the fourth lens group G4. Further, by not allowing the result of Conditional Expression (8) to be equal to or less than the lower limit value, the refractive power of the fourth lens group G4 is easily prevented from becoming excessively strong. Thus, there is an advantage in satisfactorily correcting spherical aberration. By not allowing the result of Conditional Expression (8) to be equal to or greater than the upper limit value, the amount of movement of the fourth lens group G4 during focusing can be reduced, and the speed of autofocusing can be increased or the shortest imaging distance can be reduced. In addition, in a case of a configuration in which Conditional Expression (8-1) is satisfied, it is possible to obtain more favorable characteristics. In a case of a configuration in which Conditional Expression (8-2) is satisfied, it is possible to obtain further more favorable characteristics.

$$-7 < (1-\beta 4t^2) \times \beta 5t^2 < -2.6 \quad (8)$$

$$-6.5 < (1-\beta 4t^2) \times \beta 5t^2 < -2.8 \quad (8\text{-}1)$$

$$-6.2 < (1-\beta 4t^2) \times \beta 5t^2 < -3 \quad (8\text{-}2)$$

In a configuration in which the fourth lens group G4 consists of one positive lens and one negative lens, assuming that an Abbe number of the negative lens of the fourth lens group G4 based on the d line is vd4n, and an Abbe number of the positive lens of the fourth lens group G4 based on the d line is vd4p, it is preferable to satisfy Conditional Expression (9). By not allowing the result of Conditional Expression (9) to be equal to or less than the lower limit value, the difference between the dispersion of the positive lens and the dispersion of the negative lens composing the fourth lens group G4 is prevented from becoming excessively small. As a result, it is possible to satisfactorily correct chromatic aberration, particularly, lateral chromatic aberration. By not allowing the result of Conditional Expression (9) to be equal to or greater than the upper limit value, the refractive index of the material used for the negative lens of the fourth lens group G4 can be prevented from becoming lower. Therefore, there is an advantage in satisfactorily correcting field curvature. In addition, in a case of a configuration in which Conditional Expression (9-1) is satisfied, it is possible to obtain more favorable characteristics.

$$5 < vd4n - vd4p < 26 \tag{9}$$

$$7 < vd4n - vd4p < 24 \tag{9-1}$$

Assuming that a sum of the distance on the optical axis from the lens surface closest to the object side to the lens surface closest to the image side and the back focal length at the air conversion distance in a state where an object at infinity is in focus at a wide-angle end is TLw, and a maximum image height is Y, it is preferable to satisfy Conditional Expression (10). For example, the maximum image height Y is shown in FIG. 12. By not allowing the result of Conditional Expression (10) to be equal to or less than the lower limit value, the refractive power of each group can be prevented from becoming excessively strong. Therefore, it becomes easy to satisfactorily correct various aberrations such as spherical aberration. Alternatively, by not allowing the result of Conditional Expression (10) to be equal to or less than the lower limit value, a lens necessary for ensuring high optical performance and/or a high zoom ratio can be disposed. By not allowing the result of Conditional Expression (10) to be equal to or greater than the upper limit value, the lens system can be configured to have a small size. In addition, in a case of a configuration in which Conditional Expression (10-1) is satisfied, it is possible to obtain more favorable characteristics. In a case of a configuration in which Conditional Expression (10-2) is satisfied, it is possible to obtain further more favorable characteristics.

$$6 < TLw/|Y| < 8.6 \tag{10}$$

$$6.2 < TLw/|Y| < 8 \tag{10-1}$$

$$6.4 < TLw/|Y| < 7.6 \tag{10-2}$$

Assuming that a distance on the optical axis between the fourth lens group G4 and the fifth lens group G5 in a state where an object at infinity is in focus at a telephoto end is D45t, and a distance on the optical axis between the fourth lens group G4 and the fifth lens group G5 in the state where the object at infinity is in focus at the wide-angle end is D45w, it is preferable to satisfy Conditional Expression (11). By not allowing the result of Conditional Expression (11) to be equal to or less than the lower limit value, it is possible to satisfactorily suppress fluctuation in field curvature during zooming. By not allowing the result of Conditional Expression (11) to be equal to or greater than the upper limit value, it is possible to reduce fluctuation in chromatic aberration during zooming. In addition, in a case of a configuration in which Conditional Expression (11-1) is satisfied, it is possible to obtain more favorable characteristics.

$$2 < D45t/D45w < 13 \tag{11}$$

$$3 < D45t/D45w < 12 \tag{11-1}$$

Assuming that a back focal length at an air conversion distance in a state where an object at infinity is in focus at a wide-angle end is BFw, a focal length of the zoom lens in the state where the object at infinity is in focus at the wide-angle end is fw, and a maximum half angle of view in the state where the object at infinity is in focus at the wide-angle end is ωw, it is preferable to satisfy Conditional Expression (12). For example, FIG. 12 shows the maximum half angle of view ωw. By not allowing the result of Conditional Expression (12) to be equal to or less than the lower limit value, it is possible to ensure the back focal length necessary for the interchangeable lens camera or the like. By not allowing the result of Conditional Expression (12) to be equal to or greater than the upper limit value, the back focal length can be prevented from becoming excessively long, and a range where a lens can be disposed can be set to be increased in the total optical length. Therefore, it is possible to ensure the range of movement of each lens group during zooming. Thereby, the refractive power of each lens group can be prevented from becoming excessively strong. Thus, it becomes easy to ensure favorable optical performance by suppressing various aberrations. In addition, in a case of a configuration in which Conditional Expression (12-1) is satisfied, it is possible to obtain more favorable characteristics. In a case of a configuration in which Conditional Expression (12-2) is satisfied, it is possible to obtain further more favorable characteristics.

$$0.5 < BFw/(fw \times \tan|\omega w|) < 1.6 \tag{12}$$

$$0.6 < BFw/(fw \times \tan|\omega w|) < 1.5 \tag{12-1}$$

$$0.7 < BFw/(fw \times \tan|\omega w|) < 1.4 \tag{12-2}$$

Assuming that an average of a refractive index of the second lens L12 at the d line and a refractive index of the third lens L13 at the d line in the first lens group G1 is NdG1p, it is preferable to satisfy Conditional Expression (12). By not allowing the result of Conditional Expression (12) to be equal to or less than the lower limit value, it becomes easy to achieve reduction in size of the lens system. By not allowing the result of Conditional Expression (13) to be equal to or greater than the upper limit value, it becomes easy to satisfactorily correct longitudinal chromatic aberration. In addition, in a case of a configuration in which Conditional Expression (13-1) is satisfied, it is possible to obtain more favorable characteristics.

$$1.63 < NdG1p < 1.9 \tag{13}$$

$$1.64 < NdG1p < 1.85 \tag{13-1}$$

Assuming that a focal length of the second lens group G2 is f2, and a focal length of the third lens group G3 is f3, it is preferable to satisfy Conditional Expression (14). By not allowing the result of Conditional Expression (14) to be equal to or less than the lower limit value, the amount of movement of the second lens group G2 during zooming can be reduced, or the second lens group G2 can be formed to have a strong zooming effect. By not allowing the result of Conditional Expression (14) to be equal to or greater than the upper limit value, in particular, it becomes easy to satisfactorily correct lateral chromatic aberration at the wide-angle end. In addition, in a case of a configuration in which Conditional Expression (14-1) is satisfied, it is possible to obtain more favorable characteristics.

$$-1.3 < f2/f3 < -0.4 \quad (14)$$

$$-1.1 < f2/f3 < -0.5 \quad (14\text{-}1)$$

Assuming that a focal length of the first lens group G1 is f1, and a focal length of the second lens group G2 is f2, it is preferable to satisfy Conditional Expression (15). By not allowing the result of Conditional Expression (15) to be equal to or less than the lower limit value, the amount of movement of the first lens group G1 during zooming and the effective diameter of the lens closest to the object side are reduced. As a result, it becomes easy to achieve reduction in size of the whole system. By not allowing the result of Conditional Expression (15) to be equal to or greater than the upper limit value, it becomes easy to satisfactorily correct the spherical aberration and the longitudinal chromatic aberration at the telephoto end. In addition, in a case of a configuration in which Conditional Expression (15-1) is satisfied, it is possible to obtain more favorable characteristics. In a case of a configuration in which Conditional Expression (15-2) is satisfied, it is possible to obtain further more favorable characteristics.

$$-8 < f1/f2 < -3 \quad (15)$$

$$-7.3 < f1/f2 < -3.5 \quad (15\text{-}1)$$

$$-6.6 < f1/f2 < -4 \quad (15\text{-}2)$$

Assuming that a focal length of the third lens group G3 is f3 and a focal length of the fourth lens group G4 is f4, it is preferable to satisfy Conditional Expression (16). The third lens group G3 and the fourth lens group G4 are lens groups each of which has a relatively high ray height of the on-axis marginal rays. By satisfying Conditional Expression (16), the ratio between a positive refractive power of the third lens group G3 and a negative refractive power of the fourth lens group G4 can be appropriately set. Therefore, it is possible to satisfactorily correct spherical aberration. In addition, in a case of a configuration in which Conditional Expression (16-1) is satisfied, it is possible to obtain more favorable characteristics.

$$-0.9 < f3/f4 < -0.4 \quad (16)$$

$$-0.8 < f3/f4 < -0.5 \quad (16\text{-}1)$$

Assuming that a focal length of the second lens group G2 is f2 and a focal length of the fourth lens group G4 is f4, it is preferable to satisfy Conditional Expression (17). By not allowing the result of Conditional Expression (17) to be equal to or less than the lower limit value, the refractive power of the second lens group G2 can be prevented from becoming excessively strong. Thus, it is possible to reduce fluctuation in distortion and fluctuation in field curvature during zooming. By not allowing the result of Conditional Expression (17) to be equal to or greater than the upper limit value, the refractive power of the fourth lens group G4 can be prevented from becoming excessively strong. Thus, it becomes easy to satisfactorily correct spherical aberration. In addition, in a case of a configuration in which Conditional Expression (17-1) is satisfied, it is possible to obtain more favorable characteristics.

$$0.2 < f2/f4 < 0.8 \quad (17)$$

$$0.3 < f2/f4 < 0.7 \quad (17\text{-}1)$$

The third lens group G3 consists of, in order from the object side to the image side, a third lens group front group G3F having a positive refractive power and a third lens group rear group G3R having a positive refractive power, and only the third lens group rear group G3R is the vibration reduction lens group. In such a configuration, the following is preferable. That is, assuming that a focal length of the third lens group rear group G3R is f3R and a focal length of the third lens group G3 is f3, Conditional Expression (18) is satisfied. By not allowing the result of Conditional Expression (18) to be equal to or less than the lower limit value, the refractive power of the vibration reduction lens group can be prevented from becoming excessively strong. Thus, it is possible to suppress fluctuation in coma aberration and fluctuation in chromatic aberration in a case where the vibration reduction lens group moves. Further, the image blur correction stability can be prevented from being lowered due to the vibration reduction sensitivity that has become excessively high. By not allowing the result of Conditional Expression (18) to be equal to or greater than the upper limit value, the refractive power of the vibration reduction lens group can be prevented from becoming excessively weak. Thus, it is possible to reduce the amount of movement of the vibration reduction lens group during image blur correction. In addition, in a case of a configuration in which Conditional Expression (18-1) is satisfied, it is possible to obtain more favorable characteristics. In a case of a configuration in which Conditional Expression (18-2) is satisfied, it is possible to obtain further more favorable characteristics.

$$0.6 < f3R/f3 < 1.8 \quad (18)$$

$$0.7 < f3R/f3 < 1.6 \quad (18\text{-}1)$$

$$0.8 < f3R/f3 < 1.4 \quad (18\text{-}2)$$

In a configuration in which only the fourth lens group G4 is used as the focusing lens group, assuming that a lateral magnification of the fourth lens group G4 in a state where an object at infinity is in focus at the wide-angle end is $\beta 4w$, and a lateral magnification of the fifth lens group G5 in the state where the object at infinity is in focus at the wide-angle end is $\beta 5w$, it is preferable to satisfy Conditional Expression (19). $(1-\beta 4w^2) \times \beta 5w^2$ of Conditional Expression (19) indicates the amount of focus shift, that is, the focus sensitivity with respect to the amount of movement of the fourth lens group G4 in the direction of the optical axis, which is the focusing lens group, at the wide-angle end. Conditional Expression (19) is an expression indicating a preferable range of the focus sensitivity. By not allowing the result of Conditional Expression (19) to be equal to or less than the lower limit value, it is possible to suppress the sensitivity of deterioration in performance to the eccentric error of the fourth lens group G4. Further, by not allowing the result of Conditional Expression (19) to be equal to or less than the lower limit value, the refractive power of the fourth lens group G4 is easily prevented from becoming excessively strong. Thus, there is an advantage in satisfactorily correcting spherical aberration. By not allowing the result of Conditional Expression (19) to be equal to or greater than the upper limit value, the amount of movement of the fourth lens group G4 during focusing can be reduced. Therefore, this configuration is able to contribute to reduction in total optical length at the wide-angle end. In addition, it is possible to increase the speed of autofocusing. In addition, in a case of a configuration in which Conditional Expression (19-1) is satisfied, it is possible to obtain more favorable characteristics.

$$-3.1 < (1-\beta 4w^2) \times \beta 5w^2 < -1.2 \quad (19)$$

$$-2.8 < (1-\beta 4w^2) \times \beta 5w^2 < -1.4 \quad (19\text{-}1)$$

Assuming that an Abbe number of the first lens in the first lens group G1 based on the d line is vd1, it is preferable to satisfy Conditional Expression (20). By not allowing the result of Conditional Expression (20) to be equal to or less than the lower limit value, in particular, it is possible to satisfactorily correct longitudinal chromatic aberration at the telephoto end. In addition, in a case where the Abbe number of the negative first lens increases and the difference between the Abbe number of the negative first lens and the Abbe number of the positive second lens decreases, it is necessary to make the refractive powers of the first lens and the second lens strong in order to correct longitudinal chromatic aberration. However, in a case where the refractive powers are made strong, spherical aberration and field curvature increase. By not allowing the result of Conditional Expression (20) to be equal to or greater than the upper limit value, in order to correct longitudinal chromatic aberration, the refractive powers of the first lens and the second lens can be prevented from becoming excessively strong. Thus, in particular, there is an advantage in satisfactorily correcting spherical aberration and field curvature on the telephoto side. In addition, in a case of a configuration in which Conditional Expression (20-1) is satisfied, it is possible to obtain more favorable characteristics.

$$15 < vd1 < 26 \tag{20}$$

$$16 < vd1 < 25 \tag{20-1}$$

The fourth lens group G4 consists of at least one positive lens and at least one negative lens. In this configuration, assuming that an Abbe number of the positive lens in the fourth lens group G4 based on the d line is vd4p, it is preferable that the fourth lens group G4 has at least one positive lens that satisfies Conditional Expression (21). By not allowing the result of Conditional Expression (21) to be equal to or less than the lower limit value, it becomes easy to satisfactorily correct longitudinal chromatic aberration on the telephoto side, particularly, chromatic aberration on the short wavelength side. In addition, in a case where the Abbe number of the positive lens in the fourth lens group G4 increases and the difference between the Abbe number of the positive lens and the Abbe number of the negative lens in the fourth lens group G4 decreases, in order to correct longitudinal chromatic aberration, it is necessary to make both the refractive powers of these positive and negative lenses strong. However, in a case where the refractive powers are made strong, spherical aberration and coma aberration become large. By not allowing the result of Conditional Expression (21) to be equal to or greater than the upper limit value, the refractive power of each of the lenses composing the fourth lens group G4 can be prevented from becoming excessively strong. Thus, in particular, there is an advantage in satisfactorily correcting fifth or higher order spherical aberration and coma aberration on the telephoto side. In addition, in a case of a configuration in which Conditional Expression (21-1) is satisfied, it is possible to obtain more favorable characteristics.

$$15 < vd4p < 28 \tag{21}$$

$$16 < vd4p < 26 \tag{21-1}$$

The above-mentioned preferred configurations and available configurations may be optional combinations, and it is preferable to selectively adopt the configurations in accordance with required specification. According to the technique of the present disclosure, it is possible to achieve a zoom lens that is reduced in size and has favorable optical performance while ensuring a wide angle of view and a high zoom ratio. It should be noted that the term "wide angle of view" described herein means that the maximum half angle of view at the wide-angle end is 40 degrees or more, and the term "high zoom ratio" means that the zoom ratio is 4 times or more.

Next, numerical examples of the zoom lens of the present disclosure will be described.

Example 1

FIG. 1 is a cross-sectional view of a zoom lens of Example 1, and an illustration method and a configuration thereof is as described above. Therefore, repeated description is partially omitted herein. The zoom lens of Example 1 consists of, in order from the object side to the image side, a first lens group G1 having a positive refractive power, a second lens group G2 having a negative refractive power, an aperture stop St, a third lens group G3 having a negative refractive power, a fourth lens group G4 having a negative refractive power, and a fifth lens group G5 having a positive refractive power. The third lens group G3 consists of, in order from the object side to the image side, a third lens group front group G3F having a positive refractive power and a third lens group rear group G3R having a positive refractive power. The first lens group G1 consists of three lenses of a first lens L11, a second lens L12, and a third lens L13 in order from the object side to the image side. The second lens group G2 consists of four lenses L21 to L24 in order from the object side to the image side. The third lens group front group G3F consists of three lenses L31 to L33 in order from the object side to the image side. The third lens group rear group G3R consists of one lens L34. The fourth lens group G4 consists of two lenses L41 and L42 in order from the object side to the image side. The fifth lens group G5 consists of three lenses L51 to L53 in order from the object side to the image side. During zooming from the wide-angle end to the telephoto end, the first lens group G1, the second lens group G2, the third lens group G3, and the fourth lens group G4 move along the optical axis Z by changing all the distances between lens groups adjacent to each other in the direction of the optical axis, and the fifth lens group G5 remains stationary with respect to the image plane Sim. The vibration reduction lens group consists of only the third lens group rear group G3R. The focusing lens group consists of only the fourth lens group G4. The outline of the zoom lens of Example 1 has been described above.

Regarding the zoom lens of Example 1, Table 1 shows basic lens data, Table 2 shows specification and variable surface distances, and Table 3 shows aspheric surface coefficients thereof. In Table 1, the column of Sn shows surface numbers. The surface closest to the object side is the first surface, and the surface numbers increase one by one toward the image side. The column of R shows radii of curvature of the respective surfaces. The column of D shows surface distances on the optical axis between the respective surfaces and the surfaces adjacent to the image side. Further, the column of Nd shows a refractive index of each constituent element at the d line, the column of vd shows an Abbe number of each constituent element based on the d line, and the column of θgF shows a partial dispersion ratio of each constituent element between the g line and the F line.

In Table 1, the sign of the radius of curvature of the surface convex toward the object side is positive and the sign of the radius of curvature of the surface convex toward the image side is negative. Table 1 also shows the optical member PP and the aperture stop St, and in a place of a surface number of a surface corresponding to the aperture stop St, the surface number and a term of (St) are noted. A value at the bottom place of D in Table 1 indicates a distance between the image plane Sim and the surface closest to the image side in the table. In Table 1, the variable surface distances, which are distances variable during zooming, are referenced by the reference signs DD[ ], and are written into places of D, where object side surface numbers of distances are noted in [ ].

Table 2 shows values of the zoom ratio Zr, the focal length f, the F number FNo., the maximum total angle of view 2ω, and the variable surface distance during zooming. (°) in the place of 2ω indicates that the unit thereof is a degree. In Table 2, the values in the wide-angle end state, the middle focal length state, and the telephoto end state are shown in the columns denoted as "Wide-Angle End", "Middle", and "Telephoto End", respectively. The values shown in Tables 1 and 2 are values in the case of using the d line as a reference in a state where the object at infinity is in focus.

In Table 1, the reference sign * is attached to surface numbers of aspheric surfaces, and numerical values of the paraxial radius of curvature are written into the column of the radius of curvature of the aspheric surface. In Table 3, the row of Sn shows surface numbers of the aspheric surfaces, and the rows of KA and Am (m=3, 4, 5, . . . , 10) shows numerical values of the aspheric surface coefficients for each aspheric surface. The "E±n" (n: an integer) in numerical values of the aspheric surface coefficients of Table 3 indicates "×10$^{±n}$". KA and Am are the aspheric surface coefficients in the aspheric surface expression represented by the following expression.

$$Zd = C \times h^2 / \{1 + (1 - KA \times C^2 \times h^2)^{1/2}\} + \Sigma Am \times h^m$$

Here, Zd is an aspheric surface depth (a length of a perpendicular from a point on an aspheric surface at height h to a plane that is perpendicular to the optical axis and contacts with the vertex of the aspheric surface), h is a height (a distance from the optical axis to the lens surface), C is an inverse of paraxial radius of curvature, KA and Am are aspheric surface coefficients, and Σ in the aspheric surface expression means the sum with respect to m.

In data of each table, a degree is used as a unit of an angle, and mm (millimeter) is used as a unit of a length, but appropriate different units may be used since the optical system can be used even in a case where the system is enlarged or reduced in proportion. Further, each of the following tables shows numerical values rounded off to predetermined decimal places.

TABLE 1

Example 1

| Sn | R | D | Nd | vd | θgF |
|---|---|---|---|---|---|
| 1 | 147.65954 | 1.500 | 1.84666 | 23.78 | 0.62054 |
| 2 | 66.26836 | 5.470 | 1.75976 | 52.02 | 0.54640 |
| 3 | 413.58552 | 0.150 | | | |
| 4 | 61.13525 | 4.830 | 1.74437 | 53.56 | 0.54443 |
| 5 | 210.90455 | DD[5] | | | |
| *6 | 293.87219 | 1.500 | 1.80998 | 40.95 | 0.56644 |
| *7 | 13.80754 | 8.421 | | | |
| 8 | −17.04404 | 0.700 | 1.66656 | 56.91 | 0.54500 |
| 9 | −55.15886 | 0.705 | | | |
| 10 | 117.74408 | 3.699 | 1.94595 | 17.98 | 0.65460 |
| 11 | −39.74485 | 1.406 | | | |
| 12 | −20.28011 | 0.700 | 1.84700 | 22.65 | 0.62089 |
| 13 | −30.35505 | DD[13] | | | |
| 14(St) | ∞ | 0.500 | | | |
| *15 | 19.72898 | 4.886 | 1.68948 | 31.02 | 0.59874 |
| *16 | −228.86837 | 2.415 | | | |
| 17 | 35.75828 | 0.700 | 1.85896 | 22.73 | 0.62844 |
| 18 | 11.37584 | 3.606 | 1.61800 | 63.33 | 0.54414 |
| 19 | 19.94929 | 1.600 | | | |
| *20 | 17.11541 | 5.718 | 1.49700 | 81.61 | 0.53887 |
| *21 | −22.47607 | DD[21] | | | |
| 22 | 78.01772 | 2.000 | 1.85896 | 22.73 | 0.62844 |
| 23 | −105.36171 | 0.610 | 1.80440 | 39.59 | 0.57297 |
| 24 | 20.27468 | DD[24] | | | |
| 25 | 119.51326 | 3.106 | 1.61807 | 47.62 | 0.56442 |
| 26 | −75.27031 | 1.300 | 1.81996 | 46.01 | 0.55579 |
| 27 | 120.38400 | 0.933 | | | |
| *28 | −109.16204 | 3.553 | 1.58313 | 59.38 | 0.54237 |
| *29 | −31.21099 | 14.685 | | | |
| 30 | ∞ | 2.850 | 1.51680 | 64.20 | 0.53430 |
| 31 | ∞ | 1.000 | | | |

TABLE 2

Example 1

| | Wide-angle end | Middle | Telephoto end |
|---|---|---|---|
| Zr | 1.000 | 2.215 | 4.713 |
| f | 16.504 | 36.548 | 77.783 |
| FNo. | 4.12 | 4.13 | 4.13 |
| 2ω(°) | 87.2 | 40.8 | 19.8 |
| DD[5] | 0.800 | 14.741 | 35.652 |
| DD[13] | 19.488 | 6.274 | 1.188 |
| DD[21] | 2.496 | 3.840 | 2.495 |
| DD[24] | 3.861 | 17.125 | 31.386 |

TABLE 3

Example 1

| Sn | 6 | 7 | 15 | 16 |
|---|---|---|---|---|
| KA | 1.0000000E+00 | 1.0000000E+00 | 1.0000000E+00 | 1.0000000E+00 |
| A3 | 0.0000000E+00 | 0.0000000E+00 | 0.0000000E+00 | 0.0000000E+00 |
| A4 | −2.0156062E−05 | −5.1708119E−05 | −3.7833014E−05 | −2.8854059E−05 |
| A5 | 3.1332925E−06 | 3.8228839E−06 | 8.9432918E−06 | 1.2730218E−05 |
| A6 | 1.0876565E−07 | −1.1063845E−08 | −1.8848688E−06 | −3.2220609E−06 |
| A7 | −1.7774067E−08 | −2.4210034E−08 | 8.0755296E−08 | 2.5722342E−07 |
| A8 | −2.0072742E−11 | 3.3662549E−09 | 1.2507349E−08 | 1.3197679E−08 |
| A9 | 3.3457813E−11 | −3.8954053E−11 | −1.2306669E−09 | −3.4051477E−09 |
| A10 | −3.6041271E−13 | −1.1521318E−11 | −1.3124899E−11 | 1.2147994E−10 |

TABLE 3-continued

| | Example 1 | | | |
|---|---|---|---|---|
| Sn | 20 | 21 | 28 | 29 |
| KA | 1.0000000E+00 | 1.0000000E+00 | 1.0000000E+00 | 1.0000000E+00 |
| A3 | 0.0000000E+00 | 0.0000000E+00 | 0.0000000E+00 | 0.0000000E+00 |
| A4 | −3.8001832E−05 | 3.2816072E−05 | 9.9652891E−06 | 3.7008339E−05 |
| A5 | −1.4671735E−05 | −1.2839953E−05 | 5.3568193E−06 | −1.8060076E−06 |
| A6 | 8.9777112E−06 | 7.3318923E−06 | −5.3160786E−07 | 2.4328182E−07 |
| A7 | −2.5684771E−06 | −1.9257261E−06 | 1.2498677E−08 | −1.2493449E−09 |
| A8 | 3.9432287E−07 | 2.7375207E−07 | 1.8271499E−09 | −1.5154824E−09 |
| A9 | −3.1518780E−08 | −2.0706246E−08 | −1.7695720E−10 | 6.3461976E−11 |
| A10 | 1.0102143E−09 | 6.3878265E−10 | 4.9789359E−12 | −2.0584295E−15 |

Figure 24:
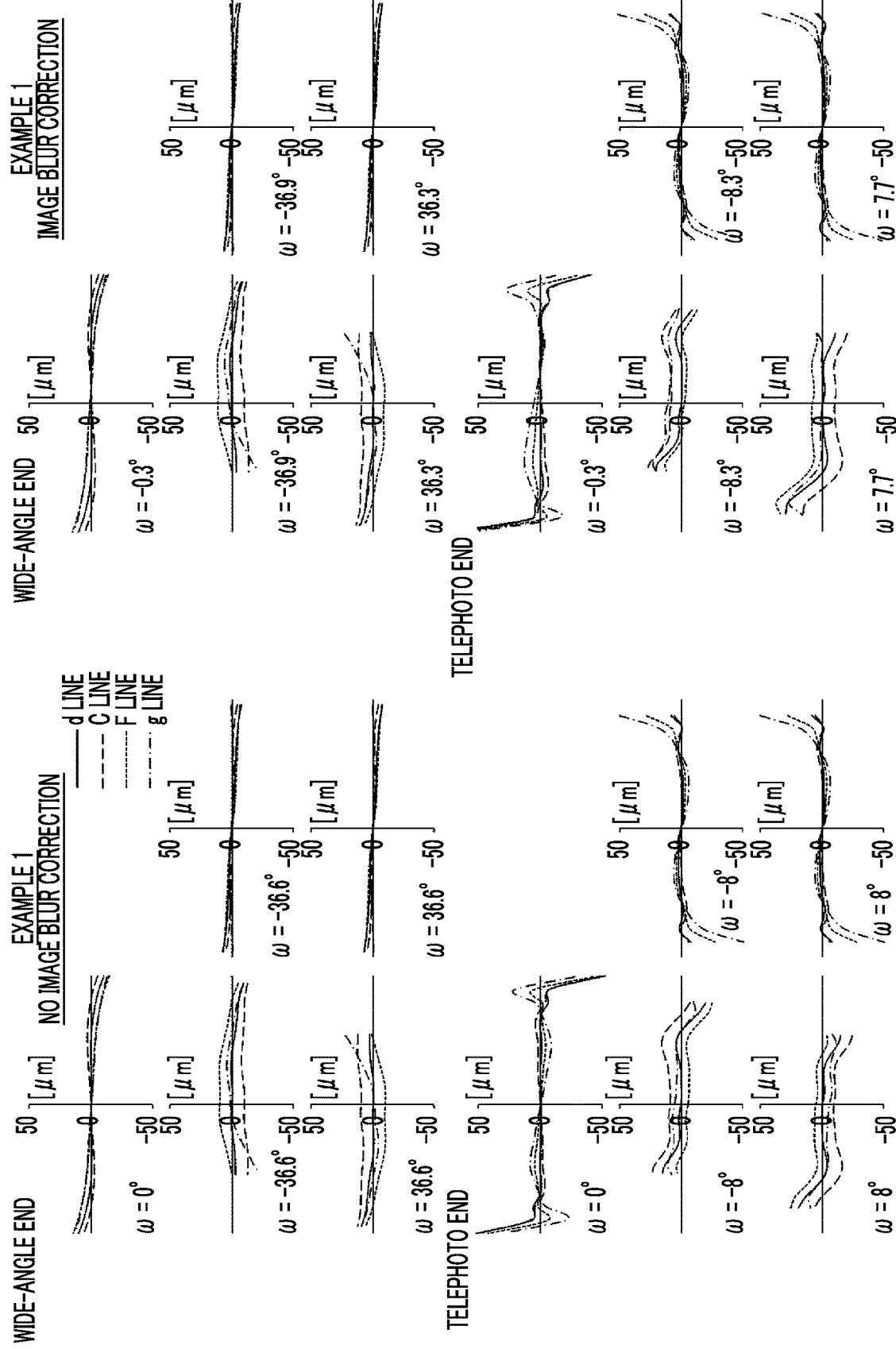
FIG. 24 shows lateral aberration diagrams of the zoom lens according to Example 1 of the present disclosure in a case of no image blur correction and in a case of image blur correction.

FIGS. 13 and 24 each show aberration diagrams in a state where an object at infinity is brought into focus through the zoom lens of Example 1. FIG. 13 shows aberration diagrams in a state where there is no image blur correction. In FIG. 13, in order from the left side, spherical aberration, astigmatism, distortion, and lateral chromatic aberration are shown. In FIG. 13, the upper part labeled "WIDE-ANGLE END" indicates aberrations in the wide-angle end state, the middle part labeled "MIDDLE" indicates aberrations in the middle focal length state, and the lower part labeled "TELEPHOTO END" indicates aberrations in the telephoto end state. In the spherical aberration diagram, aberrations at the d line, the C line, the F line, and the g line are indicated by the solid line, the long dashed line, the short dashed line, and the chain line, respectively. In the astigmatism diagram, aberration in the sagittal direction at the d line is indicated by the solid line, and aberration in the tangential direction at the d line is indicated by the short dashed line. In the distortion diagram, aberration at the d line is indicated by the solid line. In the lateral chromatic aberration, aberrations at the C line, the F line, and the g line are respectively indicated by the long dashed line, the short dashed line, and the chain line. In the spherical aberration diagram, FNo. indicates an F number. In the other aberration diagrams, ω indicates a half angle of view.

FIG. 24 shows ten lateral aberrations in a case where there is no image blur correction on the left side labeled "NO IMAGE BLUR CORRECTION", and shows ten lateral aberrations in a case where the vibration reduction lens group is moved in the direction perpendicular to the optical axis Z by an amount corresponding to a ray tilt of −0.3 degrees on the right side labeled "IMAGE BLUR CORRECTION". In the drawing of "no image blur correction", the six graphs in the left column show tangential aberrations, and the four graphs in the right column show sagittal aberrations. In addition, in order from the top, the following are shown: an aberration at a position where the image height is 0 at the wide-angle end; aberrations at a position where the image height is 80% of the maximum image height on the negative side at the wide-angle end; aberrations at a position where the image height is 80% of the maximum image height on the positive side at the wide-angle end; an aberration at a position where the image height is 0 at the telephoto end; aberrations at the position where the image height is 80% of the maximum image height on the negative side at the telephoto end; and aberrations at a position where the image height is 80% of the maximum image height on the positive side at the telephoto end. In the drawing, ω means a half angle of view, and aberrations at the d line, the C line, the F line, and the g line are indicated by the solid line, the long dashed line, the short dashed line, and the chain line, respectively. The same applies to the drawing "IMAGE BLUR CORRECTION".

Symbols, meanings, description methods, and illustration methods of the respective data pieces according to Example 1 are the same as those in the following examples unless otherwise noted. Therefore, in the following description, repeated description will be omitted.

Example 2

Figure 2:
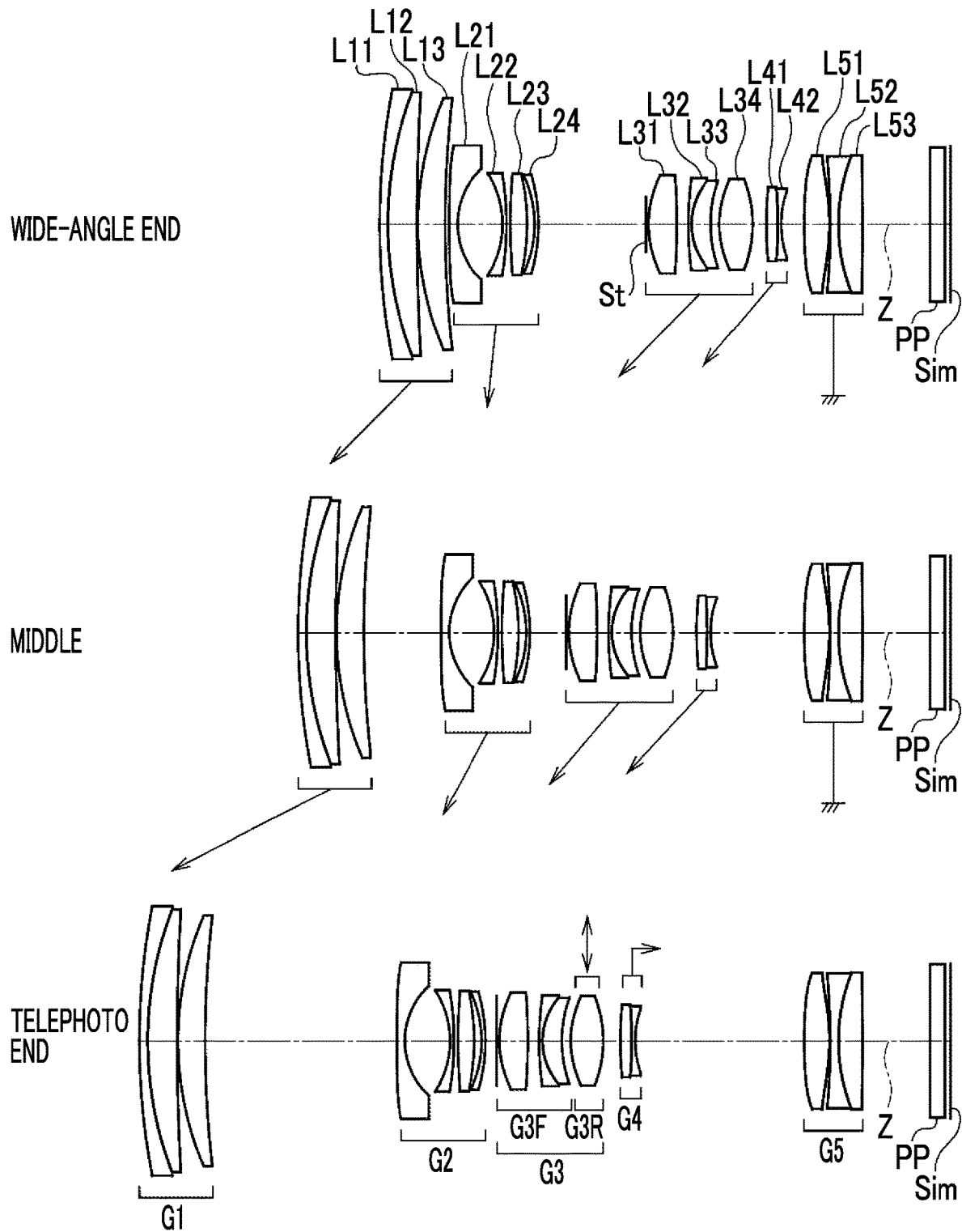
FIG. 2 is a cross-sectional view showing a configuration of a zoom lens of Example 2 of the present disclosure.
Figure 25:
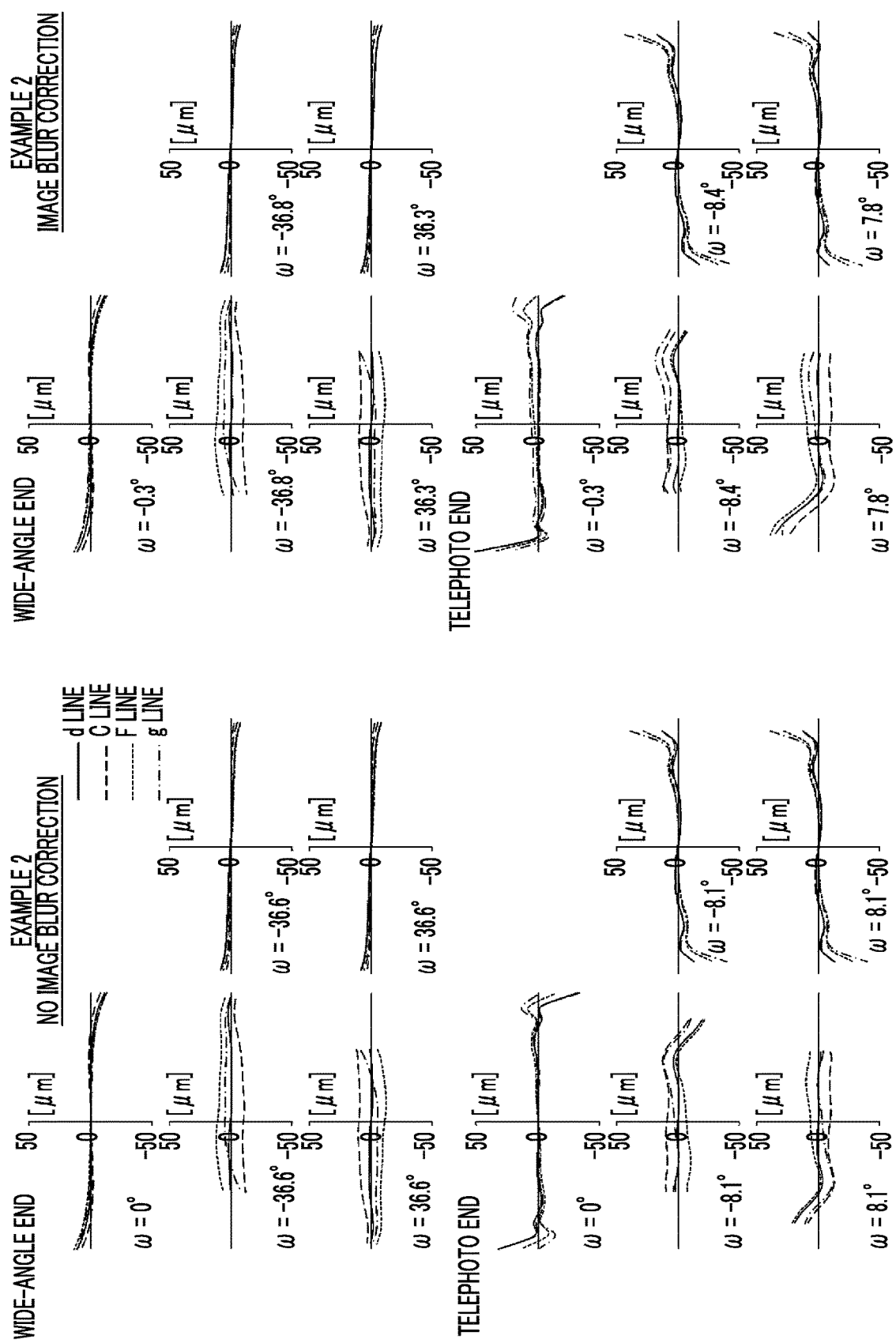
FIG. 25 shows lateral aberration diagrams of the zoom lens according to Example 2 of the present disclosure in a case of no image blur correction and in a case of image blur correction.

FIG. 2 is a cross-sectional view showing a configuration of the zoom lens of Example 2. The zoom lens of Example 2 has the same configuration as the outline of the zoom lens of Example 1. Regarding the zoom lens of Example 2, Table 4 shows basic lens data, Table 5 shows specification and variable surface distances, Table 6 shows aspheric surface coefficients, and FIGS. 14 and 25 shows aberration diagrams.

TABLE 4

| | Example 2 | | | | |
|---|---|---|---|---|---|
| Sn | R | D | Nd | νd | θgF |
| 1 | 131.57797 | 1.500 | 1.84699 | 22.65 | 0.62089 |
| 2 | 67.55520 | 5.403 | 1.71053 | 55.97 | 0.54269 |
| 3 | 425.49740 | 0.150 | | | |
| 4 | 58.77808 | 4.988 | 1.71727 | 55.64 | 0.54270 |
| 5 | 201.80604 | DD[5] | | | |
| *6 | 416.64637 | 1.500 | 1.77322 | 44.08 | 0.56460 |
| *7 | 13.41082 | 8.329 | | | |
| 8 | −17.23302 | 0.700 | 1.70216 | 49.39 | 0.55742 |
| 9 | −56.24107 | 0.710 | | | |
| 10 | 105.60952 | 3.078 | 1.94595 | 17.98 | 0.65460 |
| 11 | −41.31604 | 1.393 | | | |
| 12 | −20.80363 | 0.700 | 1.84699 | 22.65 | 0.62089 |
| 13 | −31.68401 | DD[13] | | | |
| 14(St) | ∞ | 0.500 | | | |
| *15 | 18.85186 | 5.206 | 1.68948 | 31.02 | 0.59874 |
| *16 | −116.01791 | 2.093 | | | |
| 17 | 62.51501 | 0.600 | 1.84573 | 22.71 | 0.62065 |
| 18 | 12.14801 | 3.609 | 1.58163 | 61.86 | 0.54174 |
| 19 | 23.68045 | 1.600 | | | |
| *20 | 16.74149 | 5.994 | 1.49700 | 81.61 | 0.53887 |
| *21 | −21.09500 | DD[21] | | | |
| 22 | 68.81562 | 2.112 | 1.85896 | 22.73 | 0.62844 |
| 23 | −77.49432 | 0.610 | 1.80440 | 39.59 | 0.57297 |
| 24 | 17.95124 | DD[24] | | | |
| *25 | 116.14419 | 4.604 | 1.58313 | 59.38 | 0.54237 |
| *26 | −38.32872 | 0.150 | | | |
| 27 | −139.21760 | 1.500 | 1.74841 | 53.16 | 0.54494 |
| 28 | 34.13398 | 4.468 | 1.48749 | 70.24 | 0.53007 |
| 29 | −517.25402 | 12.405 | | | |
| 30 | ∞ | 2.850 | 1.51680 | 64.20 | 0.53430 |
| 31 | ∞ | 1.000 | | | |

TABLE 5

| | Example 2 | | |
|---|---|---|---|
| | Wide-angle end | Middle | Telephoto end |
| Zr | 1.000 | 2.215 | 4.713 |
| f | 16.499 | 36.538 | 77.761 |
| FNo. | 4.12 | 4.13 | 4.13 |
| 2ω(°) | 87.0 | 41.0 | 20.0 |
| DD[5] | 0.800 | 14.215 | 35.151 |
| DD[13] | 19.731 | 6.650 | 2.034 |
| DD[21] | 2.499 | 4.314 | 3.105 |
| DD[24] | 4.241 | 17.050 | 31.033 |

TABLE 6

| | Example 2 | | | |
|---|---|---|---|---|
| Sn | 6 | 7 | 15 | 16 |
| KA | 1.0000000E+00 | 1.0000000E+00 | 1.0000000E+00 | 1.0000000E+00 |
| A3 | 0.0000000E+00 | 0.0000000E+00 | 0.0000000E+00 | 0.0000000E+00 |
| A4 | −1.4966116E−05 | −4.8836895E−05 | −2.2251192E−05 | −8.4475879E−07 |
| A5 | 2.4803547E−06 | 3.1121405E−06 | 6.3217095E−06 | 7.2024578E−06 |
| A6 | 1.0988494E−07 | 1.3659886E−07 | −1.6604772E−06 | −2.0575753E−06 |
| A7 | −1.3252893E−08 | −4.1764770E−08 | 1.4695868E−07 | 2.0514768E−07 |
| A8 | −1.5742775E−10 | 2.8763475E−09 | 4.4767350E−09 | 5.4178092E−09 |
| A9 | 2.7322906E−11 | 1.8816394E−10 | −1.3614374E−09 | −2.2676798E−09 |
| A10 | −1.9198265E−13 | −1.8097317E−11 | 3.9609326E−11 | 9.1845861E−11 |
| Sn | 20 | 21 | 25 | 26 |
| KA | 1.0000000E+00 | 1.0000000E+00 | 1.0000000E+00 | 1.0000000E+00 |
| A3 | 0.0000000E+00 | 0.0000000E+00 | 0.0000000E+00 | 0.0000000E+00 |
| A4 | −4.5120903E−05 | 3.1124682E−05 | 1.3940193E−05 | 3.7240038E−05 |
| A5 | −1.5053854E−05 | −1.0787545E−05 | 1.8917020E−06 | −3.0716491E−06 |
| A6 | 9.0451192E−06 | 6.7602758E−06 | −7.5934360E−08 | 2.0095116E−07 |
| A7 | −2.6021055E−06 | −1.8891461E−06 | 1.1141342E−08 | 3.8494441E−08 |
| A8 | 3.9769025E−07 | 2.7813451E−07 | −1.1552052E−09 | −4.0348499E−09 |
| A9 | −3.1214244E−08 | −2.1199576E−08 | −5.8037554E−11 | −7.9733250E−11 |
| A10 | 9.7019543E−10 | 6.4468762E−10 | 7.6219560E−12 | 1.3365832E−11 |

Example 3

Figure 3:
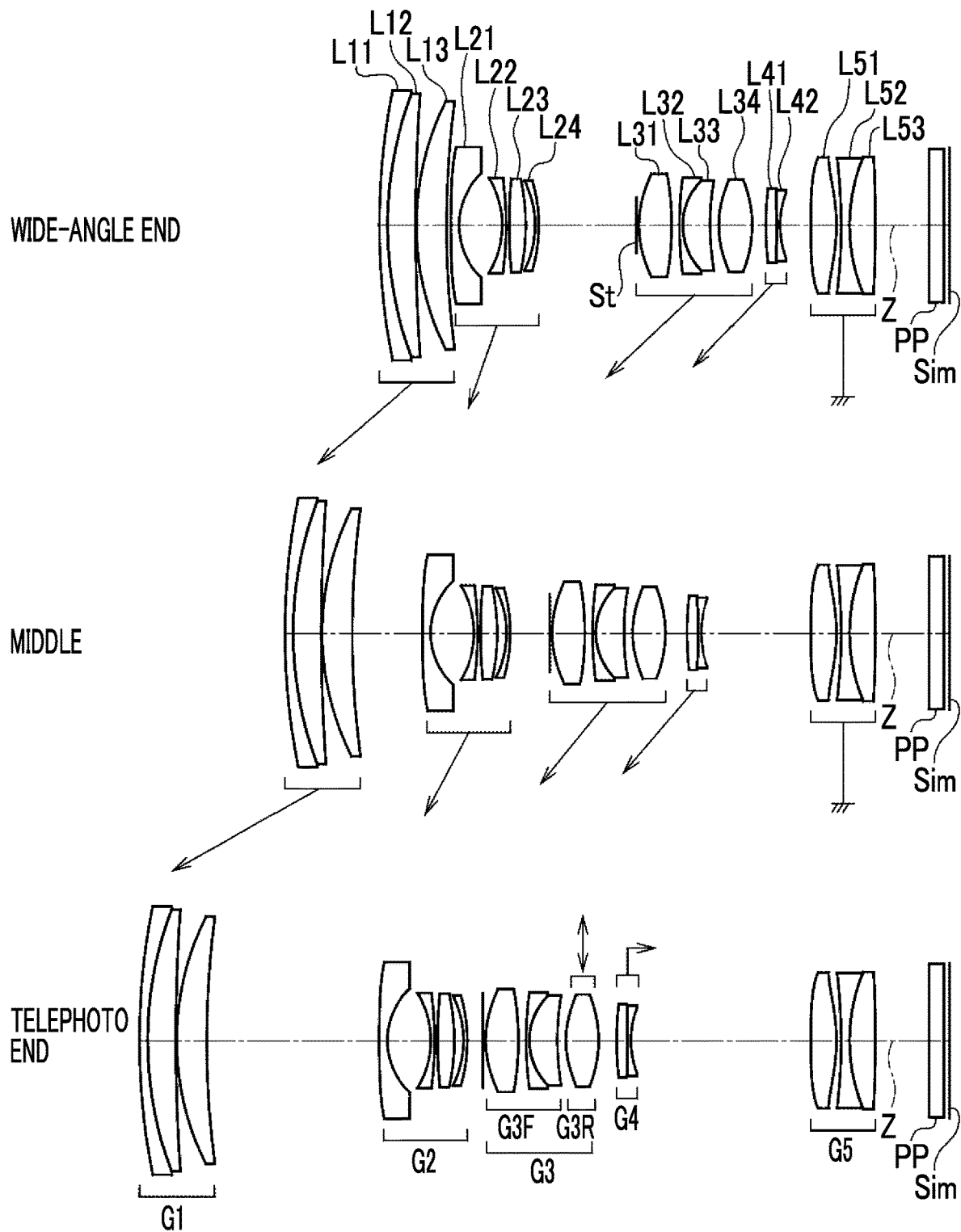
FIG. 3 is a cross-sectional view showing a configuration of a zoom lens of Example 3 of the present disclosure.
Figure 26:
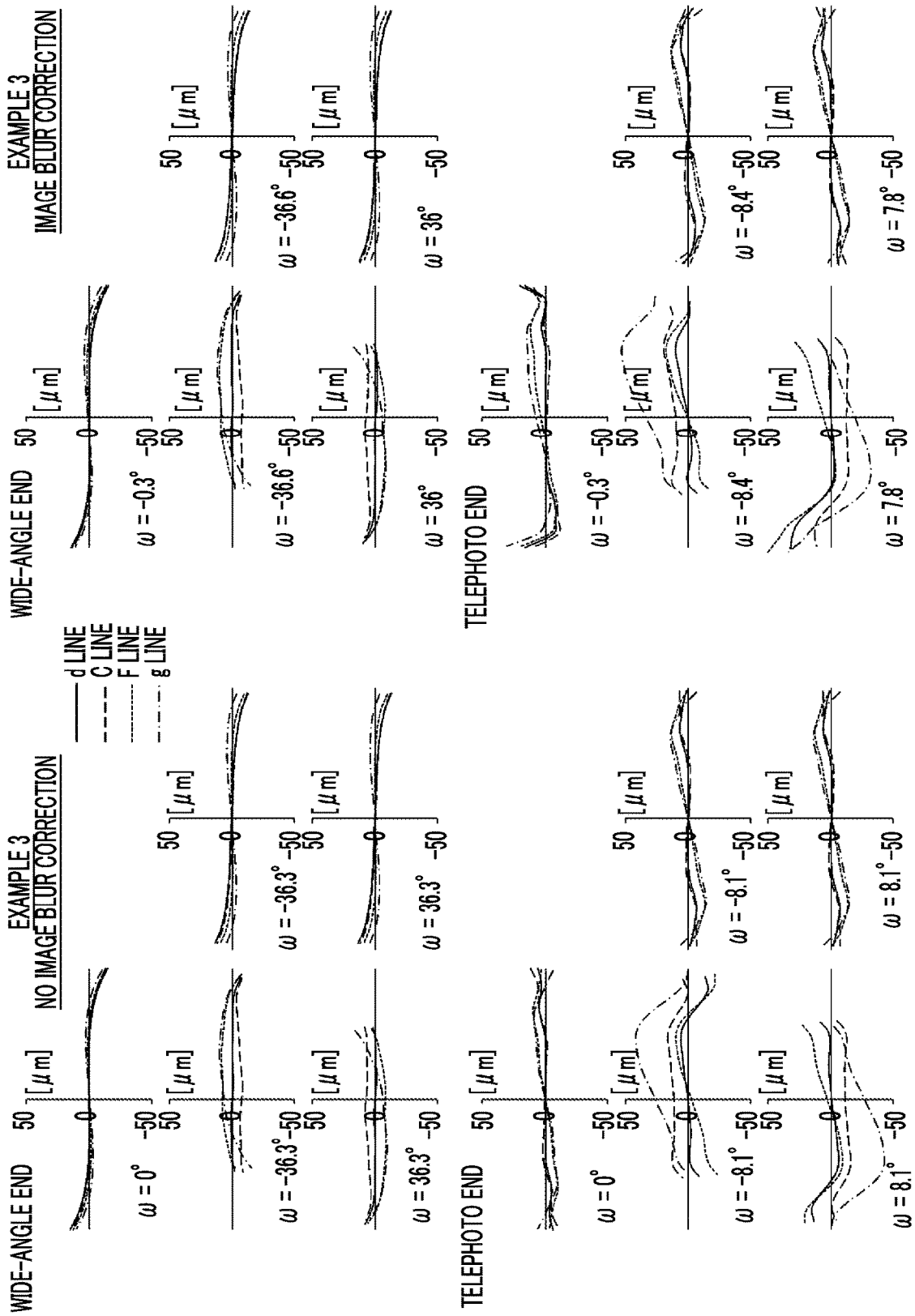
FIG. 26 shows lateral aberration diagrams of the zoom lens according to Example 3 of the present disclosure in a case of no image blur correction and in a case of image blur correction.

FIG. 3 is a cross-sectional view showing a configuration of the zoom lens of Example 3. The zoom lens of Example 3 has the same configuration as the outline of the zoom lens of Example 1. Regarding the zoom lens of Example 3, Table 7 shows basic lens data, Table 8 shows specification and variable surface distances, Table 9 shows aspheric surface coefficients, and FIGS. 15 and 26 shows aberration diagrams.

TABLE 7

| | Example 3 | | | | |
|---|---|---|---|---|---|
| Sn | R | D | Nd | νd | θgF |
| 1 | 127.23794 | 1.500 | 1.95906 | 17.47 | 0.65993 |
| 2 | 68.36118 | 5.188 | 1.88300 | 40.76 | 0.56679 |
| 3 | 353.42458 | 0.150 | | | |
| 4 | 51.05060 | 5.536 | 1.61014 | 60.76 | 0.54217 |
| 5 | 176.82084 | DD[5] | | | |
| *6 | 197.67080 | 1.500 | 1.83268 | 39.67 | 0.57242 |
| *7 | 12.65278 | 8.030 | | | |
| 8 | −16.65132 | 0.700 | 1.70054 | 56.20 | 0.54325 |
| 9 | −64.65678 | 0.526 | | | |
| 10 | 88.26127 | 3.078 | 1.94595 | 17.98 | 0.65460 |
| 11 | −40.30466 | 1.695 | | | |
| 12 | −18.46617 | 0.700 | 1.79664 | 25.42 | 0.61156 |
| 13 | −29.44876 | DD[13] | | | |
| 14(St) | ∞ | 0.500 | | | |

TABLE 7-continued

| | Example 3 | | | | |
|---|---|---|---|---|---|
| Sn | R | D | Nd | νd | θgF |
| *15 | 19.22635 | 6.000 | 1.68948 | 31.02 | 0.59874 |
| *16 | −52.94274 | 1.415 | | | |
| 17 | 66.22177 | 0.600 | 1.84693 | 22.65 | 0.62088 |
| 18 | 11.65503 | 5.166 | 1.51822 | 64.30 | 0.53826 |
| 19 | 47.46314 | 1.600 | | | |
| *20 | 17.59201 | 6.000 | 1.41390 | 100.82 | 0.53373 |
| *21 | −21.14694 | DD[21] | | | |
| 22 | 61.73120 | 2.000 | 1.95906 | 17.47 | 0.65993 |
| 23 | −178.94136 | 0.610 | 1.80440 | 39.59 | 0.57297 |
| 24 | 16.61010 | DD[24] | | | |

TABLE 7-continued

| | Example 3 | | | | |
|---|---|---|---|---|---|
| Sn | R | D | Nd | νd | θgF |
| *25 | 202.68635 | 4.726 | 1.58313 | 59.38 | 0.54237 |
| *26 | −31.31369 | 0.877 | | | |
| 27 | −104.68838 | 1.500 | 1.85883 | 30.00 | 0.59793 |
| 28 | 32.17344 | 4.796 | 1.59827 | 46.77 | 0.56598 |
| 29 | −259.27698 | 9.888 | | | |
| 30 | ∞ | 2.850 | 1.51680 | 64.20 | 0.53430 |
| 31 | ∞ | 1.000 | | | |

TABLE 8

| | Example 3 | | |
|---|---|---|---|
| | Wide-angle end | Middle | Telephoto end |
| Zr | 1.000 | 2.215 | 4.713 |
| f | 16.489 | 36.516 | 77.714 |
| FNo. | 4.13 | 4.13 | 4.13 |
| 2ω(°) | 86.2 | 40.8 | 20.0 |
| DD[5] | 0.800 | 12.911 | 31.637 |
| DD[13] | 17.932 | 7.217 | 2.961 |
| DD[211] | 2.496 | 3.982 | 3.292 |
| DD[24] | 5.645 | 20.110 | 33.038 |

TABLE 9

| | Example 3 | | | |
|---|---|---|---|---|
| Sn | 6 | 7 | 15 | 16 |
| KA | 1.0000000E+00 | 1.0000000E+00 | 1.0000000E+00 | 1.0000000E+00 |
| A3 | 0.0000000E+00 | 0.0000000E+00 | 0.0000000E+00 | 0.0000000E+00 |
| A4 | −1.7395978E−05 | −5.3566161E−05 | −2.7226806E−05 | 1.0020418E−06 |
| A5 | 2.4371987E−06 | 3.5906409E−06 | 6.4928718E−06 | 7.3657138E−06 |
| A6 | 1.0344411E−07 | 3.6976701E−08 | −1.6697118E−06 | −2.0833633E−06 |
| A7 | −1.2677658E−08 | −4.6667222E−08 | 1.4480647E−07 | 2.0462468E−07 |
| A8 | −1.3209070E−10 | 2.5670020E−09 | 4.5420622E−09 | 5.1012960E−09 |
| A9 | 2.7741079E−11 | 4.6681502E−10 | −1.3619176E−09 | −2.2513360E−09 |
| A10 | −3.0574453E−13 | −3.5875113E−11 | 4.0475784E−11 | 9.4398056E−11 |
| Sn | 20 | 21 | 25 | 26 |
| KA | 1.0000000E+00 | 1.0000000E+00 | 1.0000000E+00 | 1.0000000E+00 |
| A3 | 0.0000000E+00 | 0.0000000E+00 | 0.0000000E+00 | 0.0000000E+00 |
| A4 | −3.0824782E−05 | 3.9383615E−05 | 1.8948283E−05 | 4.9627909E−05 |
| A5 | −1.5396547E−05 | −1.2125492E−05 | 2.1106325E−06 | −3.1509149E−06 |
| A6 | 8.9851464E−06 | 6.7627679E−06 | −7.6404143E−07 | 2.0026483E−07 |
| A7 | −2.6039940E−06 | −1.8805572E−06 | 1.2442486E−08 | 3.8679839E−08 |
| A8 | 3.9904814E−07 | 2.7760299E−07 | −1.2366207E−09 | −3.9954683E−09 |
| A9 | −3.1272708E−08 | −2.1241901E−08 | −5.9605050E−11 | −7.8251033E−11 |
| A10 | 9.4962207E−10 | 6.2918187E−10 | 7.8724492E−12 | 1.3297708E−11 |

Example 4

Figure 4:
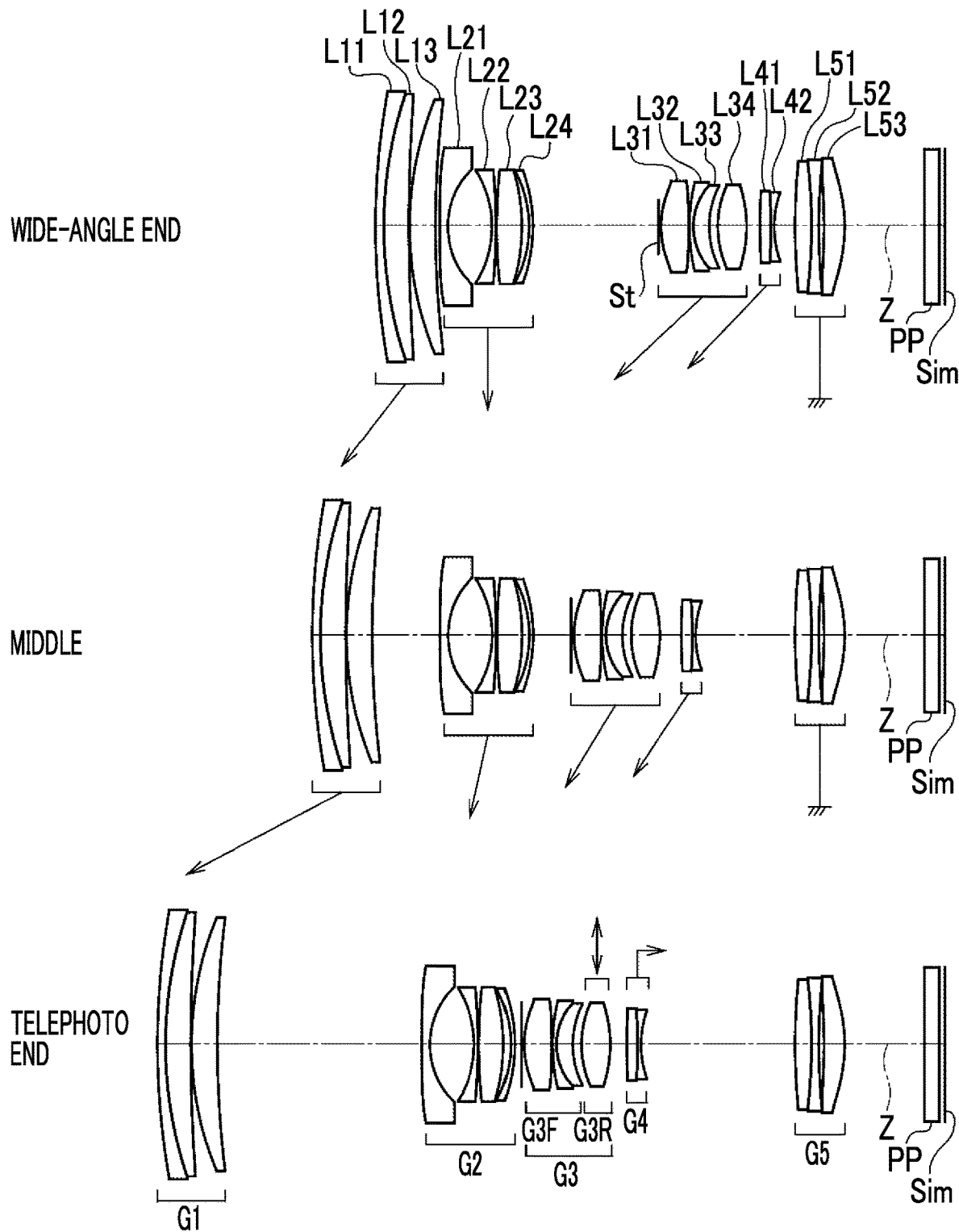
FIG. 4 is a cross-sectional view showing a configuration of a zoom lens of Example 4 of the present disclosure.
Figure 27:
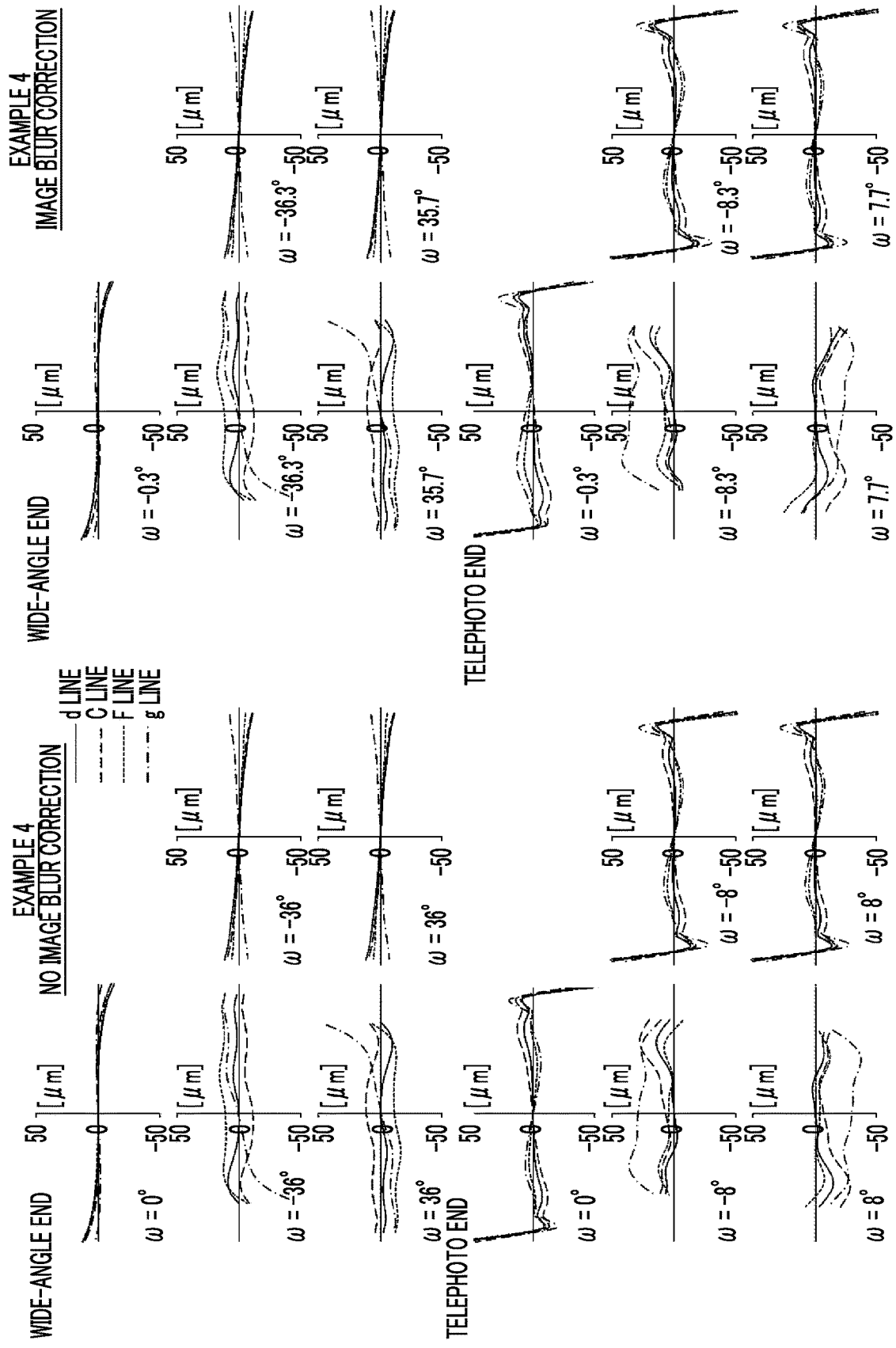
FIG. 27 shows lateral aberration diagrams of the zoom lens according to Example 4 of the present disclosure in a case of no image blur correction and in a case of image blur correction.

FIG. 4 is a cross-sectional view showing a configuration of the zoom lens of Example 4. The zoom lens of Example 4 has the same configuration as the outline of the zoom lens of Example 1. Regarding the zoom lens of Example 4, Table 10 shows basic lens data, Table 11 shows specification and variable surface distances, Table 12 shows aspheric surface coefficients, and FIGS. 16 and 27 shows aberration diagrams.

TABLE 10

| | Example 4 | | | | |
|---|---|---|---|---|---|
| Sn | R | D | Nd | νd | θgF |
| 1 | 140.15920 | 1.500 | 1.92286 | 18.90 | 0.64960 |
| 2 | 76.57562 | 4.600 | 1.77250 | 49.60 | 0.55212 |
| 3 | 338.17154 | 0.150 | | | |
| 4 | 61.25862 | 4.716 | 1.77423 | 47.35 | 0.55640 |
| 5 | 190.24297 | DD[5] | | | |
| *6 | 416.65153 | 1.500 | 1.80998 | 40.95 | 0.56644 |
| *7 | 14.54810 | 8.214 | | | |
| 8 | −19.31908 | 0.700 | 1.67439 | 37.17 | 0.58327 |
| 9 | −115.85599 | 0.150 | | | |
| 10 | 98.21866 | 4.473 | 1.94595 | 17.98 | 0.65460 |
| 11 | −36.04825 | 1.330 | | | |
| 12 | −21.47670 | 0.700 | 1.83667 | 23.17 | 0.61902 |
| 13 | −30.19670 | DD[13] | | | |
| 14(St) | ∞ | 0.500 | | | |
| *15 | 16.81445 | 5.001 | 1.68948 | 31.02 | 0.59874 |
| *16 | −245.46598 | 0.174 | | | |
| 17 | 34.32449 | 0.700 | 1.85896 | 22.73 | 0.62844 |
| 18 | 11.10736 | 3.010 | 1.61800 | 63.33 | 0.54414 |
| 19 | 16.22876 | 1.600 | | | |
| *20 | 17.65941 | 5.267 | 1.49700 | 81.61 | 0.53887 |
| *21 | −22.39316 | DD[21] | | | |
| 22 | 130.93020 | 2.000 | 1.84666 | 23.78 | 0.62054 |
| 23 | −90.34011 | 0.610 | 1.80440 | 39.59 | 0.57297 |
| 24 | 18.86350 | DD[24] | | | |
| 25 | 120.70098 | 3.000 | 1.77357 | 50.62 | 0.54837 |
| 26 | −99.45133 | 1.310 | 1.76574 | 43.54 | 0.56641 |
| 27 | 123.89655 | 0.974 | | | |
| *28 | −101.34788 | 3.778 | 1.58313 | 59.38 | 0.54237 |
| *29 | −27.87020 | 14.622 | | | |
| 30 | ∞ | 2.850 | 1.51680 | 64.20 | 0.53430 |
| 31 | ∞ | 1.000 | | | |

TABLE 11

| | Example 4 | | |
|---|---|---|---|
| | Wide-angle end | Middle | Telephoto end |
| Zr | 1.000 | 2.215 | 4.713 |
| f | 16.529 | 36.603 | 77.900 |
| FNo. | 4.12 | 4.12 | 4.12 |
| 2ω(°) | 85.0 | 40.6 | 19.6 |
| DD[5] | 0.800 | 12.423 | 37.532 |
| DD[13] | 22.958 | 6.937 | 1.196 |
| DD[21] | 2.498 | 3.950 | 3.020 |
| DD[24] | 3.826 | 18.352 | 28.365 |

TABLE 12

| | Example 4 | | | |
|---|---|---|---|---|
| Sn | 6 | 7 | 15 | 16 |
| KA | 1.0000000E+00 | 1.0000000E+00 | 1.0000000E+00 | 1.0000000E+00 |
| A3 | 0.0000000E+00 | 0.0000000E+00 | 0.0000000E+00 | 0.0000000E+00 |
| A4 | −2.1573661E−05 | −3.9022740E−05 | −4.8405706E−05 | −4.4169435E−05 |
| A5 | 3.4921030E−06 | 1.1943667E−06 | 8.8946671E−06 | 1.5305559E−05 |
| A6 | 8.2025268E−08 | 4.2655315E−07 | −2.1312271E−06 | −3.5539537E−06 |

TABLE 12-continued

| | | Example 4 | | |
|---|---|---|---|---|
| A7 | −1.5931433E−08 | −3.3045461E−08 | 9.2082608E−08 | 2.3009141E−07 |
| A8 | −3.1506580E−11 | 4.3607644E−10 | 1.3166819E−08 | 1.4786052E−08 |
| A9 | 3.3946573E−11 | 1.1452099E−10 | −1.3579324E−09 | −3.5116072E−09 |
| A10 | −6.0576814E−13 | −3.0153512E−12 | −4.2184579E−11 | 1.2094256E−10 |
| Sn | 20 | 21 | 28 | 29 |
| KA | 1.0000000E+00 | 1.0000000E+00 | 1.0000000E+00 | 1.0000000E+00 |
| A3 | 0.0000000E+00 | 0.0000000E+00 | 0.0000000E+00 | 0.0000000E+00 |
| A4 | −5.2874727E−05 | 2.3466953E−05 | −4.1957056E−06 | 2.5963740E−05 |
| A5 | −7.3734243E−06 | −8.3472818E−06 | 4.6862198E−06 | −1.8441578E−06 |
| A6 | 8.6426532E−06 | 7.1763170E−06 | −4.8423437E−07 | 1.9590948E−07 |
| A7 | −2.6160163E−06 | −1.9596690E−06 | 1.4614956E−08 | 2.5074796E−09 |
| A8 | 3.9003698E−07 | 2.7207633E−07 | 2.0827550E−09 | −1.3312155E−09 |
| A9 | −3.0978989E−08 | −2.0482438E−08 | −1.8838102E−10 | 8.4706074E−11 |
| A10 | 1.0991537E−09 | 7.1873611E−10 | 5.3234032E−12 | −9.1069571E−13 |

Example 5

Figure 5:
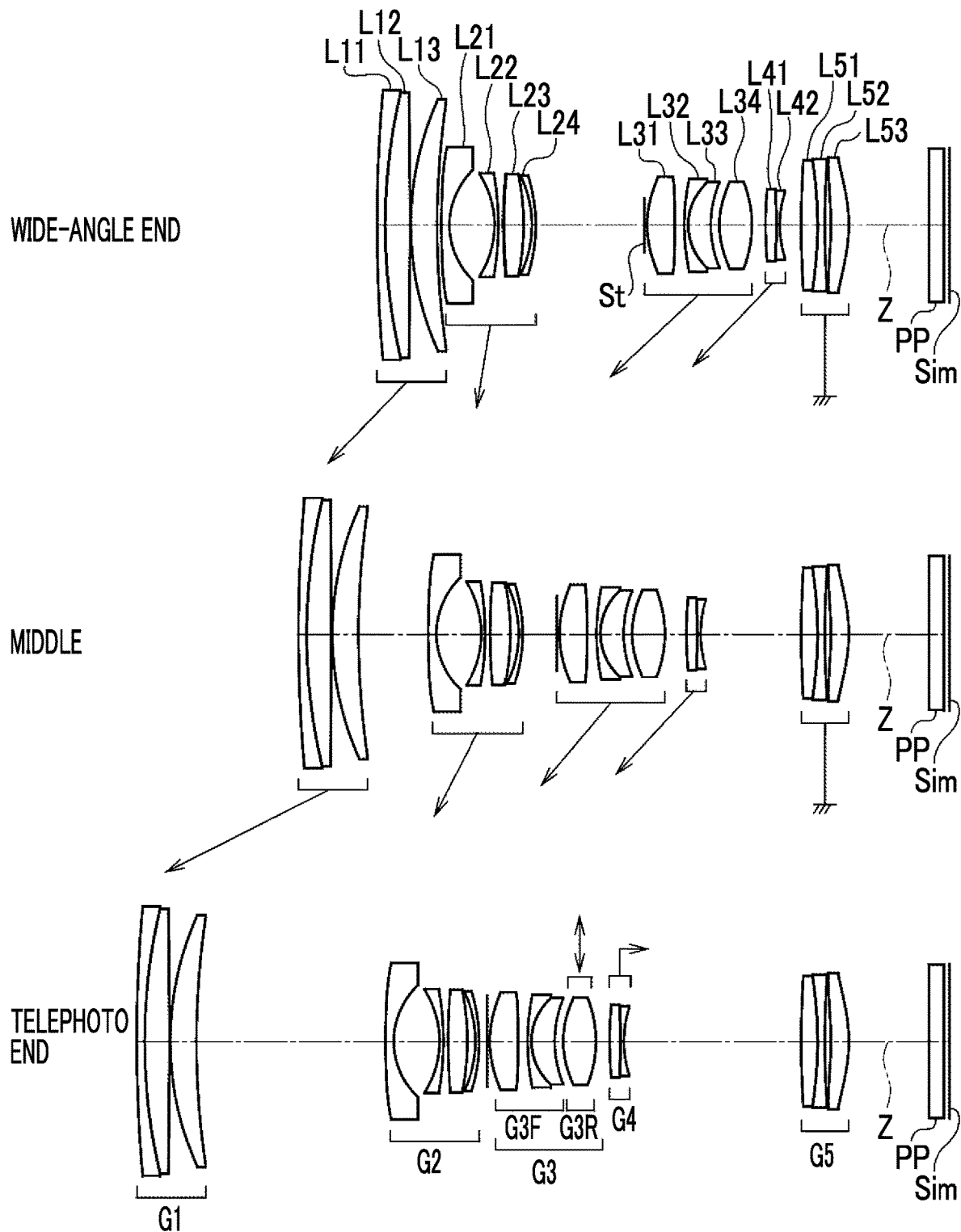
FIG. 5 is a cross-sectional view showing a configuration of a zoom lens of Example 5 of the present disclosure.
Figure 28:
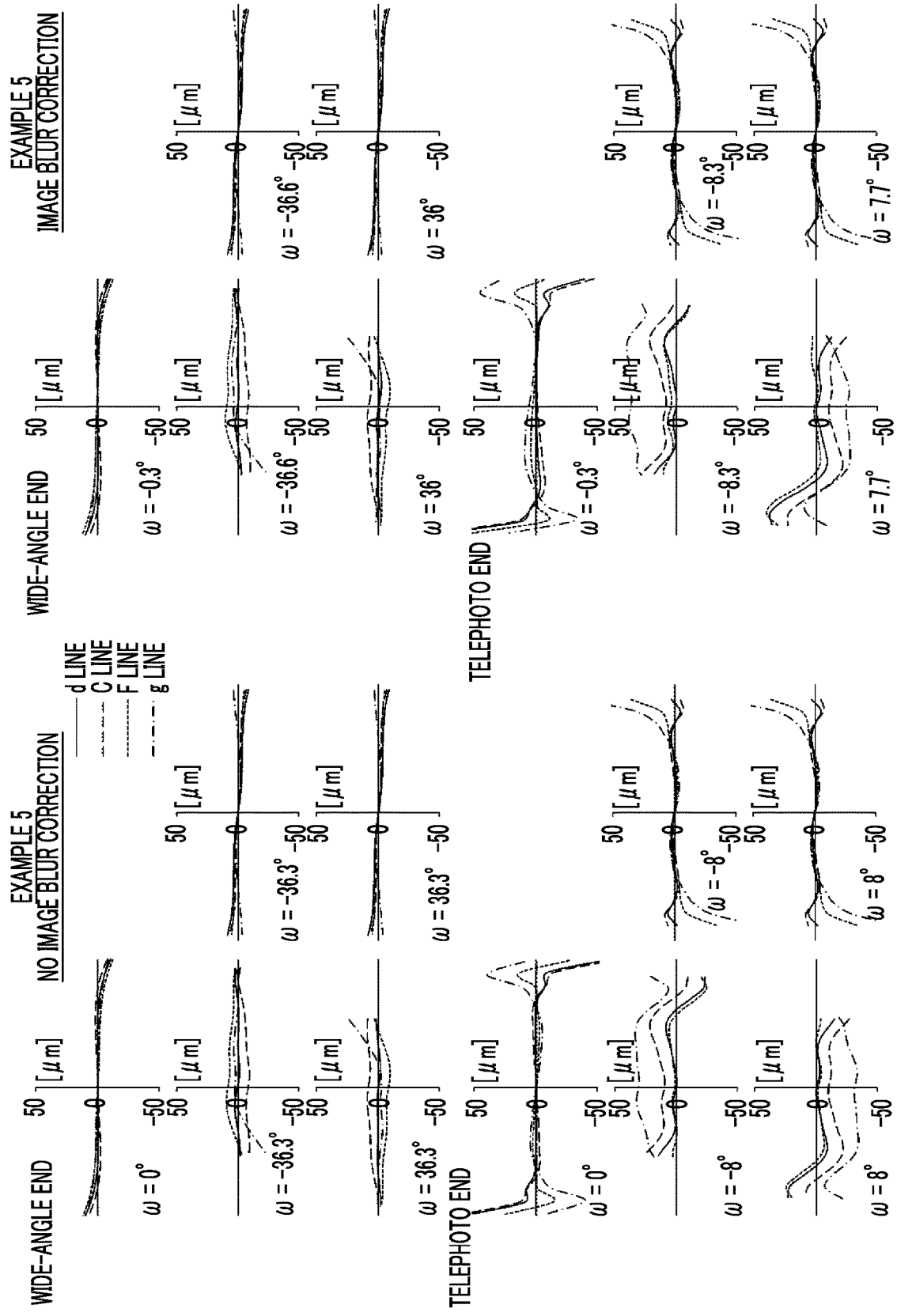
FIG. 28 shows lateral aberration diagrams of the zoom lens according to Example 5 of the present disclosure in a case of no image blur correction and in a case of image blur correction.

FIG. 5 is a cross-sectional view showing a configuration of the zoom lens of Example 5. The zoom lens of Example 5 has the same configuration as the outline of the zoom lens of Example 1. Regarding the zoom lens of Example 5, Table 13 shows basic lens data, Table 14 shows specification and variable surface distances, Table 15 shows aspheric surface coefficients, and FIGS. 17 and 28 shows aberration diagrams.

TABLE 13

| | | Example 5 | | | |
|---|---|---|---|---|---|
| Sn | R | D | Nd | vd | θgF |
| 1 | 276.64953 | 1.500 | 2.10420 | 17.02 | 0.66311 |
| 2 | 106.19860 | 4.552 | 1.89190 | 37.13 | 0.57813 |
| 3 | −1677.82377 | 0.150 | | | |
| 4 | 56.33140 | 4.817 | 1.77250 | 49.60 | 0.55212 |
| 5 | 155.87618 | DD[5] | | | |
| *6 | 149.55316 | 1.500 | 1.80998 | 40.95 | 0.56644 |
| *7 | 13.57868 | 8.395 | | | |
| 8 | −17.68901 | 0.700 | 1.70300 | 52.38 | 0.55070 |
| 9 | −54.91943 | 0.875 | | | |
| 10 | 105.03887 | 3.591 | 1.94595 | 17.98 | 0.65460 |
| 11 | −46.32614 | 1.558 | | | |
| 12 | −20.64389 | 0.700 | 1.78880 | 28.43 | 0.60092 |
| 13 | −30.18069 | DD[13] | | | |
| 14(St) | ∞ | 0.500 | | | |
| *15 | 19.33407 | 5.075 | 1.68948 | 31.02 | 0.59874 |
| *16 | −182.20393 | 1.728 | | | |
| 17 | 41.69835 | 0.700 | 1.77830 | 23.91 | 0.62490 |
| 18 | 10.65894 | 4.233 | 1.59410 | 60.47 | 0.55516 |
| 19 | 20.25219 | 1.600 | | | |
| *20 | 16.23382 | 6.000 | 1.43875 | 94.66 | 0.53402 |
| *21 | −20.10236 | DD[21] | | | |
| 22 | 77.20179 | 2.000 | 1.85896 | 22.73 | 0.62844 |
| 23 | −120.80822 | 0.610 | 1.80440 | 39.59 | 0.57297 |
| 24 | 19.96950 | DD[24] | | | |
| 25 | 198.83439 | 3.010 | 1.95375 | 32.32 | 0.59056 |
| 26 | −77.70704 | 1.300 | 2.00100 | 29.14 | 0.59974 |
| 27 | 173.84906 | 1.124 | | | |
| *28 | −63.29840 | 3.294 | 1.58313 | 59.38 | 0.54237 |
| *29 | −27.70698 | 14.724 | | | |
| 30 | ∞ | 2.850 | 1.51680 | 64.20 | 0.53430 |
| 31 | ∞ | 1.000 | | | |

TABLE 14

| | Example 5 | | |
|---|---|---|---|
| | Wide-angle end | Middle | Telephoto end |
| Zr | 1.000 | 2.215 | 4.713 |
| f | 16.494 | 36.526 | 77.736 |
| FNo. | 4.12 | 4.13 | 4.13 |
| 2ω(°) | 86.6 | 40.8 | 19.8 |
| DD[5] | 0.800 | 12.774 | 34.757 |
| DD[13] | 19.916 | 6.256 | 1.433 |
| DD[211] | 2.494 | 3.934 | 2.492 |
| DD[24] | 3.953 | 18.598 | 32.685 |

TABLE 15

| | | Example 5 | | |
|---|---|---|---|---|
| Sn | 6 | 7 | 15 | 16 |
| KA | 1.0000000E+00 | 1.0000000E+00 | 1.0000000E+00 | 1.0000000E+00 |
| A3 | 0.0000000E+00 | 0.0000000E+00 | 0.0000000E+00 | 0.0000000E+00 |
| A4 | −2.3655363E−05 | −5.3728186E−05 | −3.4165966E−05 | −2.5732809E−05 |
| A5 | 2.8434972E−06 | 3.8702629E−06 | 9.0520891E−06 | 1.4563115E−05 |
| A6 | 1.2915494E−07 | −1.1307658E−07 | −1.7407849E−06 | −3.3956346E−06 |
| A7 | −1.5994964E−08 | −1.5080856E−08 | 6.7458682E−08 | 2.5664612E−07 |
| A8 | −1.1375601E−10 | 3.5036777E−09 | 1.2063751E−08 | 1.4397885E−08 |
| A9 | 2.9945832E−11 | −1.2107170E−10 | −1.1489145E−09 | −3.3702215E−09 |
| A10 | −1.9862184E−13 | −6.5028915E−12 | −6.5171513E−12 | 1.1861303E−10 |
| Sn | 20 | 21 | 28 | 29 |

TABLE 15-continued

| | Example 5 | | | |
|---|---|---|---|---|
| KA | 1.0000000E+00 | 1.0000000E+00 | 1.0000000E+00 | 1.0000000E+00 |
| A3 | 0.0000000E+00 | 0.0000000E+00 | 0.0000000E+00 | 0.0000000E+00 |
| A4 | −4.4280271E−05 | 4.4114101E−05 | 9.3389749E−06 | 4.0215836E−05 |
| A5 | −1.5653598E−05 | −1.5431545E−05 | 6.7261449E−06 | −8.4851556E−07 |
| A6 | 9.0540750E−06 | 7.7459060E−06 | −6.0563648E−07 | 1.9487091E−07 |
| A7 | −2.5669171E−06 | −1.9405480E−06 | 1.1966300E−08 | −3.1052206E−10 |
| A8 | 3.9472318E−07 | 2.7266272E−07 | 1.6794483E−09 | −1.8555477E−09 |
| A9 | −3.1668403E−08 | −2.0784346E−08 | −1.5723829E−10 | 8.6125504E−11 |
| A10 | 1.0098062E−09 | 6.4383577E−10 | 4.7559789E−12 | −1.2615438E−13 |

Example 6

Figure 6:
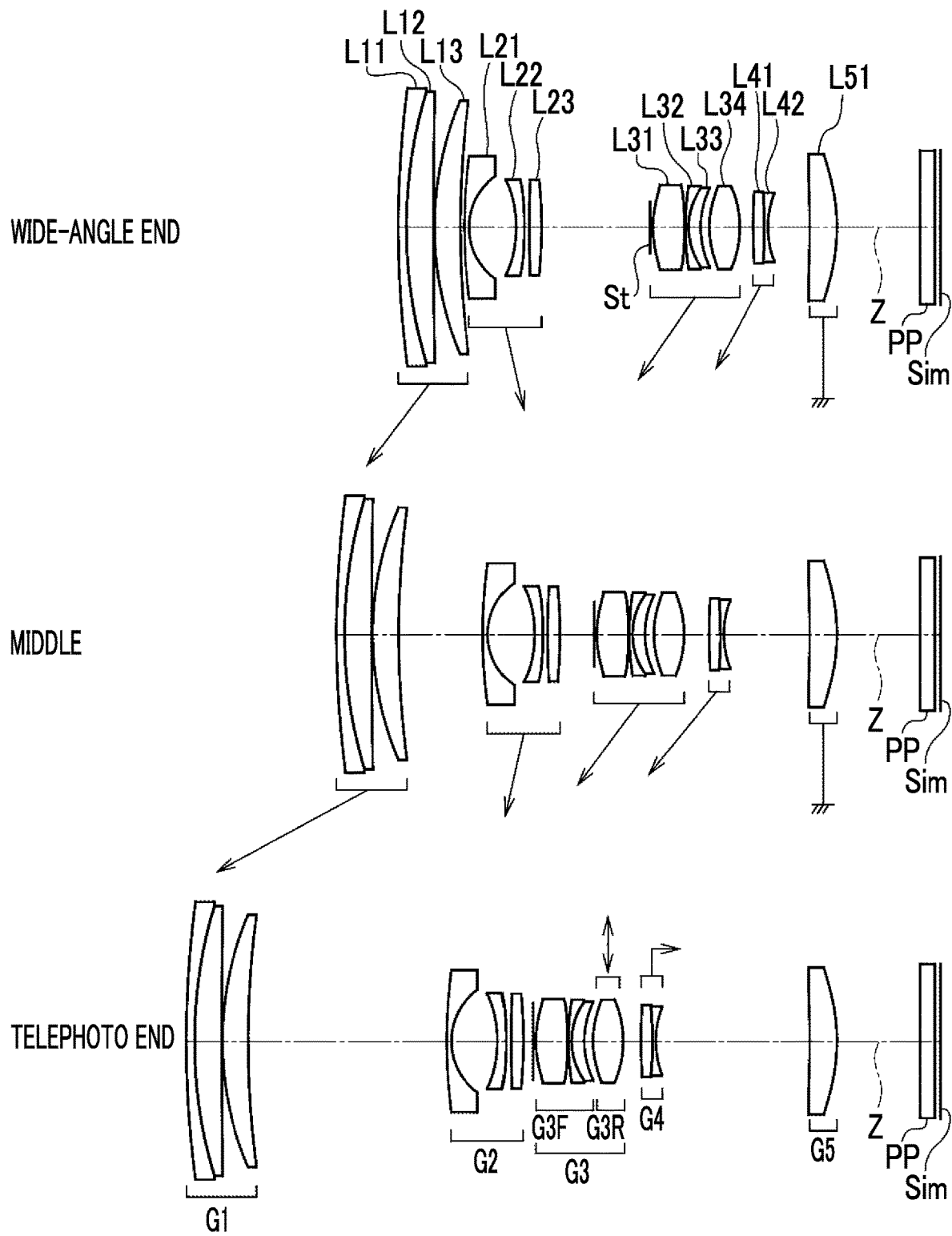
FIG. 6 is a cross-sectional view showing a configuration of a zoom lens of Example 6 of the present disclosure.
Figure 29:
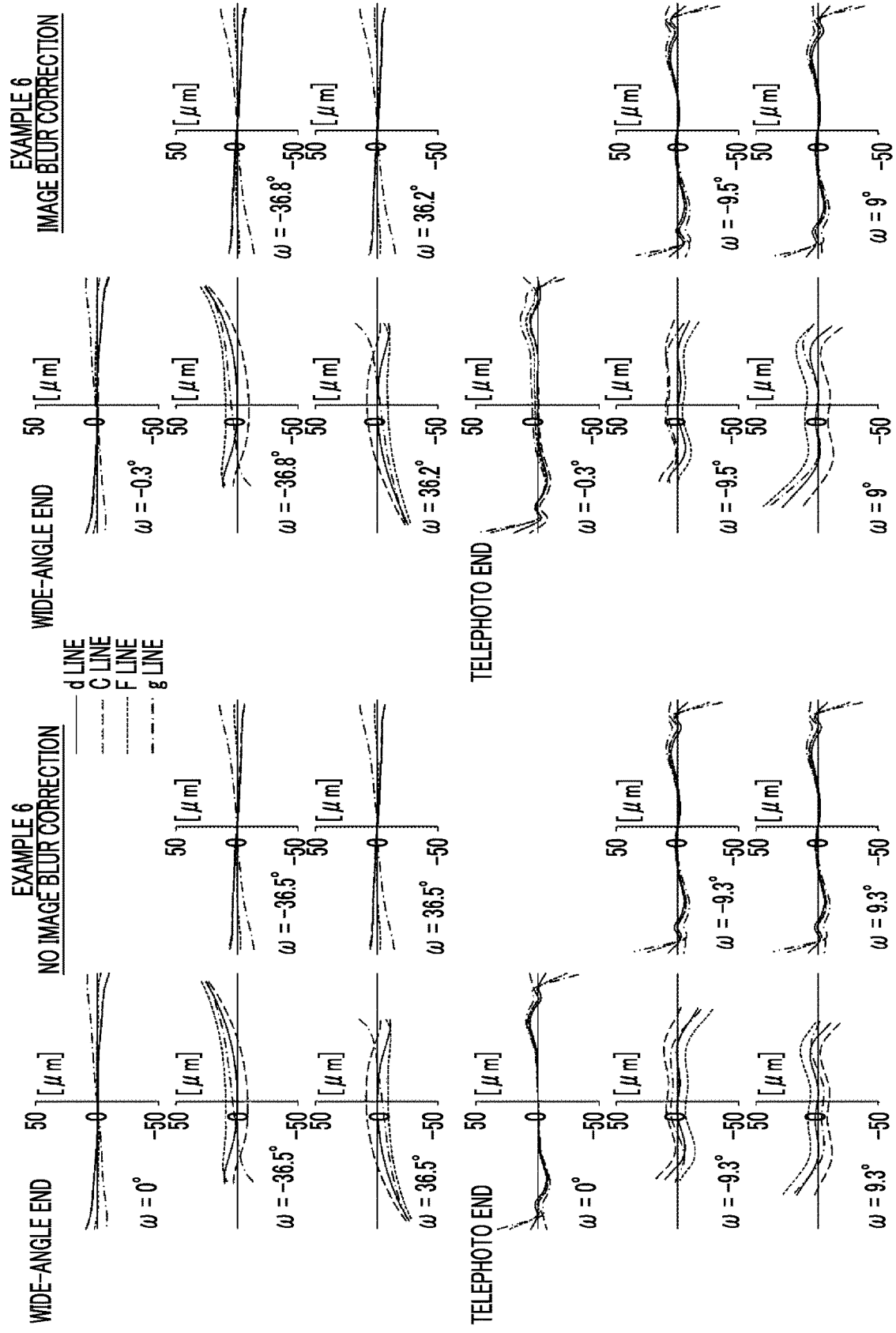
FIG. 29 shows lateral aberration diagrams of the zoom lens according to Example 6 of the present disclosure in a case of no image blur correction and in a case of image blur correction.

FIG. 6 is a cross-sectional view showing a configuration of the zoom lens of Example 6. In the zoom lens of Example 6, the second lens group G2 consists of three lenses L21 to L23 in order from the object side to the image side, and the fifth lens group G5 consists of one lens L51. Except for the points described above, the zoom lens has substantially the same configuration as that of the zoom lens of Example 1. Regarding the zoom lens of Example 6, Table 16 shows basic lens data, Table 17 shows specification and variable surface distances, Table 18 shows aspheric surface coefficients, and FIGS. 18 and 29 shows aberration diagrams.

TABLE 16

| Sn | R | D | Nd | νd | θgF |
|---|---|---|---|---|---|
| 1 | 195.53115 | 1.500 | 1.85896 | 22.73 | 0.62844 |
| 2 | 86.76544 | 5.023 | 1.72720 | 55.14 | 0.54272 |
| 3 | 1574.16747 | 0.150 | | | |
| 4 | 59.25939 | 4.789 | 1.74873 | 53.13 | 0.54497 |
| 5 | 176.68922 | DD[5] | | | |
| 6 | 95.14642 | 0.900 | 1.73147 | 54.85 | 0.54289 |
| 7 | 11.67452 | 8.554 | | | |
| *8 | −22.02773 | 1.500 | 1.69350 | 53.20 | 0.54661 |
| *9 | −73.73379 | 0.863 | | | |
| 10 | 181.48116 | 2.290 | 1.95906 | 17.47 | 0.65993 |
| 11 | −90.14539 | DD[11] | | | |
| 12(St) | ∞ | 0.500 | | | |
| *13 | 18.98763 | 5.806 | 1.68948 | 31.02 | 0.59874 |
| *14 | −103.40755 | 0.150 | | | |
| 15 | 46.67854 | 0.600 | 1.84700 | 22.65 | 0.62089 |
| 16 | 12.35452 | 2.337 | 1.59597 | 60.18 | 0.54388 |
| 17 | 16.67564 | 1.600 | | | |
| *18 | 16.37080 | 5.591 | 1.49700 | 81.61 | 0.53887 |
| *19 | −18.28048 | DD[19] | | | |
| 20 | 115.11383 | 2.111 | 1.89286 | 20.36 | 0.63944 |
| 21 | −72.73789 | 0.610 | 1.73800 | 32.33 | 0.59005 |
| 22 | 17.38170 | DD[22] | | | |
| *23 | −194.24953 | 5.000 | 1.58313 | 59.38 | 0.54237 |
| *24 | −35.49614 | 15.307 | | | |
| 25 | ∞ | 2.850 | 1.51680 | 64.20 | 0.53430 |
| 26 | ∞ | 1.000 | | | |

TABLE 17

| | Example 6 | | |
|---|---|---|---|
| | Wide-angle end | Middle | Telephoto end |
| Zr | 1.000 | 2.068 | 4.124 |
| f | 16.494 | 34.108 | 68.018 |
| FNo. | 4.12 | 4.12 | 4.12 |
| 2ω(°) | 86.8 | 43.4 | 22.8 |
| DD[5] | 0.800 | 15.581 | 36.540 |
| DD[11] | 19.977 | 6.249 | 1.786 |
| DD[19] | 2.498 | 4.682 | 3.255 |
| DD[22] | 7.702 | 15.844 | 28.468 |

TABLE 18

| | Example 6 | | | |
|---|---|---|---|---|
| Sn | 8 | 9 | 13 | 14 |
| KA | 1.0000000E+00 | 1.0000000E+00 | 1.0000000E+00 | 1.0000000E+00 |
| A3 | 0.0000000E+00 | 0.0000000E+00 | 0.0000000E+00 | 0.0000000E+00 |
| A4 | 4.7373189E−05 | 2.5192973E−05 | −6.3293482E−05 | −5.7886884E−05 |
| A5 | −9.6054676E−06 | −1.0829721E−05 | 6.7008866E−06 | 1.9094374E−06 |
| A6 | −4.9995523E−07 | −2.8512812E−07 | −2.2724721E−06 | −1.6043189E−06 |
| A7 | 1.8214891E−07 | 1.8202868E−07 | 1.5488404E−07 | 2.4076072E−07 |
| A8 | −8.7603437E−09 | −9.8345504E−09 | 1.0364797E−08 | −8.6072636E−09 |
| A9 | −1.0127774E−09 | −1.0026794E−09 | −2.2613856E−09 | −2.7327284E−09 |
| A10 | 6.8101188E−11 | 7.7857893E−11 | 4.1839797E−12 | 1.7631883E−10 |
| Sn | 18 | 19 | 23 | 24 |
| KA | 1.0000000E+00 | 1.0000000E+00 | 1.0000000E+00 | 1.0000000E+00 |
| A3 | 0.0000000E+00 | 0.0000000E+00 | 0.0000000E+00 | 0.0000000E+00 |
| A4 | −5.6626742E−05 | 2.3149554E−05 | −2.4360205E−05 | −7.3443391E−06 |
| A5 | −1.7898609E−05 | −3.4762525E−06 | 4.8569381E−06 | −9.4393343E−07 |
| A6 | 9.0631618E−06 | 5.4719541E−06 | −1.8355027E−07 | 4.6339658E−07 |
| A7 | −2.5725642E−06 | −1.9400684E−06 | −6.6976288E−09 | −2.2416225E−08 |
| A8 | 4.0370075E−07 | 3.0286510E−07 | 9.8021940E−10 | −1.6054852E−09 |

TABLE 18-continued

| | | Example 6 | | |
|---|---|---|---|---|
| A9 | −3.1983972E−08 | −2.1697419E−08 | −4.8407130E−11 | 1.6800329E−10 |
| A10 | 8.8530237E−10 | 4.7630221E−10 | 1.0659909E−12 | −3.9963385E−12 |

Example 7

Figure 7:
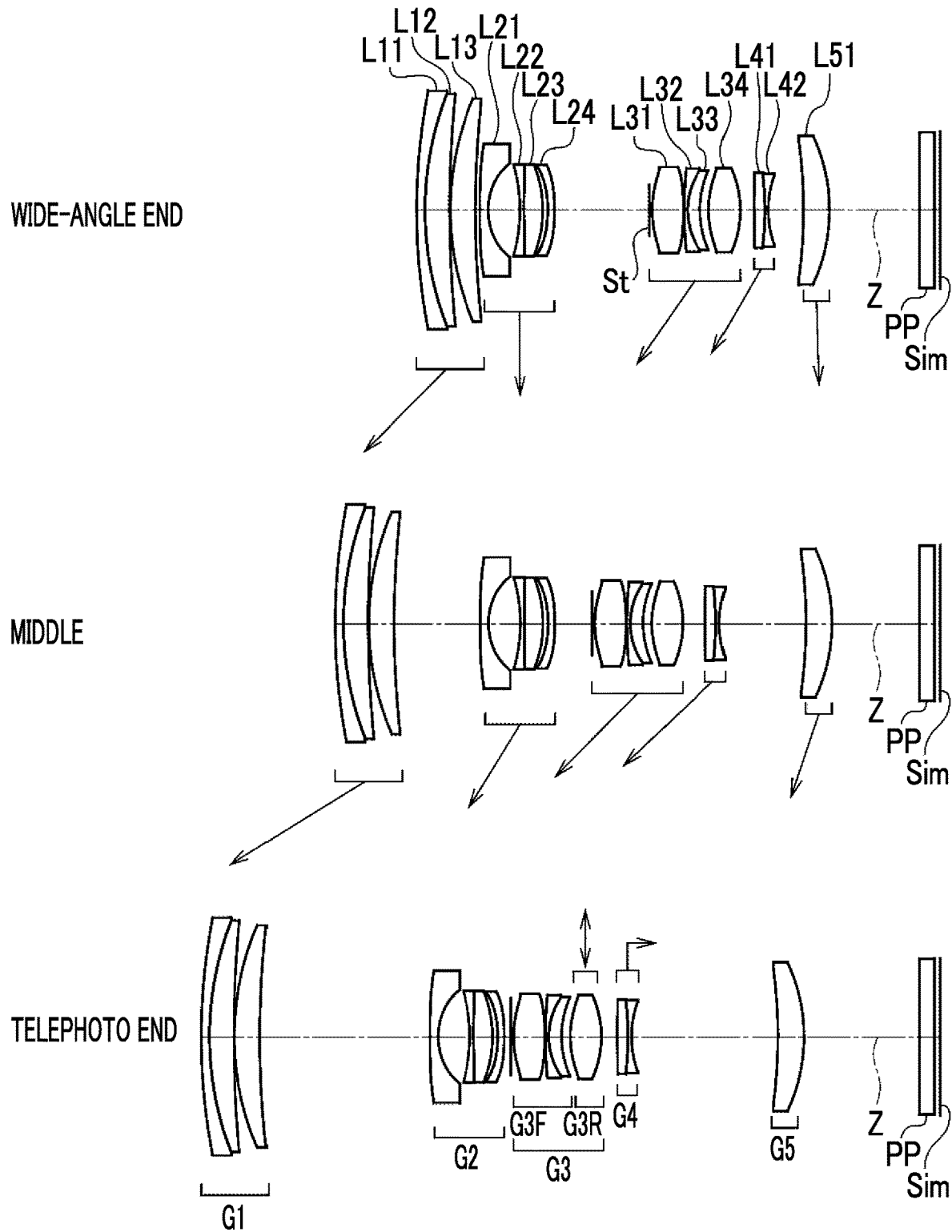
FIG. 7 is a cross-sectional view showing a configuration of a zoom lens of Example 7 of the present disclosure.
Figure 30:
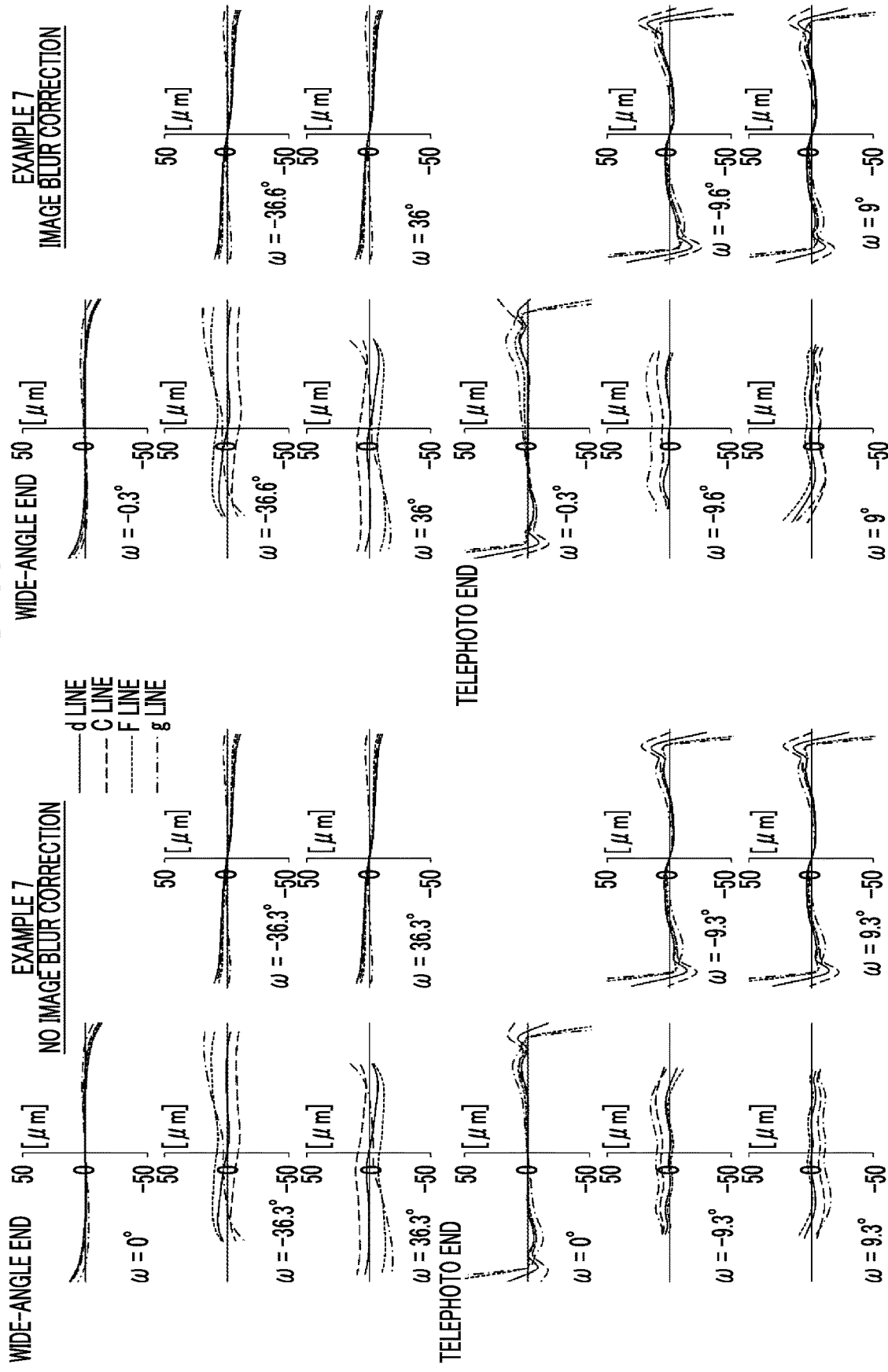
FIG. 30 shows lateral aberration diagrams of the zoom lens according to Example 7 of the present disclosure in a case of no image blur correction and in a case of image blur correction.

FIG. 7 is a cross-sectional view showing a configuration of the zoom lens of Example 7. In the zoom lens of Example 7, the fifth lens group G5 consists of one lens L51, and all the lens groups including the fifth lens group G5 move along the optical axis Z by changing all the distances in the direction of the optical axis of lens groups adjacent to each other during zooming. Except for the points described above, the zoom lens has substantially the same configuration as that of the zoom lens of Example 1. Regarding the zoom lens of Example 7, Table 19 shows basic lens data, Table 20 shows specification and variable surface distances, Table 21 shows aspheric surface coefficients, and FIGS. 19 and 30 shows aberration diagrams.

TABLE 19

| | | Example 7 | | | |
|---|---|---|---|---|---|
| Sn | R | D | Nd | νd | θgF |
| 1 | 113.64101 | 1.500 | 1.84666 | 23.78 | 0.62054 |
| 2 | 58.14689 | 4.447 | 1.71345 | 55.83 | 0.54270 |
| 3 | 211.06714 | 0.150 | | | |
| 4 | 51.16998 | 4.623 | 1.75865 | 52.14 | 0.54625 |
| 5 | 183.59726 | DD[5] | | | |
| *6 | 416.72917 | 1.500 | 1.80139 | 45.45 | 0.55814 |
| *7 | 12.09655 | 5.782 | | | |
| 8 | −29.29465 | 0.710 | 1.84701 | 43.30 | 0.56102 |
| 9 | 416.72918 | 3.417 | 1.87068 | 21.47 | 0.62537 |
| 10 | −22.00226 | 0.936 | | | |
| *11 | −24.17670 | 1.200 | 1.83135 | 33.60 | 0.58952 |
| *12 | −47.50496 | DD[12] | | | |
| 13(St) | ∞ | 0.500 | | | |
| *14 | 17.67089 | 5.666 | 1.68948 | 31.02 | 0.59874 |

TABLE 19-continued

| | | Example 7 | | | |
|---|---|---|---|---|---|
| Sn | R | D | Nd | νd | θgF |
| *15 | −46.67564 | 0.150 | | | |
| 16 | 77.29506 | 0.600 | 1.84700 | 22.65 | 0.62089 |
| 17 | 12.52123 | 2.313 | 1.54544 | 63.25 | 0.54027 |
| 18 | 17.13631 | 1.600 | | | |
| *19 | 16.87557 | 5.634 | 1.49700 | 81.61 | 0.53887 |
| *20 | −17.56029 | DD[20] | | | |
| 21 | 233.79674 | 1.952 | 1.89286 | 20.36 | 0.63944 |
| 22 | −55.17846 | 0.610 | 1.73800 | 32.33 | 0.59005 |
| 23 | 18.48020 | DD[23] | | | |
| 24 | −92.29233 | 4.722 | 1.68005 | 57.50 | 0.54262 |
| 25 | −31.83840 | DD[25] | | | |
| 26 | ∞ | 2.850 | 1.51680 | 64.20 | 0.53430 |
| 27 | ∞ | 1.000 | | | |

TABLE 20

| | Example 7 | | |
|---|---|---|---|
| | Wide-angle end | Middle | Telephoto end |
| Zr | 1.000 | 2.068 | 4.124 |
| f | 16.500 | 34.120 | 68.042 |
| FNo. | 4.12 | 4.12 | 4.12 |
| 2ω(°) | 85.8 | 43.4 | 22.8 |
| DD[5] | 0.800 | 15.662 | 30.734 |
| DD[121] | 17.213 | 6.756 | 1.182 |
| DD[20] | 2.497 | 4.102 | 2.872 |
| DD[23] | 6.364 | 15.608 | 26.540 |
| DD[251] | 16.346 | 15.900 | 20.967 |

TABLE 21

| | | Example 7 | | |
|---|---|---|---|---|
| Sn | 6 | 7 | 11 | 12 |
| KA | 1.0000000E+00 | 1.0000000E+00 | 1.0000000E+00 | 1.0000000E+00 |
| A3 | 0.0000000E+00 | 0.0000000E+00 | 0.0000000E+00 | 0.0000000E+00 |
| A4 | 1.8091328E−05 | −1.2314959E−05 | −2.5016662E−04 | −2.4329153E−04 |
| A5 | 5.1803351E−06 | 1.5867207E−05 | −5.0108301E−06 | −4.8645063E−06 |
| A6 | −1.9803780E−07 | −1.0912822E−06 | 3.7868352E−06 | 3.6275866E−06 |
| A7 | −3.7487095E−08 | −2.6542143E−08 | −2.8809156E−08 | −2.4969052E−08 |
| A8 | 1.2484754E−09 | 1.7170655E−08 | −2.7839049E−08 | −3.0653783E−08 |
| A9 | 9.2233607E−11 | −8.6841684E−11 | −6.3320407E−11 | 4.3472503E−11 |
| A10 | −3.3072791E−12 | −6.4486092E−11 | 5.4737239E−11 | 9.5255312E−11 |
| Sn | 14 | 15 | 19 | 20 |
| KA | 1.0000000E+00 | 1.0000000E+00 | 1.0000000E+00 | 1.0000000E+00 |
| A3 | 0.0000000E+00 | 0.0000000E+00 | 0.0000000E+00 | 0.0000000E+00 |
| A4 | −8.0910133E−05 | −5.5923151E−05 | −6.0529074E−05 | 2.8994012E−05 |
| A5 | 1.0582953E−05 | 1.0415673E−05 | −1.2842890E−05 | −2.9594968E−06 |
| A6 | −2.2364914E−06 | −3.5019710E−06 | 8.0452982E−06 | 5.2756847E−06 |
| A7 | −6.6409847E−08 | 3.2795082E−07 | −2.4875696E−06 | −1.9390444E−06 |
| A8 | 3.4546021E−08 | 4.0349678E−09 | 4.0134090E−07 | 3.0612004E−07 |
| A9 | −1.2577609E−09 | −4.4216452E−09 | −3.2658987E−08 | −2.1920891E−08 |
| A10 | −2.3812027E−10 | 2.0147480E−10 | 9.8120085E−10 | 4.9326041E−10 |

Example 8

Figure 8:
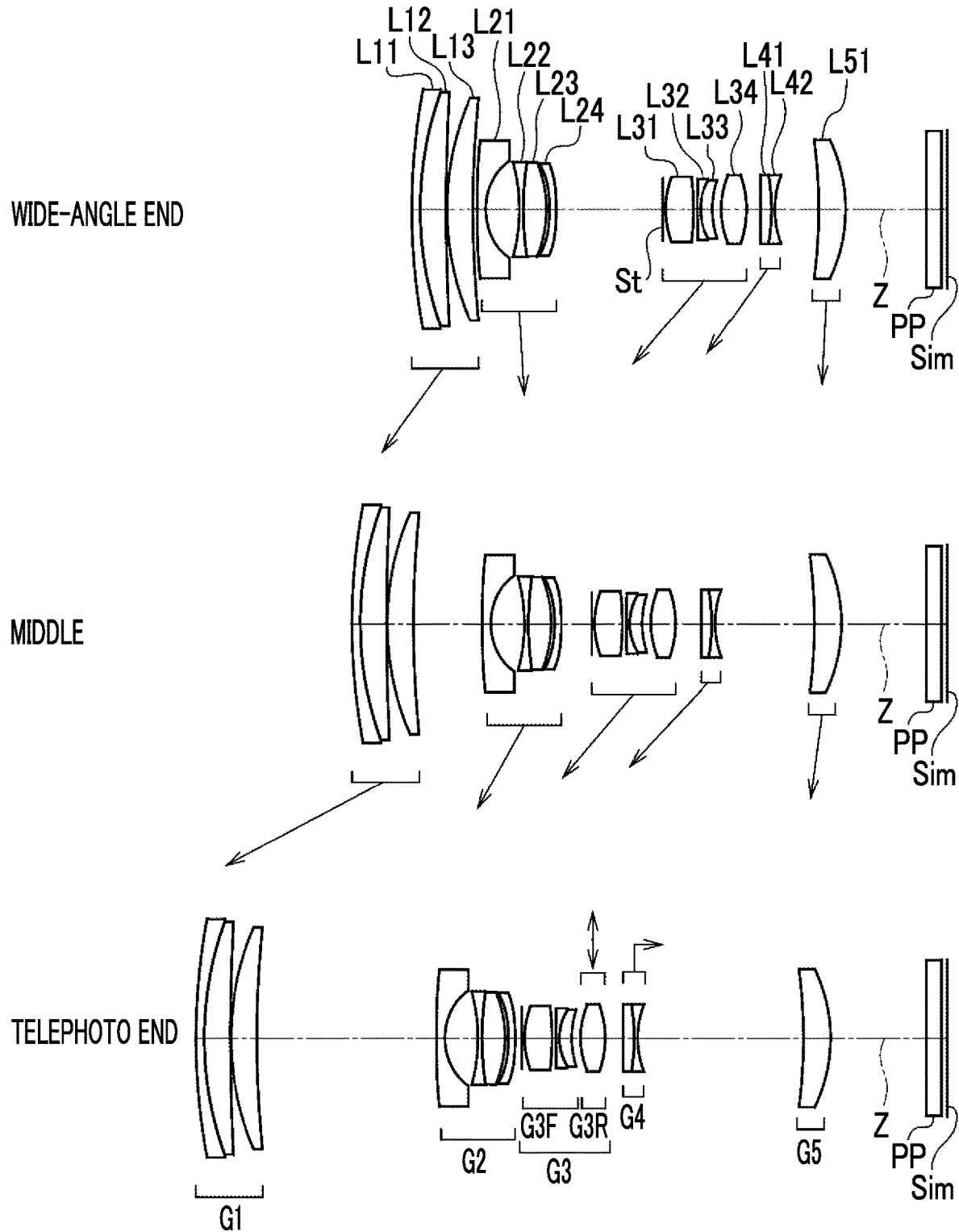
FIG. 8 is a cross-sectional view showing a configuration of a zoom lens of Example 8 of the present disclosure.
Figure 31:
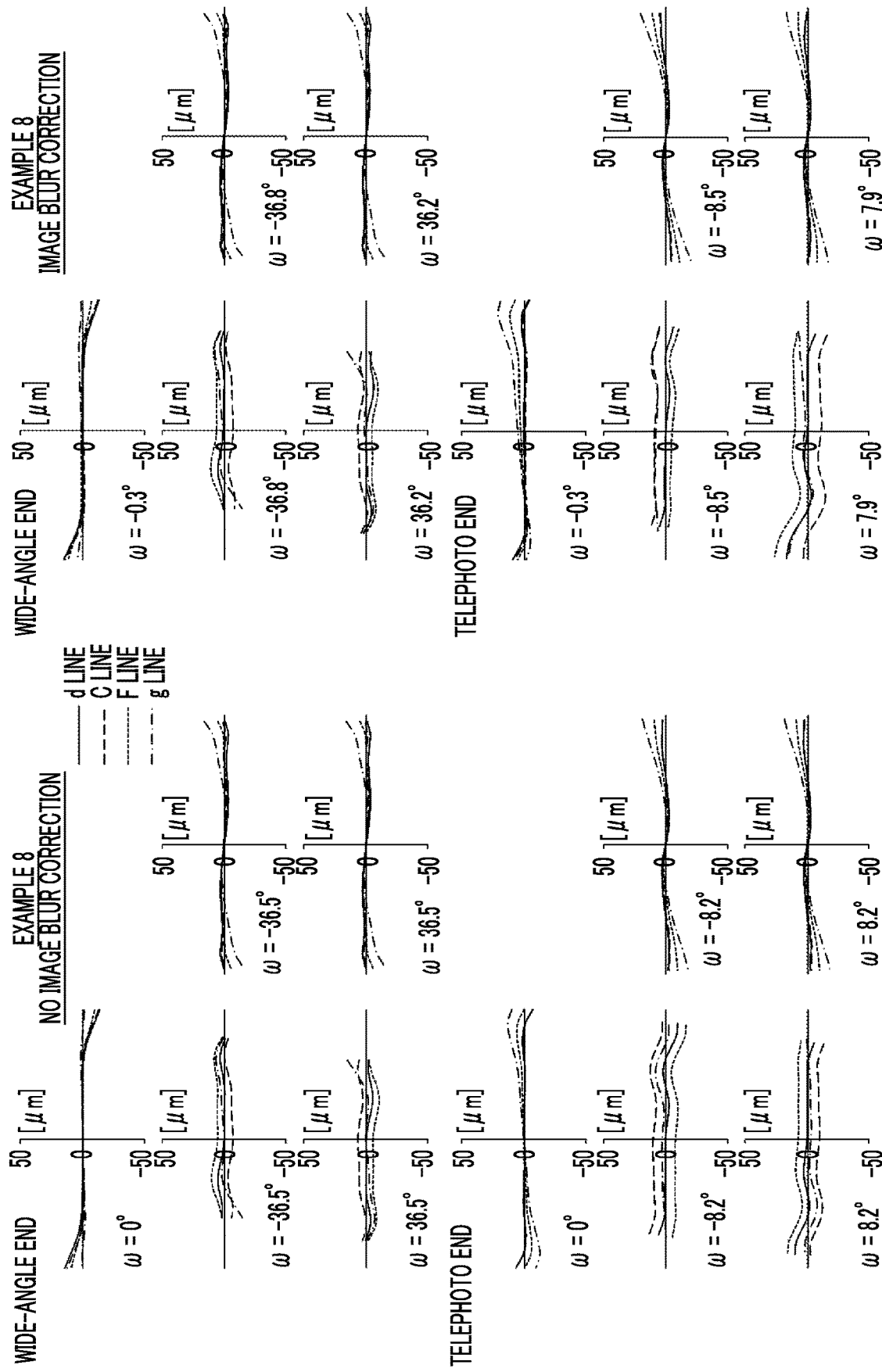
FIG. 31 shows lateral aberration diagrams of the zoom lens according to Example 8 of the present disclosure in a case of no image blur correction and in a case of image blur correction.

FIG. 8 is a cross-sectional view showing a configuration of the zoom lens of Example 8. In the zoom lens of Example 8, the fifth lens group G5 consists of one lens L51, and all the lens groups including the fifth lens group G5 move along the optical axis Z by changing all the distances in the direction of the optical axis of lens groups adjacent to each other during zooming. Except for the points described above, the zoom lens has substantially the same configuration as that of the zoom lens of Example 1. Regarding the zoom lens of Example 8, Table 22 shows basic lens data, Table 23 shows specification and variable surface distances, Table 24 shows aspheric surface coefficients, and FIGS. 20 and 31 shows aberration diagrams.

TABLE 22

Example 8

| Sn | R | D | Nd | vd | θgF |
|---|---|---|---|---|---|
| 1 | 116.96901 | 1.500 | 1.84666 | 23.78 | 0.62054 |
| 2 | 62.11394 | 4.708 | 1.65474 | 58.76 | 0.54248 |
| 3 | 393.92446 | 0.150 | | | |
| 4 | 50.08602 | 4.780 | 1.68308 | 57.35 | 0.54263 |
| 5 | 195.33798 | DD[5] | | | |
| *6 | 416.66645 | 1.500 | 1.80139 | 45.45 | 0.55814 |
| *7 | 11.69322 | 6.093 | | | |
| 8 | −31.71325 | 0.700 | 1.78877 | 49.12 | 0.55057 |

TABLE 22-continued

Example 8

| Sn | R | D | Nd | vd | θgF |
|---|---|---|---|---|---|
| 9 | 57.59597 | 4.182 | 1.78199 | 25.90 | 0.60989 |
| 10 | −21.59297 | 0.613 | | | |
| *11 | −27.18976 | 1.200 | 1.85135 | 40.10 | 0.56954 |
| *12 | −55.92124 | DD[12] | | | |
| 13(St) | ∞ | 0.500 | | | |
| *14 | 15.27381 | 5.029 | 1.68948 | 31.02 | 0.59874 |
| *15 | −58.57788 | 0.710 | | | |
| 16 | 135.18908 | 0.600 | 1.79459 | 25.27 | 0.61188 |
| 17 | 9.93672 | 2.231 | 1.53610 | 63.61 | 0.53967 |

TABLE 22-continued

Example 8

| Sn | R | D | Nd | vd | θgF |
|---|---|---|---|---|---|
| 18 | 16.62362 | 1.600 | | | |
| *19 | 14.45534 | 4.452 | 1.49700 | 81.61 | 0.53887 |
| *20 | −17.34341 | DD[20] | | | |
| 21 | 1369.27629 | 1.999 | 1.89286 | 20.36 | 0.63944 |
| 22 | −36.54413 | 0.610 | 1.73800 | 32.33 | 0.59005 |
| 23 | 17.08005 | DD[23] | | | |
| 24 | −96.75442 | 4.883 | 1.51599 | 53.22 | 0.55385 |
| 25 | −28.74283 | DD[25] | | | |
| 26 | ∞ | 2.850 | 1.51680 | 64.20 | 0.53430 |
| 27 | ∞ | 1.000 | | | |

TABLE 23

Example 8

| | Wide-angle end | Middle | Telephoto end |
|---|---|---|---|
| Zr | 1.000 | 2.215 | 4.713 |
| f | 16.495 | 36.528 | 77.740 |
| FNo. | 3.61 | 4.79 | 5.72 |
| 2ω(°) | 86.4 | 41.2 | 20.2 |
| DD[5] | 0.800 | 12.570 | 32.398 |
| DD[12] | 19.269 | 5.515 | 1.182 |
| DD[20] | 2.498 | 4.663 | 3.260 |
| DD[23] | 7.924 | 17.849 | 29.971 |
| DD[25] | 14.660 | 15.418 | 17.415 |

TABLE 24

Example 8

| Sn | 6 | 7 | 11 | 12 |
|---|---|---|---|---|
| KA | 1.0000000E+00 | 1.0000000E+00 | 1.0000000E+00 | 1.0000000E+00 |
| A3 | 0.0000000E+00 | 0.0000000E+00 | 0.0000000E+00 | 0.0000000E+00 |
| A4 | −5.3370017E−05 | −9.2240206E−05 | −2.1397479E−04 | −2.0580119E−04 |
| A5 | 1.2857344E−05 | 2.4601542E−05 | −4.8937900E−06 | −7.8781394E−06 |
| A6 | 2.7493740E−09 | −1.0854913E−06 | 3.2921030E−06 | 3.5195188E−06 |
| A7 | −9.9469272E−08 | −1.2258560E−07 | 9.0515517E−09 | 5.6459044E−08 |
| A8 | 2.5543665E−09 | 2.5391244E−08 | −2.1559518E−08 | −3.4837612E−08 |
| A9 | 2.4298503E−10 | 3.1239151E−10 | −4.2937320E−10 | −5.6547589E−10 |
| A10 | −9.4647334E−12 | −1.1498912E−10 | 1.1400081E−11 | 1.2284443E−10 |
| Sn | 14 | 15 | 19 | 20 |
| KA | 1.0000000E+00 | 1.0000000E+00 | 1.0000000E+00 | 1.0000000E+00 |
| A3 | 0.0000000E+00 | 0.0000000E+00 | 0.0000000E+00 | 0.0000000E+00 |
| A4 | −5.8998224E−05 | −4.3126794E−05 | −1.0850211E−04 | 1.1213377E−05 |
| A5 | 8.9478792E−07 | 3.1985514E−06 | 2.2247176E−06 | 1.0635823E−05 |
| A6 | −1.1123416E−06 | −2.4298590E−06 | 6.0320674E−06 | 3.6812248E−06 |
| A7 | 4.0793820E−08 | 3.6302388E−07 | −2.5907002E−06 | −2.0738128E−06 |
| A8 | 1.0171003E−08 | −1.9800330E−08 | 4.3938268E−07 | 3.4144147E−07 |
| A9 | −2.3885984E−09 | −4.7031909E−09 | −3.2513951E−08 | −2.1331256E−08 |
| A10 | −1.2813731E−10 | 3.1586098E−10 | 7.8340797E−10 | 2.8684695E−10 |

Example 9

Figure 9:
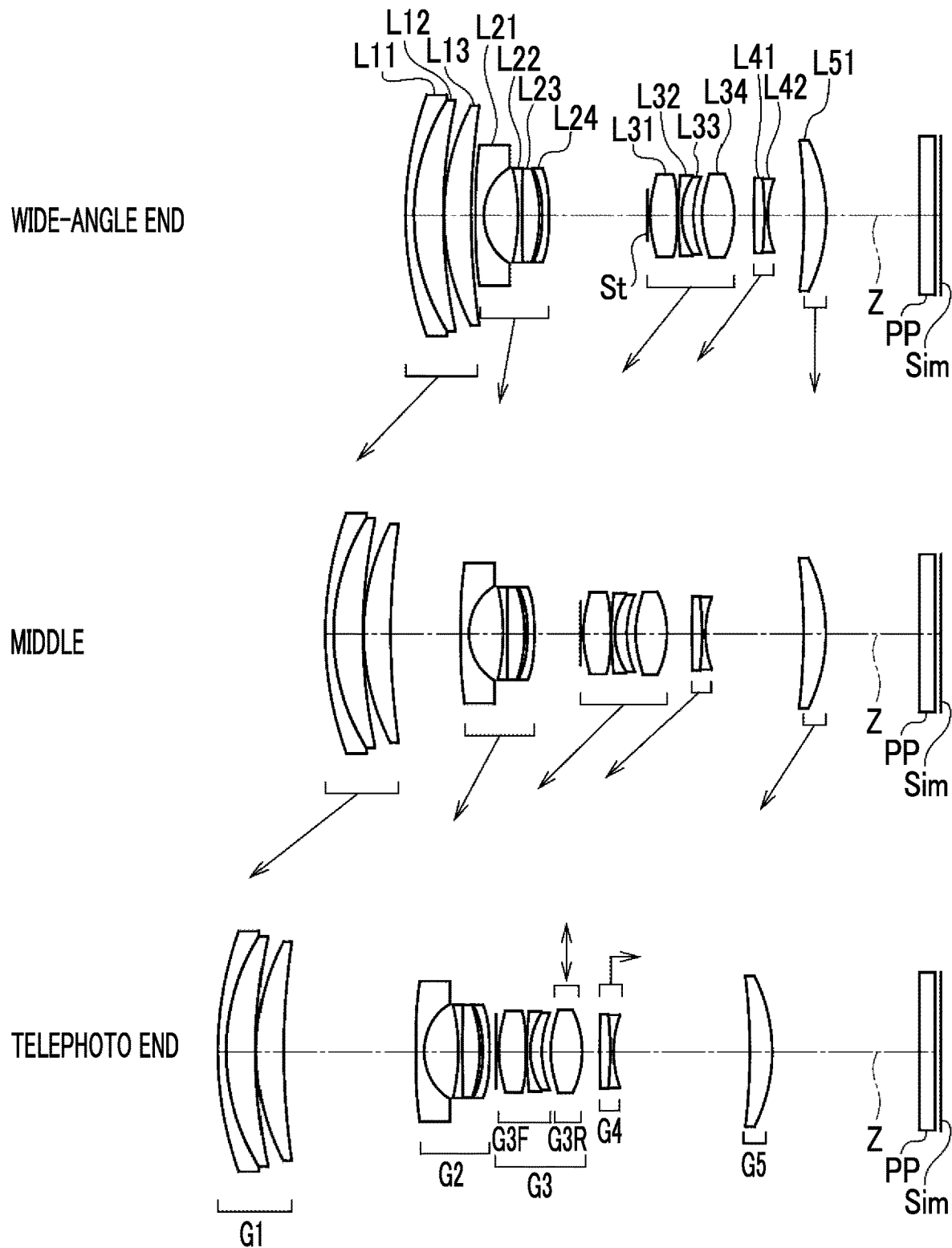
FIG. 9 is a cross-sectional view showing a configuration of a zoom lens of Example 9 of the present disclosure.
Figure 32:
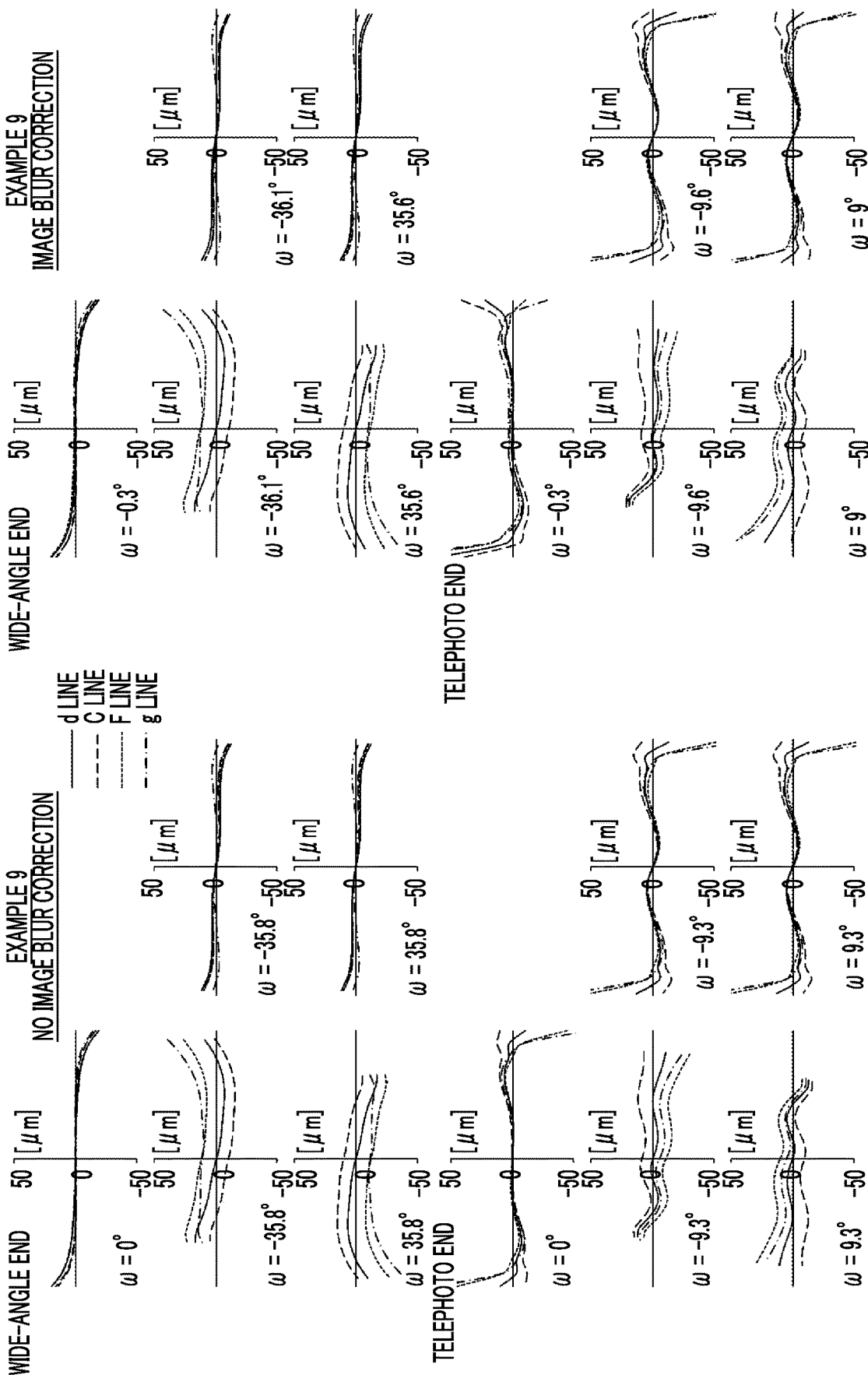
FIG. 32 shows lateral aberration diagrams of the zoom lens according to Example 9 of the present disclosure in a case of no image blur correction and in a case of image blur correction.

FIG. 9 is a cross-sectional view showing a configuration of the zoom lens of Example 9. In the zoom lens of Example 9, the fifth lens group G5 consists of one lens L51, and all the lens groups including the fifth lens group G5 move along the optical axis Z by changing all the distances in the direction of the optical axis of lens groups adjacent to each other during zooming. Except for the points described above, the zoom lens has substantially the same configuration as that of the zoom lens of Example 1. Regarding the zoom lens of Example 9, Table 25 shows basic lens data, Table 26 shows specification and variable surface distances, Table 27 shows aspheric surface coefficients, and FIGS. 21 and 32 shows aberration diagrams.

TABLE 25

Example 9

| Sn | R | D | Nd | vd | θgF |
|---|---|---|---|---|---|
| 1 | 63.32268 | 1.500 | 1.84666 | 23.78 | 0.62054 |
| 2 | 39.15094 | 5.253 | 1.73001 | 51.57 | 0.55042 |
| 3 | 96.46578 | 0.150 | | | |
| 4 | 42.55067 | 4.863 | 1.78112 | 49.89 | 0.54941 |
| 5 | 132.53932 | DD[5] | | | |
| *6 | 416.72918 | 1.500 | 1.80139 | 45.45 | 0.55814 |
| *7 | 10.83401 | 6.151 | | | |
| 8 | −37.04296 | 0.710 | 1.84700 | 43.30 | 0.56102 |
| 9 | 416.72918 | 3.122 | 1.86858 | 21.57 | 0.62497 |

TABLE 25-continued

Example 9

| Sn | R | D | Nd | vd | θgF |
|---|---|---|---|---|---|
| 10 | −25.51502 | 0.550 | | | |
| *11 | −33.55142 | 1.200 | 1.84701 | 43.30 | 0.56102 |
| *12 | −85.47266 | DD[12] | | | |
| 13(St) | ∞ | 0.500 | | | |
| *14 | 18.30004 | 4.910 | 1.68948 | 31.02 | 0.59874 |
| *15 | −60.60573 | 0.150 | | | |
| 16 | 68.05349 | 0.600 | 1.84064 | 23.16 | 0.61917 |
| 17 | 12.81549 | 2.135 | 1.52740 | 52.31 | 0.55580 |
| 18 | 17.34604 | 1.600 | | | |
| *19 | 17.58352 | 5.629 | 1.49700 | 81.61 | 0.53887 |
| *20 | −16.81802 | DD[20] | | | |
| 21 | 216.54557 | 1.882 | 1.85896 | 22.73 | 0.62844 |
| 22 | −59.49832 | 0.610 | 1.73800 | 32.33 | 0.59005 |
| 23 | 19.04753 | DD[23] | | | |
| 24 | −112.34760 | 4.008 | 1.67878 | 53.85 | 0.55001 |
| 25 | −30.30405 | DD[25] | | | |
| 26 | ∞ | 2.850 | 1.51680 | 64.20 | 0.53430 |
| 27 | ∞ | 1.000 | | | |

TABLE 26

Example 9

| | Wide-angle end | Middle | Telephoto end |
|---|---|---|---|
| Zr | 1.000 | 2.068 | 4.124 |
| f | 16.524 | 34.170 | 68.141 |
| FNo. | 4.12 | 4.12 | 4.12 |
| 2ω(°) | 84.8 | 43.8 | 23.0 |
| DD[5] | 0.800 | 12.584 | 23.745 |
| DD[12] | 17.648 | 8.336 | 1.165 |
| DD[20] | 3.540 | 4.468 | 3.155 |
| DD[23] | 6.481 | 17.463 | 24.384 |
| DD[25] | 16.802 | 16.887 | 26.509 |

TABLE 27

Example 9

| Sn | 6 | 7 | 11 | 12 |
|---|---|---|---|---|
| KA | 1.0000000E+00 | 1.0000000E+00 | 1.0000000E+00 | 1.0000000E+00 |
| A3 | 0.0000000E+00 | 0.0000000E+00 | 0.0000000E+00 | 0.0000000E+00 |
| A4 | 1.2483959E−05 | −2.1822112E−05 | −2.4682274E−04 | −2.4670708E−04 |
| A5 | 5.1148046E−06 | 1.2567627E−05 | −5.2400186E−06 | −5.6908412E−06 |
| A6 | −1.7791453E−07 | −4.9607841E−07 | 3.9026046E−06 | 3.7077117E−06 |
| A7 | −3.8805889E−08 | −1.4624386E−08 | −9.7211739E−09 | 1.3124815E−11 |
| A8 | 1.5642458E−09 | 1.1750599E−08 | −2.8850749E−08 | −3.1460097E−08 |
| A9 | 7.1751179E−11 | −1.7414577E−10 | 1.3812847E−11 | 4.0932415E−11 |
| A10 | −3.3762849E−12 | −1.0037514E−11 | 6.7087029E−11 | 8.9012201E−11 |

| Sn | 14 | 15 | 19 | 20 |
|---|---|---|---|---|
| KA | 1.0000000E+00 | 1.0000000E+00 | 1.0000000E+00 | 1.0000000E+00 |
| A3 | 0.0000000E+00 | 0.0000000E+00 | 0.0000000E+00 | 0.0000000E+00 |
| A4 | −8.6565866E−05 | −8.0561004E−05 | −7.6341409E−05 | 1.0148045E−05 |
| A5 | 9.8877771E−06 | 1.2318453E−05 | −1.3773755E−05 | 1.0168377E−07 |
| A6 | −2.1362462E−06 | −3.7643994E−06 | 8.4739468E−06 | 4.9693136E−06 |
| A7 | −8.2316639E−08 | 3.1662448E−07 | −2.5212635E−06 | −1.9345842E−06 |
| A8 | 3.3253841E−08 | 5.3583168E−09 | 3.9874662E−07 | 3.0330134E−07 |
| A9 | −1.3565995E−09 | −4.4399578E−09 | −3.2945861E−08 | −2.2069840E−08 |
| A10 | −2.3862198E−10 | 1.9520412E−10 | 9.7946305E−10 | 4.8729525E−10 |

Example 10

Figure 10:
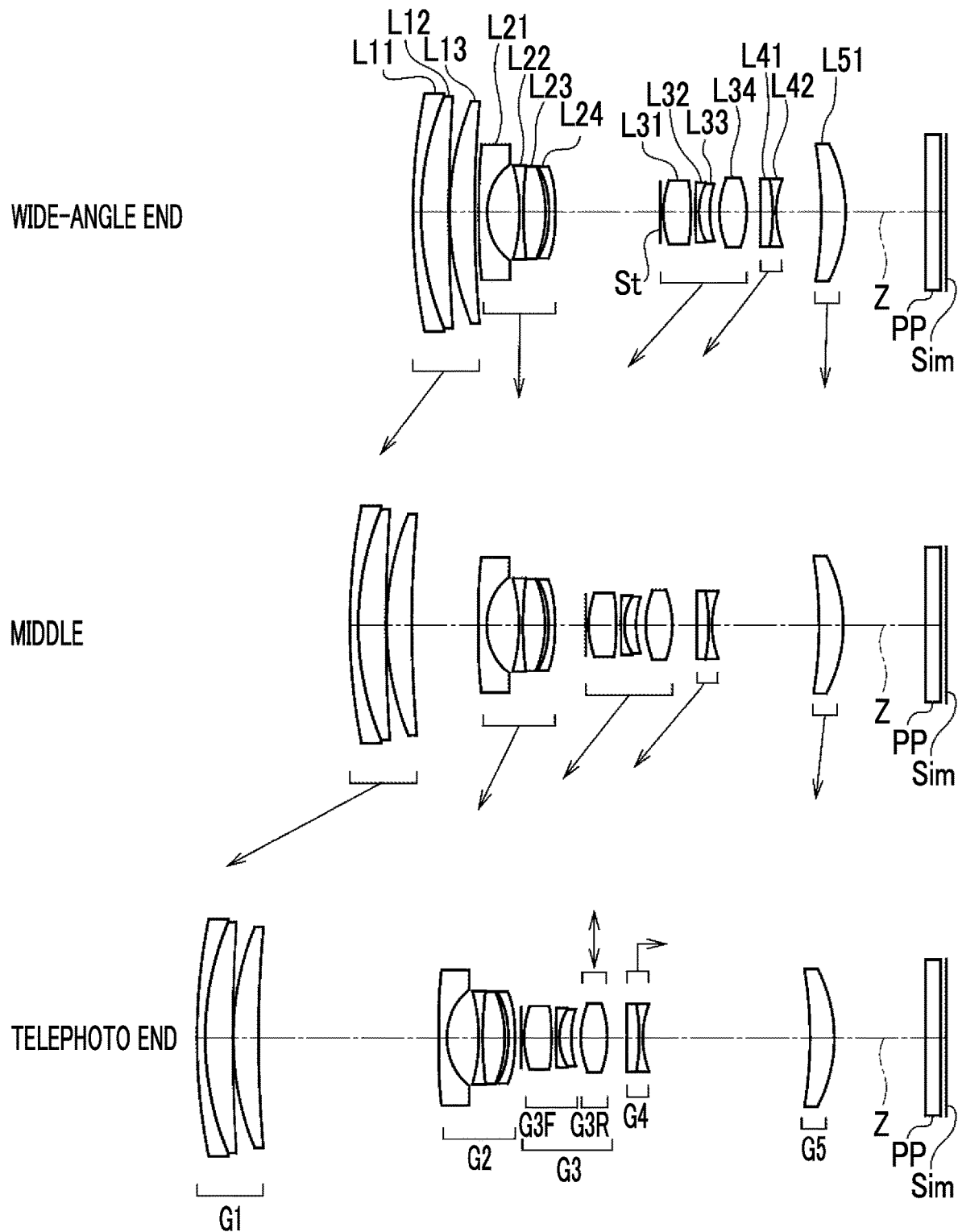
FIG. 10 is a cross-sectional view showing a configuration of a zoom lens of Example 10 of the present disclosure.
Figure 33:
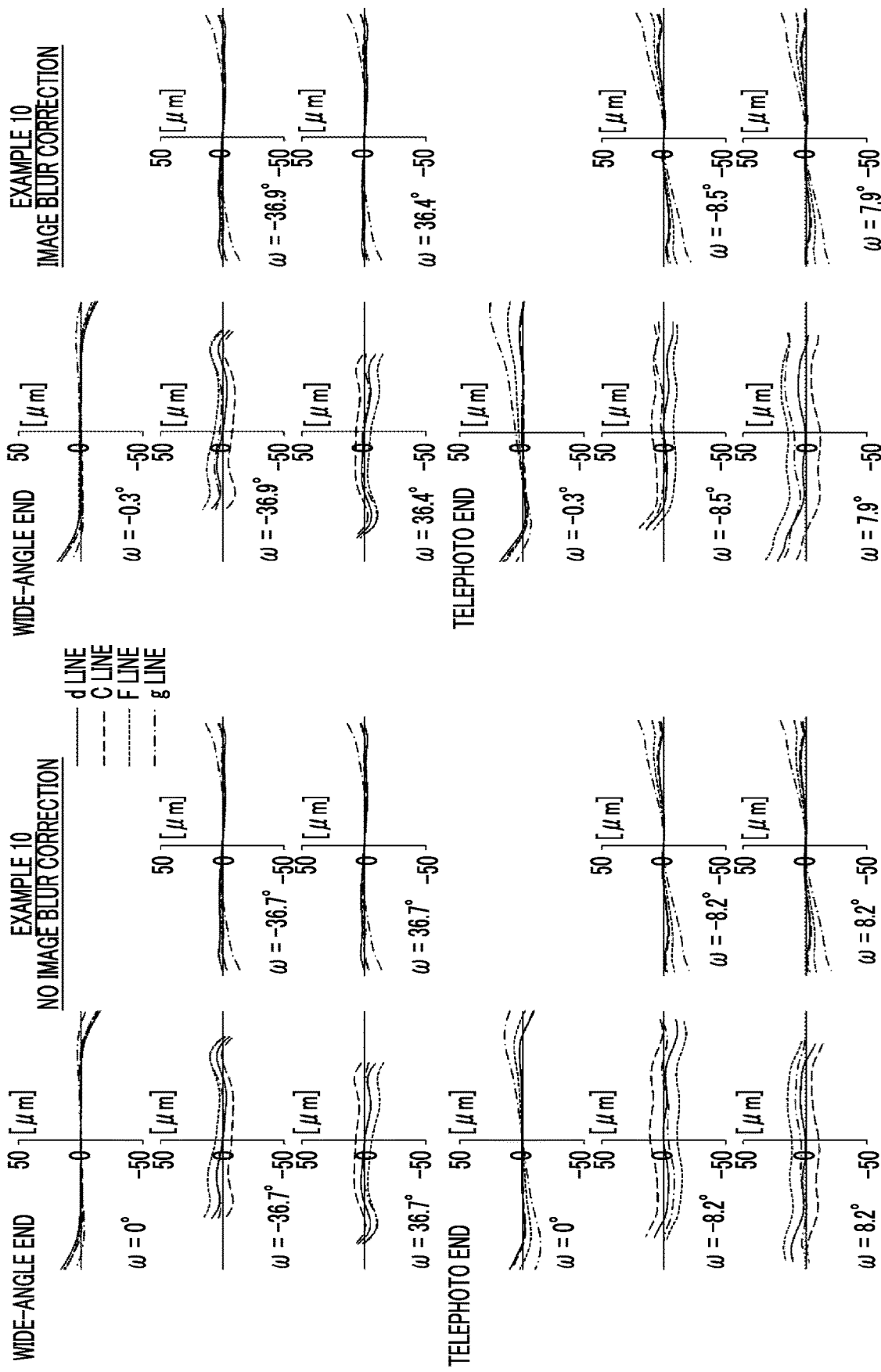
FIG. 33 shows lateral aberration diagrams of the zoom lens according to Example 10 of the present disclosure in a case of no image blur correction and in a case of image blur correction.

FIG. 10 is a cross-sectional view showing a configuration of the zoom lens of Example 10. In the zoom lens of Example 10, the fifth lens group G5 consists of one lens L51, and all the lens groups including the fifth lens group G5 move along the optical axis Z by changing all the distances in the direction of the optical axis of lens groups adjacent to each other during zooming. Except for the points described above, the zoom lens has substantially the same configuration as that of the zoom lens of Example 1. Regarding the zoom lens of Example 10, Table 28 shows basic lens data, Table 29 shows specification and variable surface distances, Table 30 shows aspheric surface coefficients, and FIGS. 22 and 33 shows aberration diagrams.

TABLE 28

Example 10

| Sn | R | D | Nd | vd | θgF |
|---|---|---|---|---|---|
| 1 | 110.51724 | 1.500 | 1.84666 | 23.78 | 0.62054 |
| 2 | 55.36877 | 5.023 | 1.64850 | 53.02 | 0.55487 |
| 3 | 315.13587 | 0.150 | | | |
| 4 | 53.12546 | 4.604 | 1.72818 | 52.65 | 0.54819 |

TABLE 28-continued

Example 10

| Sn | R | D | Nd | vd | θgF |
|---|---|---|---|---|---|
| 5 | 223.06908 | DD[5] | | | |
| *6 | 416.61482 | 1.500 | 1.80139 | 45.45 | 0.55814 |
| *7 | 12.08307 | 5.872 | | | |
| 8 | −31.48789 | 0.700 | 1.79921 | 48.08 | 0.55222 |
| 9 | 67.98488 | 4.020 | 1.79300 | 25.35 | 0.61163 |
| 10 | −21.48315 | 0.651 | | | |
| *11 | −24.95184 | 1.200 | 1.85135 | 40.10 | 0.56954 |
| *12 | −53.43944 | DD[12] | | | |
| 13(St) | ∞ | 0.500 | | | |
| *14 | 15.38319 | 4.983 | 1.68948 | 31.02 | 0.59874 |
| *15 | −56.10848 | 0.854 | | | |
| 16 | 193.00748 | 0.600 | 1.81718 | 25.31 | 0.61244 |
| 17 | 10.21793 | 2.123 | 1.53291 | 63.71 | 0.53949 |
| 18 | 16.53024 | 1.768 | | | |
| *19 | 14.54004 | 4.814 | 1.53775 | 74.70 | 0.53936 |
| *20 | −17.19165 | DD[20] | | | |
| 21 | −893.74776 | 2.227 | 1.89286 | 20.36 | 0.63944 |
| 22 | −33.66060 | 0.610 | 1.73800 | 32.33 | 0.59005 |
| 23 | 16.84692 | DD[23] | | | |
| 24 | −76.65356 | 4.390 | 1.51600 | 59.57 | 0.54486 |
| 25 | −26.95790 | DD[25] | | | |
| 26 | ∞ | 2.850 | 1.51680 | 64.20 | 0.53430 |
| 27 | ∞ | 1.000 | | | |

TABLE 29

Example 10

| | Wide-angle end | Middle | Telephoto end |
|---|---|---|---|
| Zr | 1.000 | 2.215 | 4.713 |
| f | 16.503 | 36.546 | 77.777 |
| FNo. | 3.61 | 4.84 | 5.77 |
| 2ω(°) | 87.0 | 41.4 | 20.2 |
| DD[5] | 0.800 | 12.167 | 32.605 |
| DD[12] | 19.040 | 5.621 | 1.169 |
| DD[20] | 2.499 | 4.521 | 3.573 |
| DD[23] | 8.190 | 19.285 | 30.369 |
| DD[25] | 14.585 | 14.988 | 16.619 |

TABLE 30

Example 10

| Sn | 6 | 7 | 11 | 12 |
|---|---|---|---|---|
| KA | 1.0000000E+00 | 1.0000000E+00 | 1.0000000E+00 | 1.0000000E+00 |
| A3 | 0.0000000E+00 | 0.0000000E+00 | 0.0000000E+00 | 0.0000000E+00 |
| A4 | −5.0917286E−05 | −8.8075470E−05 | −2.1379959E−04 | −2.0413890E−04 |
| A5 | 1.2781851E−05 | 2.4829902E−05 | −5.0991835E−06 | −7.8919736E−06 |
| A6 | −3.2468558E−09 | −1.1836899E−06 | 3.3263984E−06 | 3.5371433E−06 |
| A7 | −9.9764766E−08 | −1.0715768E−07 | 1.9812913E−08 | 5.5232556E−08 |
| A8 | 2.5347225E−09 | 2.4607403E−08 | −2.2830503E−08 | −3.4472923E−08 |
| A9 | 2.4339282E−10 | 2.5218920E−10 | −4.3353828E−10 | −5.6005695E−10 |
| A10 | −9.2161232E−12 | −1.1775357E−10 | 1.1269996E−11 | 1.2018373E−10 |

| Sn | 14 | 15 | 19 | 20 |
|---|---|---|---|---|
| KA | 1.0000000E+00 | 1.0000000E+00 | 1.0000000E+00 | 1.0000000E+00 |
| A3 | 0.0000000E+00 | 0.0000000E+00 | 0.0000000E+00 | 0.0000000E+00 |
| A4 | −5.6765193E−05 | −4.4655190E−05 | −1.0074194E−04 | 2.4509451E−05 |
| A5 | −1.3128489E−06 | 4.8343020E−07 | −5.3553740E−06 | 7.1248534E−06 |
| A6 | −1.0972584E−06 | −2.4736241E−06 | 5.6518125E−06 | 3.5612444E−06 |
| A7 | 2.8407847E−08 | 3.5501580E−07 | −2.5162466E−06 | −2.0291991E−06 |
| A8 | 1.0487077E−08 | −1.9909438E−08 | 4.3729982E−07 | 3.4086074E−07 |
| A9 | −2.7278899E−09 | −4.5520823E−09 | −3.2450348E−08 | −2.1485957E−08 |
| A10 | −1.2685596E−10 | 3.1668339E−10 | 7.6894063E−10 | 2.8683412E−10 |

Example 11

Figure 11:
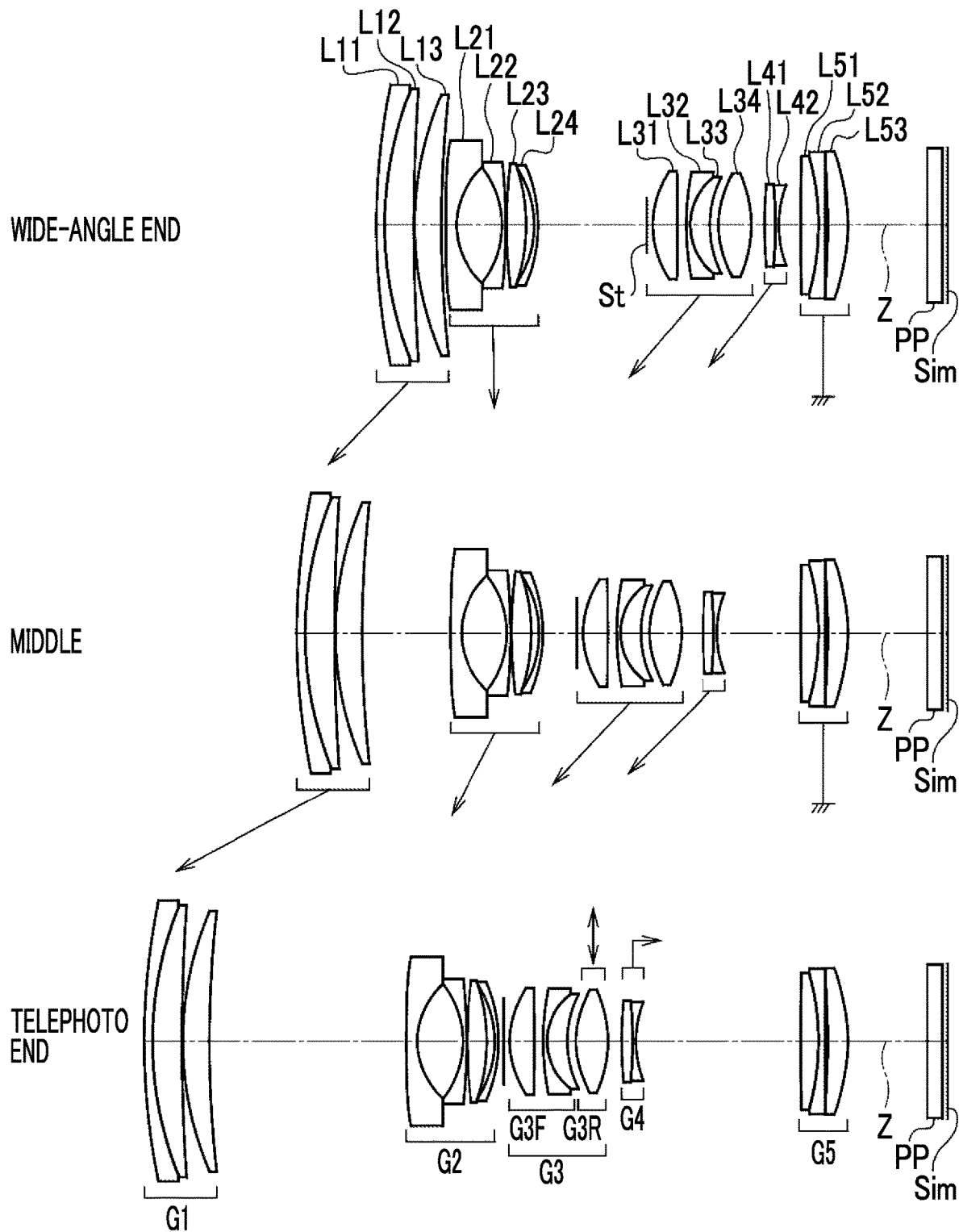
FIG. 11 is a cross-sectional view showing a configuration of a zoom lens of Example 11 of the present disclosure.
Figure 34:
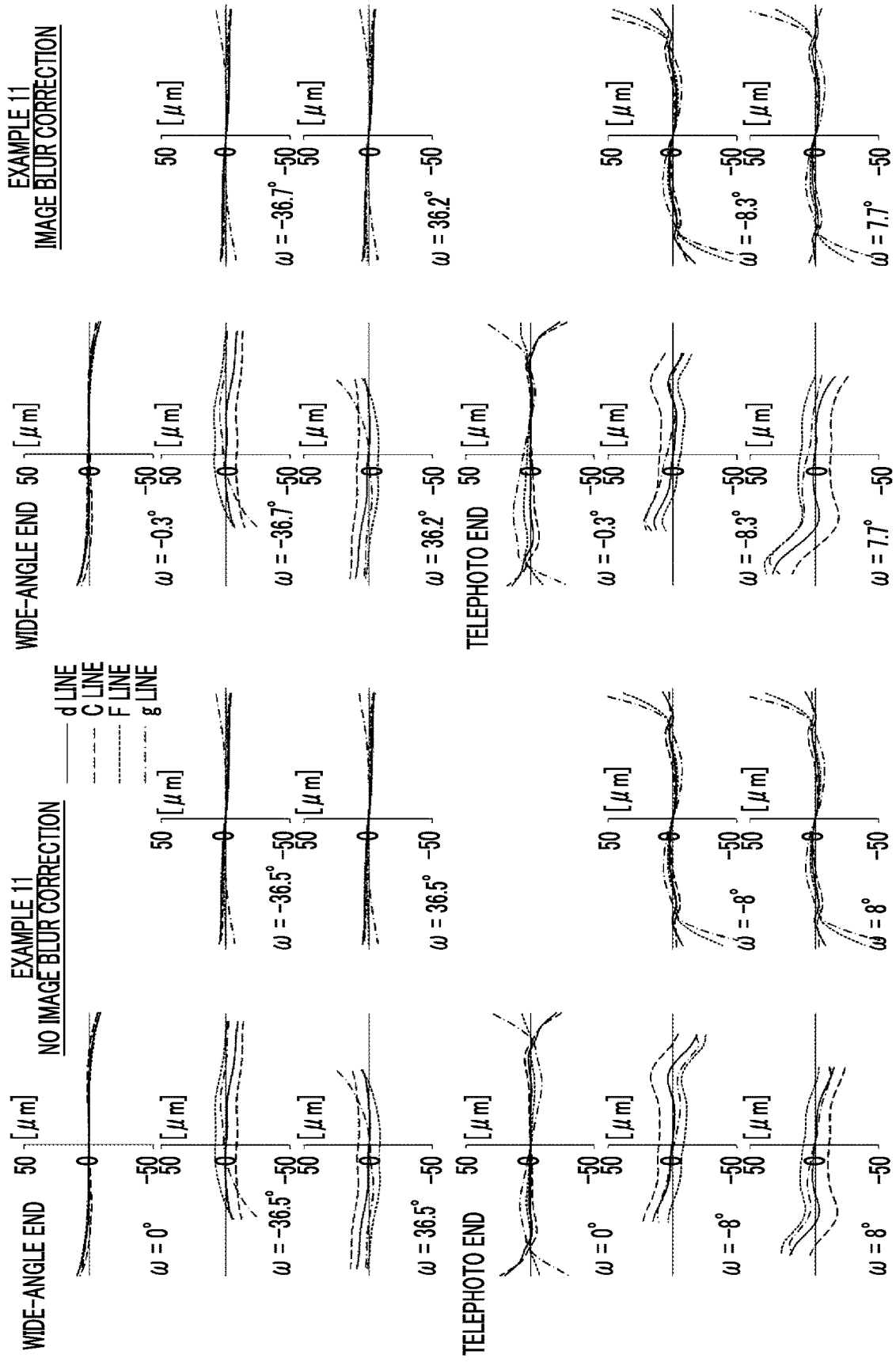
FIG. 34 shows lateral aberration diagrams of the zoom lens according to Example 11 of the present disclosure in a case of no image blur correction and in a case of image blur correction.

FIG. 11 is a cross-sectional view showing a configuration of the zoom lens of Example 11. The zoom lens of Example 11 has the same configuration as the outline of the zoom lens of Example 1. Regarding the zoom lens of Example 11, Table 31 shows basic lens data, Table 32 shows specification and variable surface distances, Table 33 shows aspheric surface coefficients, and FIGS. 23 and 34 shows aberration diagrams.

TABLE 31

Example 11

| Sn | R | D | Nd | vd | θgF |
|---|---|---|---|---|---|
| 1 | 128.24623 | 1.500 | 1.84666 | 23.78 | 0.62054 |
| 2 | 66.35400 | 5.420 | 1.72916 | 54.67 | 0.54503 |
| 3 | 370.23098 | 0.150 | | | |
| 4 | 60.85319 | 4.910 | 1.69680 | 55.53 | 0.54404 |
| 5 | 218.25042 | DD[5] | | | |
| *6 | 294.10562 | 2.000 | 1.80780 | 40.89 | 0.56949 |
| *7 | 13.29231 | 8.380 | | | |
| 8 | −17.12196 | 0.700 | 1.61800 | 63.39 | 0.54015 |
| 9 | −108.18599 | 0.150 | | | |
| 10 | 89.95607 | 3.620 | 1.92287 | 20.88 | 0.63943 |
| 11 | −33.23372 | 1.450 | | | |
| 12 | −19.01017 | 0.700 | 1.84667 | 23.79 | 0.61771 |
| 13 | −27.63008 | DD[13] | | | |
| 14(St) | ∞ | 1.100 | | | |
| *15 | 16.62717 | 4.510 | 1.68893 | 31.16 | 0.60397 |
| *16 | −416.39974 | 1.640 | | | |
| 17 | 50.66171 | 0.700 | 1.84667 | 23.79 | 0.61771 |
| 18 | 10.88100 | 3.750 | 1.61800 | 63.39 | 0.54015 |
| 19 | 19.23257 | 1.600 | | | |
| *20 | 16.53927 | 5.890 | 1.49710 | 81.56 | 0.53859 |
| *21 | −20.80043 | DD[21] | | | |
| 22 | 87.20800 | 2.000 | 1.85896 | 22.73 | 0.62844 |
| 23 | −87.20800 | 0.610 | 1.80440 | 39.59 | 0.57297 |
| 24 | 20.15648 | DD[24] | | | |
| 25 | 398.56925 | 3.300 | 1.51680 | 64.20 | 0.53430 |
| 26 | −46.61600 | 1.200 | 1.69350 | 53.35 | 0.54844 |
| 27 | ∞ | 0.511 | | | |
| *28 | −83.44813 | 3.690 | 1.58313 | 59.46 | 0.54067 |
| *29 | −29.56019 | 14.614 | | | |
| 30 | ∞ | 2.850 | 1.51680 | 64.20 | 0.53430 |
| 31 | ∞ | 1.000 | | | |

TABLE 32

Example 11

|  | Wide-angle end | Middle | Telephoto end |
|---|---|---|---|
| Zr | 1.000 | 2.215 | 4.713 |
| f | 16.497 | 36.533 | 77.751 |
| FNo. | 4.12 | 4.12 | 4.13 |
| 2ω(°) | 87.2 | 40.4 | 19.8 |
| DD[5] | 0.800 | 16.301 | 36.160 |

TABLE 32-continued

Example 11

|  | Wide-angle end | Middle | Telephoto end |
|---|---|---|---|
| DD[13] | 20.010 | 6.315 | 0.948 |
| DD[21] | 2.400 | 3.974 | 2.502 |
| DD[24] | 4.010 | 15.227 | 30.211 |

TABLE 33

Example 11

| Sn | 6 | 7 | 15 | 16 |
|---|---|---|---|---|
| KA | 1.0000000E+00 | 1.0000000E+00 | 1.0000000E+00 | 1.0000000E+00 |
| A3 | 0.0000000E+00 | 0.0000000E+00 | 0.0000000E+00 | 0.0000000E+00 |
| A4 | −2.8490089E−05 | −7.0282771E−05 | −2.6026370E−05 | −5.2519720E−06 |
| A5 | 3.4001978E−06 | 8.9327675E−06 | 8.9327675E−06 | 1.1905465E−05 |
| A6 | 8.6025369E−08 | −3.5251621E−08 | −2.0288251E−06 | −2.8991687E−06 |
| A7 | −1.5881372E−08 | −6.1941991E−08 | 1.4984851E−07 | 2.5206330E−07 |
| A8 | 4.6954316E−11 | 6.3478737E−09 | 8.9124018E−09 | 1.1490979E−08 |
| A9 | 2.5563829E−11 | 4.1329015E−11 | −1.6175571E−09 | −3.0037271E−09 |
| A10 | −2.8828379E−13 | −2.5970681E−11 | 3.8219433E−11 | 1.0930036E−10 |

| Sn | 20 | 21 | 28 | 29 |
|---|---|---|---|---|
| KA | 1.0000000E+00 | 1.0000000E+00 | 1.0000000E+00 | 1.0000000E+00 |
| A3 | 0.0000000E+00 | 0.0000000E+00 | 0.0000000E+00 | 0.0000000E+00 |
| A4 | −5.1646523E−05 | 3.0888509E−05 | 2.2349857E−05 | 4.5879069E−05 |
| A5 | −1.3212713E−05 | −1.1362506E−05 | 5.5598856E−06 | −1.7722904E−06 |
| A6 | 9.0512974E−06 | 7.4686715E−06 | −8.5821407E−07 | 2.7031166E−07 |
| A7 | −2.6426652E−06 | −2.0164295E−06 | 1.4544149E−08 | −3.9980318E−08 |
| A8 | 3.9970349E−07 | 2.7982876E−07 | 3.8678891E−09 | 4.4104943E−10 |
| A9 | −3.0895564E−08 | −1.9958501E−08 | −1.9921474E−10 | 2.3673571E−10 |
| A10 | 9.5538736E−10 | 5.7836273E−10 | −3.5162202E−14 | −1.1877867E−11 |

Table 34 shows values corresponding to Conditional Expressions (1) to (21) of the zoom lenses of Examples 1 to 11. In Examples 1 to 11, the d line is set as the reference wavelength. Table 34 shows the values on the d line basis.

TABLE 34

| Expression number | Conditional expression | Example 1 | Example 2 | Example 3 | Example 4 | Example 5 | Example 6 |
|---|---|---|---|---|---|---|---|
| (1) | f1/f5 | 0.837 | 0.719 | 0.621 | 1.422 | 0.936 | 1.247 |
| (2) | f4/f5 | −0.342 | −0.267 | −0.250 | −0.442 | −0.381 | −0.423 |
| (3) | Nd2 | 1.760 | 1.711 | 1.883 | 1.773 | 1.892 | 1.727 |
| (4) | BFw/TLw | 0.168 | 0.147 | 0.123 | 0.169 | 0.169 | 0.184 |
| (5) | f3R/f3F | 0.387 | 0.365 | 0.682 | 0.374 | 0.434 | 0.227 |
| (6) | (1-β3Rt) × β45t | 3.079 | 3.247 | 2.711 | 2.752 | 2.946 | 3.103 |
| (7) | vd3Rp | 81.61 | 81.61 | 100.82 | 81.61 | 94.66 | 81.61 |
| (8) | (1-β4t$^2$) × β5t$^2$ | −4.038 | −4.494 | −4.694 | −4.374 | −4.084 | −3.845 |
| (9) | vd4n-vd4p | 16.86 | 16.86 | 22.12 | 15.81 | 16.86 | 11.97 |
| (10) | TLw/|Y| | 7.339 | 7.327 | 7.326 | 7.291 | 7.343 | 6.974 |
| (11) | D45t/D45w | 8.129 | 7.315 | 5.852 | 7.414 | 8.267 | 3.696 |
| (12) | BFw/(fw × tan|ωw|) | 1.117 | 0.979 | 0.829 | 0.844 | 1.135 | 1.166 |
| (13) | NdG1p | 1.752 | 1.714 | 1.747 | 1.773 | 1.832 | 1.738 |
| (14) | f2/f3 | −0.771 | −0.758 | −0.663 | −0.940 | −0.773 | −0.895 |
| (15) | f1/f2 | −5.727 | −5.845 | −6.204 | −5.021 | −5.559 | −5.447 |
| (16) | f3/f4 | −0.554 | −0.609 | −0.604 | −0.682 | −0.572 | −0.604 |
| (17) | f2/f4 | 0.427 | 0.461 | 0.401 | 0.641 | 0.442 | 0.541 |
| (18) | f3R/f3 | 1.020 | 1.003 | 1.247 | 1.075 | 1.058 | 0.975 |
| (19) | (1-β4w$^2$) × β5w$^2$ | −1.648 | −1.869 | −1.867 | −1.991 | −1.620 | −1.966 |
| (20) | vd1 | 23.78 | 22.65 | 17.47 | 18.90 | 17.02 | 22.73 |
| (21) | vd4p | 22.73 | 22.73 | 17.47 | 23.78 | 22.73 | 20.36 |

| Expression number | Conditional expression | Example 7 | Example 8 | Example 9 | Example 10 | Example 11 |
|---|---|---|---|---|---|---|
| (1) | f1/f5 | 1.153 | 1.022 | 1.080 | 1.026 | 0.961 |
| (2) | f4/f5 | −0.436 | −0.338 | −0.513 | −0.318 | −0.370 |

TABLE 34-continued

| (3) | Nd2 | 1.713 | 1.655 | 1.730 | 1.649 | 1.729 |
|---|---|---|---|---|---|---|
| (4) | BFw/TLw | 0.204 | 0.182 | 0.207 | 0.182 | 0.168 |
| (5) | f3R/f3F | 0.297 | 0.250 | 0.236 | 0.193 | 0.336 |
| (6) | $(1-\beta 3Rt) \times \beta 45t$ | 3.095 | 3.655 | 3.044 | 4.033 | 3.140 |
| (7) | vd3Rp | 81.61 | 81.61 | 81.61 | 74.70 | 81.56 |
| (8) | $(1-\beta 4t^2) \times \beta 5t^2$ | −3.953 | −5.538 | −3.407 | −5.997 | −4.069 |
| (9) | vd4n-vd4p | 11.97 | 11.97 | 9.60 | 11.97 | 16.86 |
| (10) | TLw/|Y| | 6.627 | 6.765 | 6.702 | 6.766 | 7.338 |
| (11) | D45t/D45w | 4.170 | 3.782 | 3.762 | 3.708 | 10.876 |
| (12) | BFw/(fw × tan|ωw|) | 1.255 | 1.133 | 1.304 | 1.115 | 1.117 |
| (13) | NdG1p | 1.736 | 1.669 | 1.756 | 1.688 | 1.713 |
| (14) | f2/f3 | −0.831 | −0.853 | −0.743 | −0.856 | −0.804 |
| (15) | f1/f2 | −5.351 | −5.313 | −4.769 | −5.469 | −5.612 |
| (16) | f3/f4 | −0.594 | −0.666 | −0.594 | −0.689 | −0.575 |
| (17) | f2/f4 | 0.494 | 0.569 | 0.442 | 0.590 | 0.462 |
| (18) | f3R/f3 | 1.019 | 0.954 | 1.001 | 0.902 | 0.982 |
| (19) | $(1-\beta 4w^2) \times \beta 5w^2$ | −1.962 | −2.553 | −1.809 | −2.743 | −1.709 |

As can be seen from the above data, the zoom lenses of Examples 1 to 11 each have a wide angle of view as a maximum half angle of view of 42 degrees or more at the wide-angle end and a high zoom ratio as a zoom ratio of 4 times or more. With such a configuration, reduction in size is achieved, and various aberrations are satisfactorily suppressed. As a result, high optical performance is achieved.

Figure 35:
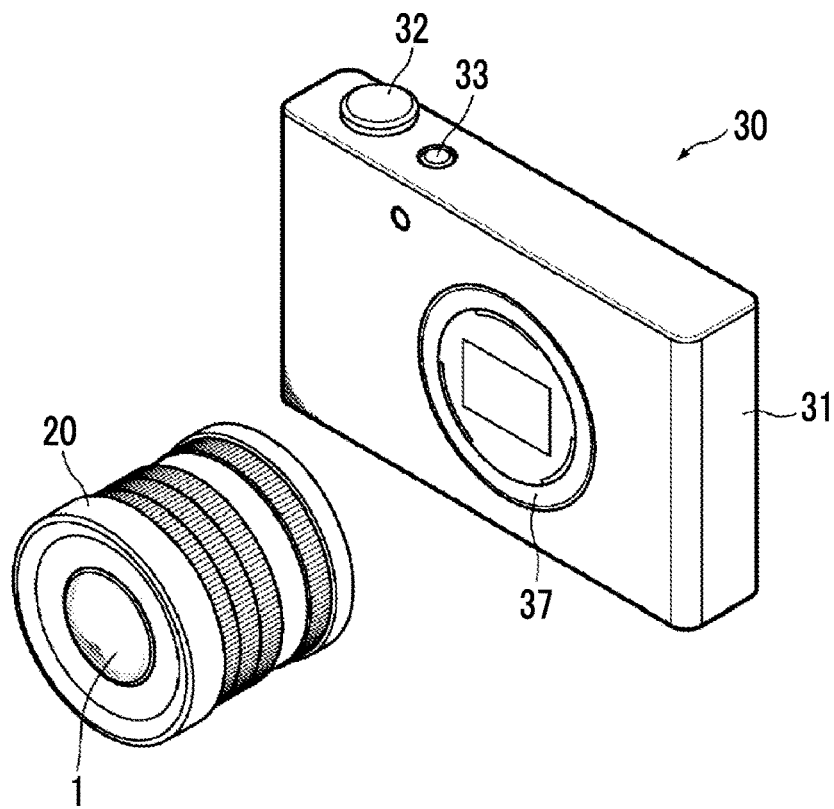
FIG. 35 is a perspective view of the front side of an imaging apparatus according to an embodiment of the present disclosure.
Figure 36:
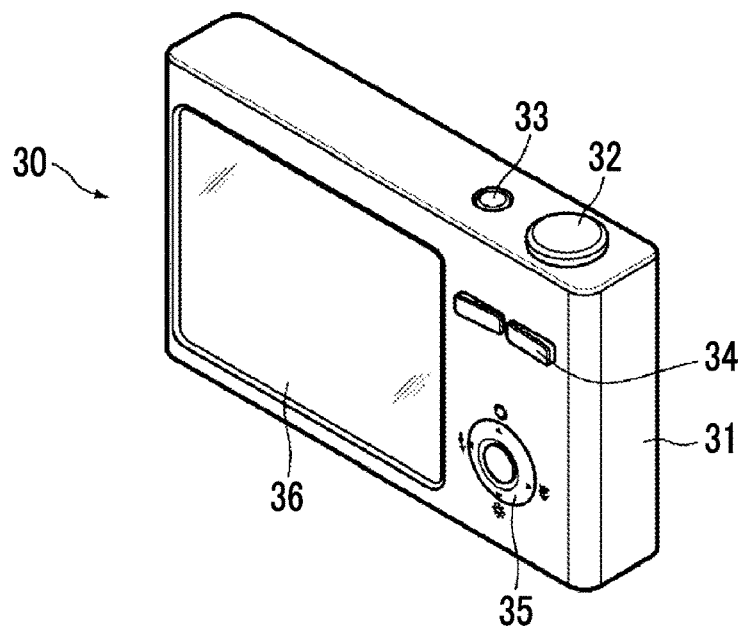
FIG. 36 is a perspective view of the rear side of an imaging apparatus according to an embodiment of the present disclosure.

Next, an imaging apparatus according to an embodiment of the present disclosure will be described. FIGS. 35 and 36 are external views of a camera 30 which is the imaging apparatus according to the above-mentioned embodiment of the present disclosure. FIG. 35 is a perspective view of the camera 30 viewed from the front side, and FIG. 36 is a perspective view of the camera 30 viewed from the rear side. The camera 30 is a so-called mirrorless type digital camera, and the interchangeable lens 20 can be detachably attached thereto. The interchangeable lens 20 consists of the zoom lens 1, which is housed in a lens barrel, according to an embodiment of the present disclosure.

The camera 30 comprises a camera body 31, and a shutter button 32 and a power button 33 are provided on an upper surface of the camera body 31. Further, an operation section 34, an operation section 35, and a display section 36 are provided on a rear surface of the camera body 31. The display section 36 is capable of displaying a captured image and an image within an angle of view before imaging.

An imaging aperture, through which light from an imaging target is incident, is provided at the center on the front surface of the camera body 31. A mount 37 is provided at a position corresponding to the imaging aperture. The interchangeable lens 20 is mounted on the camera body 31 with the mount 37 interposed therebetween.

In the camera body 31, there are provided an imaging element, a signal processing circuit, a storage medium, and the like. The imaging element such as a charge coupled device (CCD) or a complementary metal oxide semiconductor (CMOS) outputs a captured image signal based on a subject image which is formed through the interchangeable lens 20. The signal processing circuit generates an image through processing of the captured image signal which is output from the imaging element. The storage medium stores the generated image. The camera 30 is able to capture a still image or a moving image by pressing the shutter button 32, and is able to store image data, which is obtained through imaging, in the storage medium.

The technology of the present disclosure has been hitherto described through embodiments and examples, but the technology of the present disclosure is not limited to the above-mentioned embodiments and examples, and may be modified into various forms. For example, values such as the radius of curvature, the surface distance, the refractive index, the Abbe number, and the aspheric surface coefficient of each lens are not limited to the values shown in the numerical examples, and different values may be used therefor.

Further, the imaging apparatus according to the embodiment of the present disclosure is not limited to the above example, and may be modified into various forms such as a camera other than the mirrorless type, a film camera, and a video camera.

What is claimed is:

1. A zoom lens comprising, as lens groups, only five lens groups consisting of, in order from an object side to an image side:
    a first lens group that has a positive refractive power;
    a second lens group that has a negative refractive power;
    a third lens group that has a positive refractive power;
    a fourth lens group that has a negative refractive power; and
    a fifth lens group that has a positive refractive power,
    wherein an aperture stop is disposed between a lens surface closest to the image side in the second lens group and a lens surface closest to the object side in the fourth lens group,
    wherein during zooming, by changing all distances between lens groups adjacent to each other in a direction of an optical axis, at least the first lens group, the second lens group, the third lens group, and the fourth lens group move along the optical axis,
    wherein the first lens group consists of, in order from the object side to the image side, a first lens having a negative refractive power, a second lens having a positive refractive power, and a third lens having a positive refractive power,
    wherein the third lens group consists of, in order from the object side to the image side, a third lens group front group having a positive refractive power and a third lens group rear group having a positive refractive power,
    wherein only the third lens group rear group moves in a direction intersecting with the optical axis for image blur correction,
    wherein
    a focal length of the first lens group is f1,
    a focal length of the fifth lens group is f5,
    a focal length of the fourth lens group is f4,
    a refractive index of the second lens at a d line is Nd2,
    a focal length of the third lens group rear group is f3R, a focal length of the third lens group front group is f3F,
a lateral magnification of the third lens group rear group in a state where the object at infinity is in focus at a telephoto end is β3Rt, and
a combined lateral magnification of the fourth lens group and the fifth lens group in the state where the object at infinity is in focus at the telephoto end is β45t,
Conditional Expressions (1), (2), (3), (5), and (6) are satisfied, which are represented by $$0.4<f1/f5<2 \quad (1),$$

$$-0.7<f4/f5<-0.1 \quad (2),$$

$$1.6<Nd2<2 \quad (3),$$

$$0.1<f3R/f3F<0.9 \quad (5) \text{ and}$$

$$2<(1-\beta3Rt)\times\beta45t<5 \quad (6).$$

2. The zoom lens according to claim 1, wherein the third lens group rear group consists of one positive lens.

3. The zoom lens according to claim 2, wherein
an Abbe number of the at least one positive lens in the third lens group rear group based on the d line is νd3Rp,
Conditional Expression (7) is satisfied, which is represented by $$65<\nu d3Rp<105 \quad (7).$$

4. The zoom lens according to claim 3, wherein only the fourth lens group moves along the optical axis during focusing from an object at infinity to a close-range object.

5. The zoom lens according to claim 4, wherein
a lateral magnification of the fourth lens group in a state where the object at infinity is in focus at a telephoto end is β4t, and
a lateral magnification of the fifth lens group in the state where the object at infinity is in focus at the telephoto end is β5t,
Conditional Expression (8) is satisfied, which is represented by $$-7<(1-\beta4t^2)\times\beta5t^2<-2.6 \quad (8).$$

6. The zoom lens according to claim 5, wherein
an average of the refractive index of the second lens at the d line and a refractive index of the third lens at the d line is NdG1p,
Conditional Expression (13) is satisfied, which is represented by $$1.63<NdG1p<1.9 \quad (13).$$

7. The zoom lens according to claim 6, wherein
a focal length of the second lens group is f2, and
a focal length of the third lens group is f3,
Conditional Expression (14) is satisfied, which is represented by $$-1.3<f2/f3<-0.4 \quad (14).$$

8. An imaging apparatus comprising the zoom lens according to claim 7.

9. A zoom lens comprising, as lens groups, only five lens groups consisting of, in order from an object side to an image side:
a first lens group that has a positive refractive power;
a second lens group that has a negative refractive power;
a third lens group that has a positive refractive power;
a fourth lens group that has a negative refractive power; and
a fifth lens group that has a positive refractive power,
wherein an aperture stop is disposed between a lens surface closest to the image side in the second lens group and a lens surface closest to the object side in the fourth lens group,
wherein during zooming, by changing all distances between lens groups adjacent to each other in a direction of an optical axis, at least the first lens group, the second lens group, the third lens group, and the fourth lens group move along the optical axis,
wherein the first lens group consists of, in order from the object side to the image side, a first lens having a negative refractive power, a second lens having a positive refractive power, and a third lens having a positive refractive power,
wherein the entire third lens group or a part of the third lens group moves in a direction intersecting with the optical axis for image blur correction,
wherein only the fourth lens group moves along the optical axis during focusing from an object at infinity to a close-range object,
wherein
a focal length of the first lens group is f1,
a focal length of the fifth lens group is f5,
a focal length of the fourth lens group is f4,
a refractive index of the second lens at a d line is Nd2,
a lateral magnification of the fourth lens group in a state where the object at infinity is in focus at a telephoto end is β4t, and
a lateral magnification of the fifth lens group in the state where the object at infinity is in focus at the telephoto end is β5t,
Conditional Expressions (1), (2), (3), and (8) are satisfied, which are represented by $$0.4<f1/f5<2 \quad (1),$$

$$-0.7<f4/f5<-0.1 \quad (2),$$

$$1.6<Nd2<2 \quad (3), \text{ and}$$

$$-7<(1-\beta4t^2)\times\beta5t^2<-2.6 \quad (8).$$

10. The zoom lens according to claim 9,
wherein the third lens group consists of, in order from the object side to the image side, a third lens group front group having a positive refractive power and a third lens group rear group having a positive refractive power, and
wherein only the third lens group rear group moves in a direction intersecting with the optical axis for image blur correction.

11. The zoom lens according to claim 10, wherein
a focal length of the third lens group rear group is f3R, and
a focal length of the third lens group front group is f3F,
Conditional Expression (5) is satisfied, which is represented by $$0.1<f3R/f3F<0.9 \quad (5).$$

12. The zoom lens according to claim 11, wherein
a lateral magnification of the third lens group rear group in a state where the object at infinity is in focus at a telephoto end is β3Rt, and
a combined lateral magnification of the fourth lens group and the fifth lens group in the state where the object at infinity is in focus at the telephoto end is β45t, Conditional Expression (6) is satisfied, which is represented by $$2 < (1-\beta 3Rt) \times \beta 45t < 5 \quad (6).$$

13. The zoom lens according to claim 12, wherein the third lens group rear group consists of one positive lens.

14. The zoom lens according to claim 13,
    wherein
    an Abbe number of the at least one positive lens in the third lens group rear group based on the d line is vd3Rp,
    Conditional Expression (7) is satisfied, which is represented by $$65 < vd3Rp < 105 \quad (7).$$

15. The zoom lens according to claim 14, wherein
    an average of the refractive index of the second lens at the d line and a refractive index of the third lens at the d line is NdG1p,
    Conditional Expression (13) is satisfied, which is represented by $$1.63 < NdG1p < 1.9 \quad (13).$$

16. An imaging apparatus comprising the zoom lens according to claim 15.

* * * * *